(12) United States Patent
Tanaka et al.

(10) Patent No.: US 10,546,191 B2
(45) Date of Patent: Jan. 28, 2020

(54) IMAGE PROCESSING APPARATUS DETECTING A UNIQUE PORTION IN PRINT IMAGE DATA

(71) Applicant: CANON KABUSHIKI KAISHA, Tokyo (JP)

(72) Inventors: Wakako Tanaka, Inagi (JP); Tohru Ikeda, Yokohama (JP); Shinjiro Hori, Yokohama (JP); Tetsuya Suwa, Yokohama (JP); Hidetsugu Kagawa, Kawasaki (JP); Yumi Yanai, Yokohama (JP); Tomokazu Ishikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 15/191,241

(22) Filed: Jun. 23, 2016

(65) Prior Publication Data

US 2017/0004360 A1 Jan. 5, 2017

(30) Foreign Application Priority Data

Jul. 1, 2015 (JP) .................................. 2015-132937

(51) Int. Cl.
*G06K 9/00* (2006.01)
*G06K 9/46* (2006.01)
*H04N 1/00* (2006.01)
*G06K 9/68* (2006.01)
(Continued)

(52) U.S. Cl.
CPC ......... *G06K 9/00442* (2013.01); *G06K 9/036* (2013.01); *G06K 9/6857* (2013.01); *G06T 7/0004* (2013.01); *H04N 1/00005* (2013.01); *H04N 1/00013* (2013.01); *H04N 1/00039* (2013.01); *G06K 9/4604* (2013.01);
(Continued)

(58) Field of Classification Search
None
See application file for complete search history.

(56) References Cited

U.S. PATENT DOCUMENTS 8,503,031 B2 * 8/2013 Kajihara ................ B41J 2/2132
358/1.9
8,619,319 B2 12/2013 Tsuchiya
8,830,530 B2 9/2014 Sand
(Continued)

FOREIGN PATENT DOCUMENTS

EP 2988249 2/2016
FR 2 988 249 9/2013
(Continued)

OTHER PUBLICATIONS

Kizuki, "Algorithm inspired by Peripheral Vision and Involuntary Eye Movement", Journal of the Japan Society for Precision Engineering, vol. 79, No. 11, 2013, p. 1045-1049.
(Continued)

*Primary Examiner* — Tahmina N Ansari
(74) *Attorney, Agent, or Firm* — Venable LLP

(57) ABSTRACT

Parameters are set according to features of a unique portion appearing in a print image, ensuring that the unique portion can be efficiently determined in the print image. In order to do so, information about a form of appearance of the unique portion in the print image is acquired, and the parameters are set in accordance with the form of the appearance.

21 Claims, 39 Drawing Sheets

(51) Int. Cl.
*G06T 7/00* (2017.01)
*G06K 9/03* (2006.01)

(52) U.S. Cl.
CPC ............... *G06T 2207/10008* (2013.01); *G06T 2207/20021* (2013.01); *G06T 2207/30144* (2013.01)

(56) References Cited

U.S. PATENT DOCUMENTS

| | | | |
|---|---|---|---|
| 9,013,772 B2 | 4/2015 | Kitai | |
| 9,064,202 B2* | 6/2015 | Tanaka | G06K 15/1848 |
| 9,087,291 B2 | 7/2015 | Hori | |
| 9,092,720 B2 | 7/2015 | Nakagawa | |
| 9,210,292 B2* | 12/2015 | Miyake | H04N 1/4051 |
| 9,356,786 B2 | 5/2016 | Bringer | |
| 9,649,839 B2* | 5/2017 | Ishikawa | B41J 2/16579 |
| 9,715,636 B2* | 7/2017 | Ikeda | G06K 9/46 |
| 2003/0133606 A1 | 7/2003 | Yano | |
| 2013/0329235 A1* | 12/2013 | Tanaka | G06K 15/1848 358/1.8 |
| 2014/0268260 A1* | 9/2014 | Kitai | H04N 1/6027 358/521 |
| 2015/0092240 A1* | 4/2015 | Miyake | H04N 1/40 358/2.1 |
| 2016/0167414 A1 | 6/2016 | Yanai | |
| 2016/0167415 A1 | 6/2016 | Ikeda | |
| 2016/0173725 A1 | 6/2016 | Kato | |
| 2017/0004360 A1* | 1/2017 | Tanaka | G06K 9/036 |

FOREIGN PATENT DOCUMENTS

| | | |
|---|---|---|
| JP | 2006-58155 | 3/2006 |
| JP | 2013-185862 | 9/2013 |
| JP | 2015-78848 | 4/2015 |
| WO | 2004/063975 | 7/2004 |
| WO | 2010/077865 | 7/2010 |

OTHER PUBLICATIONS

U.S. Appl. No. 14/991,618, filed Jan. 8, 2016.
U.S. Appl. No. 15/192,229, filed Jun. 24, 2016.
U.S. Appl. No. 15/191,210, filed Jun. 23, 2016.
U.S. Appl. No. 15/192,243, filed Jun. 24, 2016.
U.S. Appl. No. 15/192,216, filed Jun. 24, 2016.
U.S. Appl. No. 15/191,226, filed Jun. 23, 2016.
Great Britain Office Action dated Dec. 19, 2016 during prosecution of related application No. GB1611267.4.
A. Komiya, et al., "Perception of scratch" algorithm learned from peripheral vision and fixation microtremor, image information industrial, Japan, Sangyo Kaihatsukiko Inc., Mar. 1, 2013 vol. 45, No. 3, Mar. 2013 pp. 50-59.
A. Komiya, et al., "Kizuki" Algorithm inspired by Peripheral Vision and Involuntary Eye Movement, The Japan Society for Precision Engineering, Mar. 30, 2013, vol. 79, No. 11, 2013, pp. 1045-1049.
A. Komiya, et al., Performance Verification for "Kizuki" Processing via Real Industrial Parts, Actual utilization workshop on vision technology lecture paper, (VIEW2013), Japan, The Japan Society for Precision Engineering, Dec. 5, 2013 OS4-H4(IS-A4).
A. Komiya, et al., "Kizuki" Processing for Visual Inspection A Smart USA IEEE Computer Society Aug. 24, 2014 pp. 2317-2322.
Japanese Office Action dated Jan. 8, 2019 during prosecution of related Japanese application No. 2015-132937. (English-language machine translation included.).
Great Britain Search Report dated Mar. 14, 2019 during prosecution of related Great Britain application No. 1611267.4.

* cited by examiner

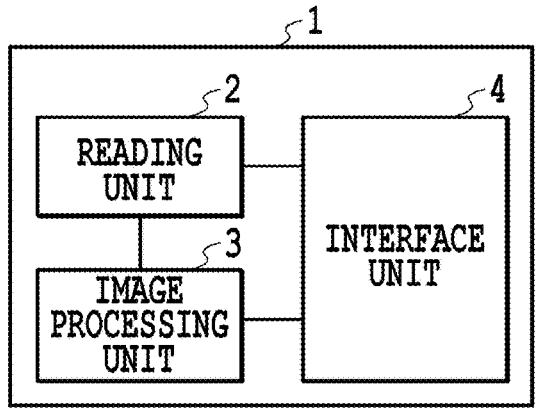
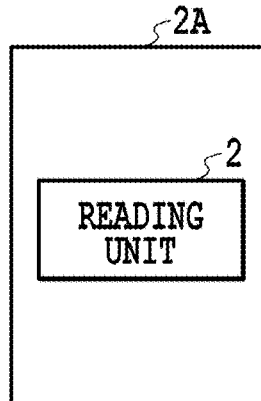
FIG.1A  FIG.1B
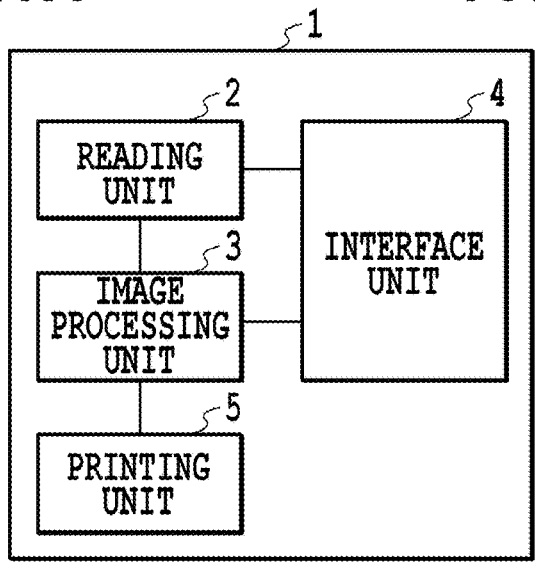
FIG.1C
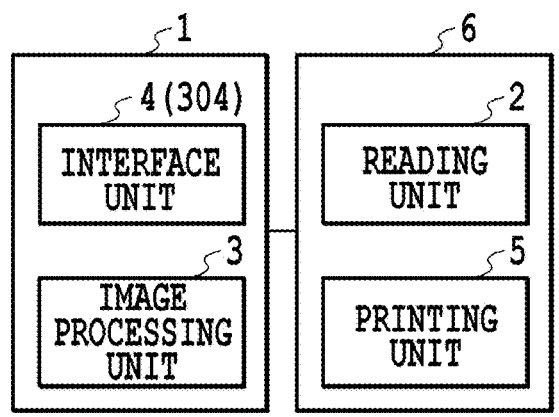
FIG.1D

| (R,G,B) | L | a | b |
|---|---|---|---|
| (0,0,0) | 4.22 | -0.42 | -2.42 |
| (0,0,8) | 4.46 | 0.19 | -3.92 |
| (0,0,16) | 4.70 | 0.82 | -5.42 |
| ⋮ | ⋮ | ⋮ | ⋮ |
| (0,0,255) | 6.34 | 39.41 | -55.41 |
| (0,8,0) | 6.36 | -2.10 | -1.43 |
| (0,8,8) | 6.38 | -1.92 | -3.65 |
| (0,8,16) | 6.44 | -1.29 | -5.14 |
| ⋮ | ⋮ | ⋮ | ⋮ |
| ⋮ | ⋮ | ⋮ | ⋮ |
| (255,255,255) | 92.33 | -0.03 | -6.42 |

FIG.17

CONVEYANCE DIRECTION

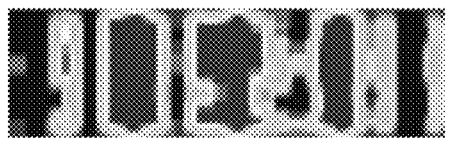
FIG.25F
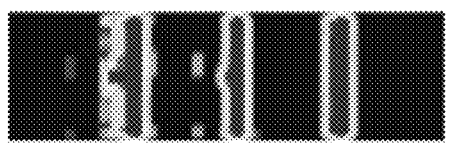
FIG.25E
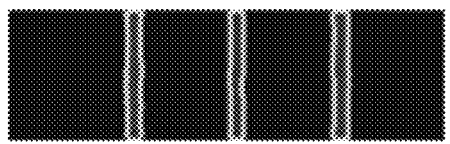
FIG.25D
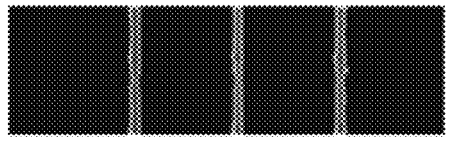
FIG.25C
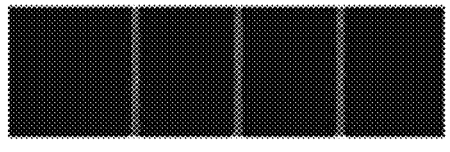
FIG.25B
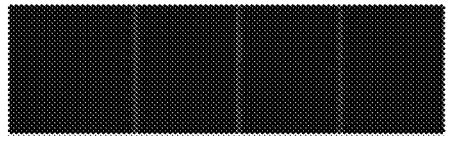
FIG.25A
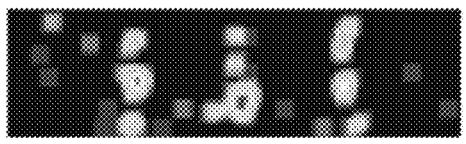
FIG.25L
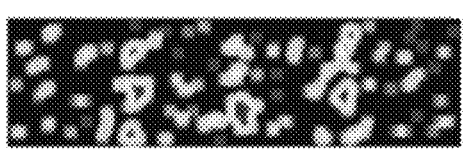
FIG.25K
FIG.25J
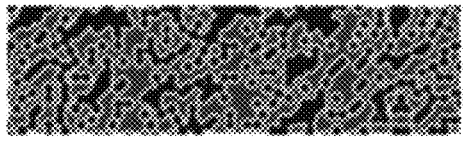
FIG.25I
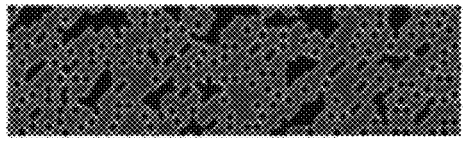
FIG.25H
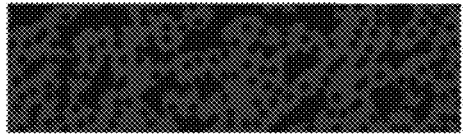
FIG.25G

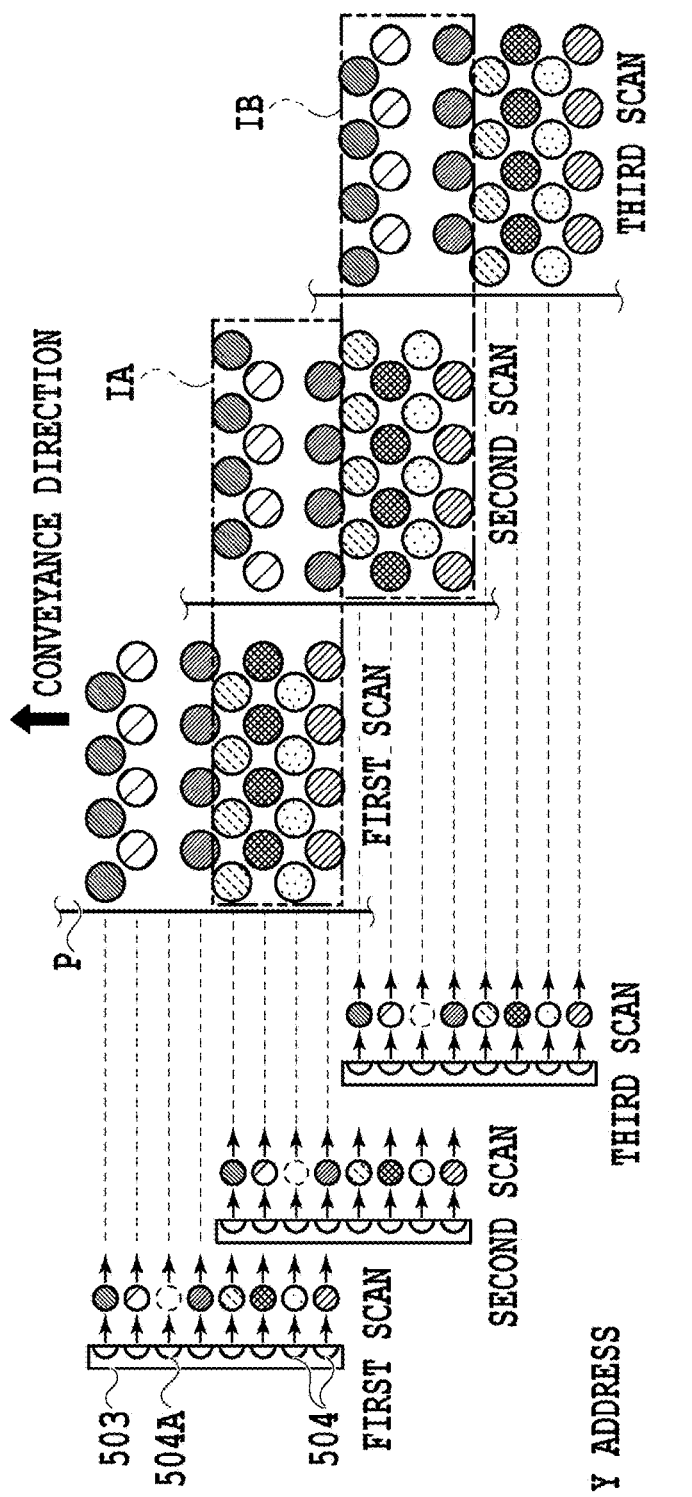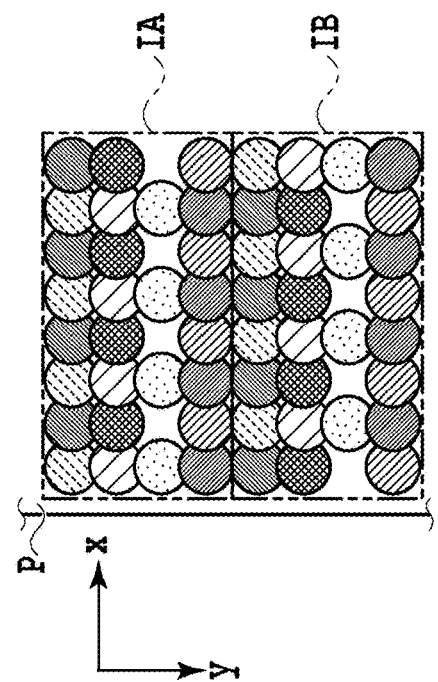
FIG.28A
FIG.28B

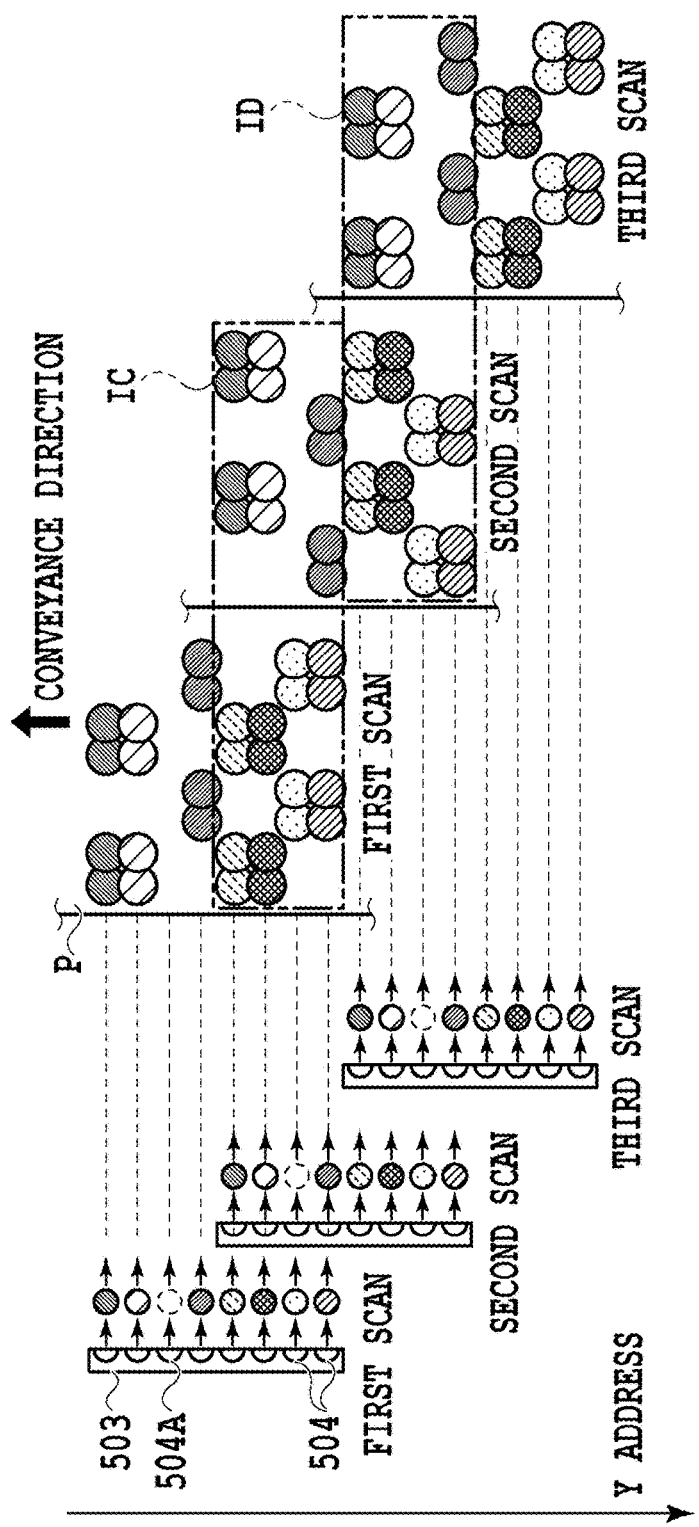
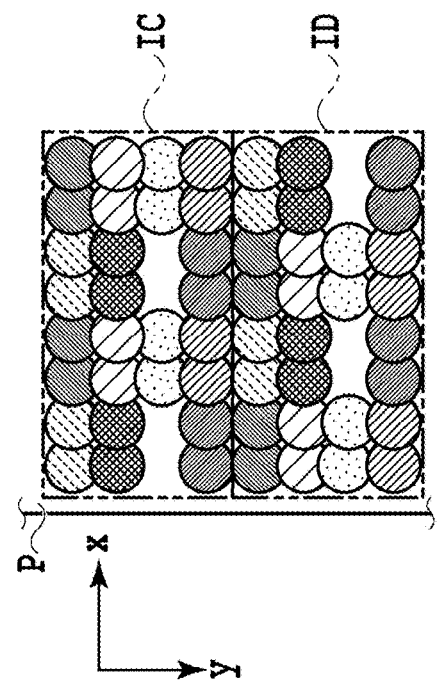
FIG.29A
FIG.29B

FIG.32

| FIG.32A |
|---|
| FIG.32B |

FIG.32A

START → ACQUIRE INSPECTION TARGET IMAGE DATA (S61) → SET INITIAL VALUE OF INSPECTION TARGET DIVISION AREA (S62) → SET MULTIPLE DIVISION SIZES AND INITIAL VALUE / SET MULTIPLE SHIFT AMOUNTS AND INITIAL VALUE (S63) → SHIFT IMAGE (SHIFT PROCESS) (S64) → DIVIDE IMAGE (DIVISION PROCESS) (S65) → AVERAGING PROCESS (S66) → GENERATE CANDIDATE IMAGE (S67)

IMAGE PROCESSING APPARATUS DETECTING A UNIQUE PORTION IN PRINT IMAGE DATA

BACKGROUND OF THE INVENTION

Field of the Invention

The present invention relates to an image processing apparatus for determining a unique portion (an unusual portion including a defect) in a print image on the basis of data resulting from reading the print image.

Description of the Related Art

Japanese Patent Laid-Open No. 2013-185862 or ""KIZUKI" Algorithm inspired by Peripheral Vision and Involuntary Eye Movement", Journal of the Japan Society for Precision Engineering, Vol. 79, No. 11, 2013, p. 1045-1049 discloses an algorism for detecting a defect of an inspection object in accordance with a human visual mechanism. Specifically, after imaging an inspection object, the resulting image is divided into division areas having a predetermined size, and a luminance value in each division area is averaged and quantized. In addition, such image processing is repeated using different sizes and/or phases of a division area, the resulting values quantized in the repeated image processing are added, and on the basis of the addition result a defect in the inspection object is detected. By employing such a method, a defect of an inspection object can be efficiently extracted and made apparent without any human observation.

However, when employing the algorithm disclosed in Japanese Patent Laid-Open No. 2013-185862 or ""KIZUKI" Algorithm inspired by Peripheral Vision and Involuntary Eye Movement", Journal of the Japan Society for Precision Engineering, Vol. 79, No. 11, 2013, p. 1045-1049, it is desirable to make various parameters such as the read resolution of an inspection object and the division size in image processing suitable in order to effectively detect a defect in the inspection object. For example, an image printed by an inkjet printing apparatus may have, as a unique portion, a stripe-like defect and density unevenness, and a read resolution and division size for effectively detecting these stripe-like defect and density unevenness vary depending on the features of the stripe-like defect and density unevenness. However, Japanese Patent Laid-Open No. 2013-185862 or ""KIZUKI" Algorithm inspired by Peripheral Vision and Involuntary Eye Movement", Journal of the Japan Society for Precision Engineering, Vol. 79, No. 11, 2013, p. 1045-1049 do not describe the relation between the feature of a defect to be detected and its corresponding suitable parameters.

SUMMARY OF THE INVENTION

The present invention provides an image processing apparatus that is able to efficiently and certainly determine a unique portion in a print image by setting parameters in accordance with the features of the unique portion appearing in the print image.

In the first aspect of the present invention, there is provided an image processing apparatus comprising:

a data acquiring means configured to acquire image data resulting from reading a print image;

a processing means configured to perform predetermined processes on the image data, the predetermined processes including averaging processes of multiple divided images and an addition process of results of the averaging processes of the multiple divided images, the averaging processes and the addition process being performed in accordance with parameters of (a) a division size of a division area for dividing the image and (b) a shift amount for shifting a setting position of the division area; and an extracting means configured to extract a unique portion in the print image from the image data on which the predetermined processes have been performed, wherein the processing means performs (i) the averaging process on the image data in accordance with the parameters preliminarily set thereby to generate multiple pieces of candidate image data and (ii) the addition process on pieces of image data selected from the multiple pieces of candidate image data, the image processing apparatus further comprising:

an information acquiring means configured to acquire information about a form of appearance of the unique portion on the basis of printing conditions of the print image; and a selecting means configured to select the pieces of image data for the addition processes from the multiple pieces of candidate image data in accordance with the form of appearance indicated by the information.

In the second aspect of the present invention, there is provided an image processing apparatus comprising:

a data acquiring means configured to acquire image data resulting from reading a print image;

a processing means configured to perform predetermined processes on the image data, the predetermined processes including averaging processes of multiple divided images and an addition process of results of the averaging processes of the multiple divided images, the averaging processes and the addition process being performed in accordance with parameters of (a) a division size of a division area for dividing the image and (b) a shift amount for shifting a setting position of the division area;

an information acquiring means configured to acquire information about a form of appearance of the unique portion on the basis of printing conditions of the print image; and a setting means configured to set the parameters in accordance with the form of appearance.

In the third aspect of the present invention, there is provided an image processing apparatus comprising:

a data acquiring means configured to acquire image data resulting from reading a print image;

a processing means configured to perform predetermined processes on the image data, the predetermined processes including a filtering process and an addition process in accordance with a parameter including a filter size;

an extracting means configured to extract a unique portion in the print image from the image data on which the predetermined processes have been performed, wherein the processing means is configured to perform (i) the filtering process on the image data in accordance with the parameter preliminarily set thereby to generate multiple pieces of candidate image data and (ii) the addition process on pieces of image data selected from the multiple pieces of candidate image data, the image processing apparatus further comprising:

an information acquiring means configured to acquire information about a form of appearance of the unique portion on the basis of printing conditions of the print image; and a selecting means configured to select the pieces of image data for the addition processes from the multiple pieces of candidate image data in accordance with the form of appearance indicated by the information.

In the fourth aspect of the present invention, there is provided an image processing apparatus comprising:

a data acquiring means configured to acquire image data resulting from reading a print image;

a processing means configured to perform predetermined processes on the image data, the predetermined processes including a filtering process and an addition process in accordance with a parameter including a filter size;

an extracting means configured to extract a unique portion in the print image from the image data on which the predetermined processes have been performed;

an information acquiring means configured to acquire information about a form of appearance of the unique portion on the basis of printing conditions of the print image; and a setting means configured to set the parameters in accordance with the form of appearance.

According to the present invention, by acquiring information about a form of appearance of a unique portion in a print image and setting parameters in accordance with the form of the appearance, the unique portion can be efficiently and certainly determined.

Further features of the present invention will become apparent from the following description of exemplary embodiments (with reference to the attached drawings).

BRIEF DESCRIPTION OF THE DRAWINGS

FIGS. 1A to 1D are diagrams each illustrating an example of a different form of an image processing apparatus according to a first basic configuration of the present invention;

FIG. 17 is an explanatory diagram illustrating an example of luminance data used in the first embodiment of the present invention;

FIGS. 25A to 25L are explanatory diagrams illustrating processing results of inspection images according to third embodiment of the present invention;

FIGS. 28A and 28B are explanatory diagrams illustrating one example of a printing method according to a fourth embodiment of the present invention;

FIGS. 29A and 29B are explanatory diagrams illustrating another example of the printing method according to the fourth embodiment of the present invention;

FIG. 32 is a diagram showing a relation between FIGS. 32A and 32B;

FIGS. 32A and 32B are flowcharts for explaining an image processing method according to a fifth embodiment of the present invention;

DESCRIPTION OF THE EMBODIMENTS

Figure 2:
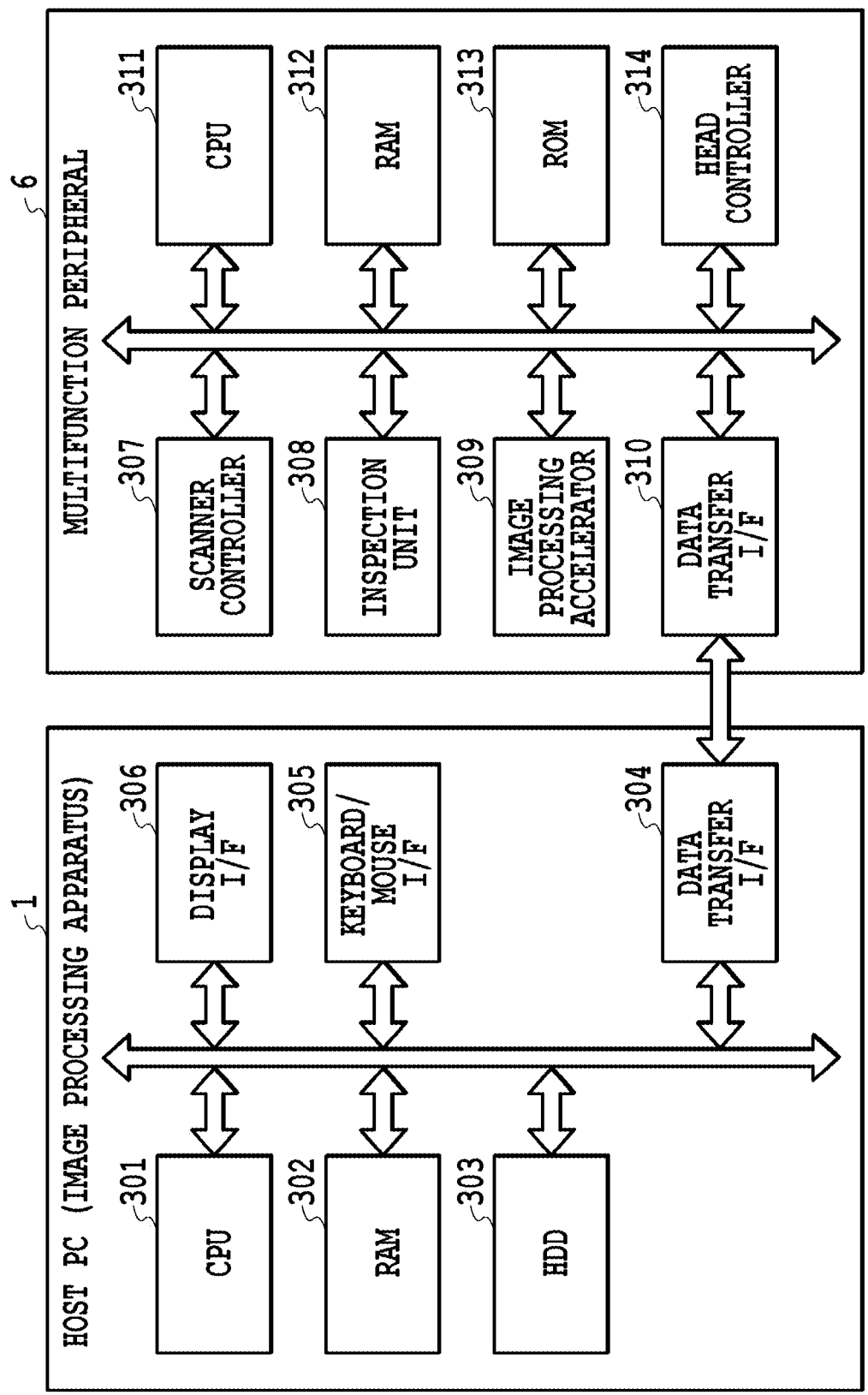
FIG. 2 is a block diagram illustrating a control system according to the first basic configuration of the present invention.

FIGS. 1A to 1D are diagrams each illustrating an example of a different form of an image processing apparatus 1 that can be used in the present invention. The image processing apparatus of the present invention processes image data resulting from reading a print image in order to determine a unique portion (an unusual portion including a defect) appearing in the print image, and can employ various forms as a system.

FIG. 1A illustrates a form in which the image processing apparatus 1 includes a reading unit 2. For example, this form corresponds to the case where an inkjet printing apparatus prints a predetermined image on a sheet, the printed sheet is placed on a reading table of the reading unit 2 inside the image processing apparatus 1 and imaged by an optical sensor or the like, and the resulting image data is processed by an image processing unit 3. The image processing unit 3 includes a CPU or an image processing accelerator capable of higher speed processing than the CPU, controls a reading action by the reading unit 2 and processes read image data.

FIG. 1B illustrates a form in which an image processing apparatus 1 is externally connected to a reading apparatus 2A including the reading unit 2. For example, this form corresponds to a system in which a PC is connected to a scanner. Methods for the connection may include a general one such as USB, GigE, or Camera Link. Image data read by the reading unit 2 is provided through an interface 4 to the image processing unit 3 and processed in the image processing unit 3. In this form, the image processing apparatus 1 may be further externally connected to a printing apparatus 5A including a printing unit 5.

FIG. 1C illustrates a form in which the image processing apparatus 1 includes the reading unit 2 and the printing unit 5. For example, this form corresponds to a multifunction peripheral including a scanner function, a printer function, and an image processing function. The image processing unit 3 controls all of a printing action by the printing unit 5, a reading action by the reading unit 2, and processing of image data read by the reading unit 2. FIG. 1D illustrates a form in which the image processing apparatus 1 is externally connected to a multifunction peripheral 6 including the reading unit 2 and the printing unit 5. For example, this form corresponds to a system in which a PC is connected to a multifunction peripheral including both of a scanner function and a printer function. The image processing apparatus 1 of the present invention can employ any of the forms in FIGS. 1A to 1D.

In the following, basic configurations (the first and second basic configurations) and embodiments (the first to sixth embodiments) of the present invention will be described.

(First Basic Configuration)

FIG. 2 is a block diagram for explaining the first basic configuration of a control system in the form illustrated in FIG. 1D. The first basic configuration is an example of employing the form in FIG. 1D.

The image processing apparatus 1 includes a host PC, in which a CPU 301 performs various processes in accordance with programs held in an HDD 303 while using a RAM 302 as a work area. For example, the CPU 301 generates image data printable by the multifunction peripheral 6 in accordance with a command received from a user through a keyboard/mouse I/F 305 and a program held in the HDD 303, and transfers the image data to the multifunction peripheral 6. Also, the CPU 301 performs a predetermined process in accordance with programs stored in the HDD 303 on image data received from the multifunction peripheral 6 through a data transfer I/F 304, and displays the result of the process or various pieces of information on an unillustrated display through a display I/F 306. It is also possible that the multifunction peripheral 6 notifies the image processing apparatus 1 (host PC) that a defective portion as a unique portion in an image has been detected, and a display (not shown) displays the result. For example, the display also may display a print image area where the image defective portion exists.

In the multifunction peripheral 6, a CPU 311 performs various processes in accordance with programs held in a ROM 313 while using a RAM 312 as a work area. In addition, the multifunction peripheral 6 includes: an image processing accelerator 309 for performing a high-speed image processing; a scanner controller 307 for controlling the reading unit 2; a head controller 314 for controlling the printing unit 5; and an inspection unit 308. The image processing accelerator 309 is hardware capable of performing image processing at higher speed than the CPU 311. The image processing accelerator 309 is activated by the CPU 311 writing parameters and data necessary for image processing in a predetermined address in the RAM 312, and after reading the parameters and data, performs predetermined image processing on the data. Note that the image processing accelerator 309 is not an indispensable component, and the CPU 311 can perform an equivalent process.

The head controller 314 supplies print data to a print head provided in the printing unit 5 as well as controlling a printing action of the print head. The head controller 314 is activated by the CPU 311 writing print data printable by the print head and control parameters in a predetermined address of the RAM 312, and performs an ejecting action in accordance with the print data. The scanner controller 307 controls respective reading elements arrayed in the reading unit 2 and at the same time outputs RGB luminance data obtained from the reading elements to the CPU 311. The CPU 311 transfers the obtained RGB luminance data to the image processing apparatus 1 through a data transfer I/F 310. As a method for the connection between the data transfer I/F 304 of the image processing apparatus 1 and the data transfer I/F 310 of the multifunction peripheral 6, a USB, IEEE 1394 or LAN, for example, can be used.

The inspection unit 308 inspects an inspection image obtained by the reading unit 2 for a defect or image degradation in the print image printed by the printing unit 5. It is desirable to perform preprocessing necessary for inspection on the inspection image. The inspection unit 308 can feed back the inspection result to the printing unit 5 and cause the printing unit 5 to perform a process necessary for improving a print image, as well as notifying a user of the inspection result through a display. In addition, the size of an image defect a user wants to detect may be set through a user interface (UI).

The printing unit 5 in this example uses an inkjet print head as described later, and multiple nozzles (printing elements) capable of ejecting ink are arranged on the print head so as to form a nozzle array. The nozzles are configured to eject ink from ejection ports by using an ejection energy generating element. The ejection energy generating element such as an electrothermal transducer (heater) or a piezoelectric element can be used. If the electrothermal transducer is used, then its heat generation can foam ink, and the foaming energy can be used to eject ink from the ejection port. In the following, the case will be explained where the electrothermal transducer is used in the print head.

To such a printing unit can be fed back an inspection result of an inspection image. For example, if a defect of a print image is due to ink ejection failure in a nozzle, a recovery action is performed for improving the ink ejection state in the nozzle. If printing to be performed by a nozzle having ink ejection failure can be compensated by a surrounding nozzle of the nozzle having ink ejection failure, a process is performed that assigns the ejection data of the nozzle having ejection failure to the surrounding nozzle or a nozzle for ejecting a different ink. If a defect of a print image is due to variations in amount of ink ejection, then a drive pulse of a nozzle for ejecting ink may be controlled to correct an ink ejection amount or the number of ink dots formed may be controlled to achieve a uniform print density. If deviation of landing positions of ink droplets is detected, the drive pulse is controlled to adjust the landing positions of the ink droplets.

Figure 3A:
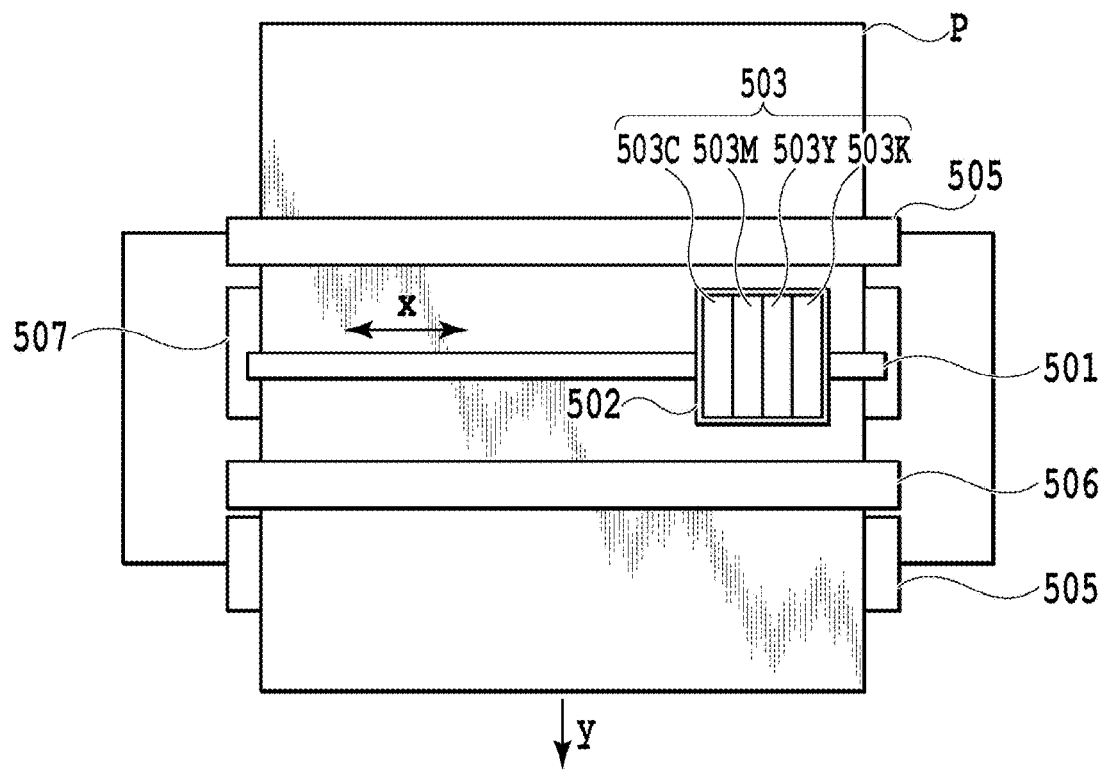
FIGS. 3A and 3B are schematic configuration diagrams of a printing apparatus according to the first basic configuration of the present invention.
Figure 3B:
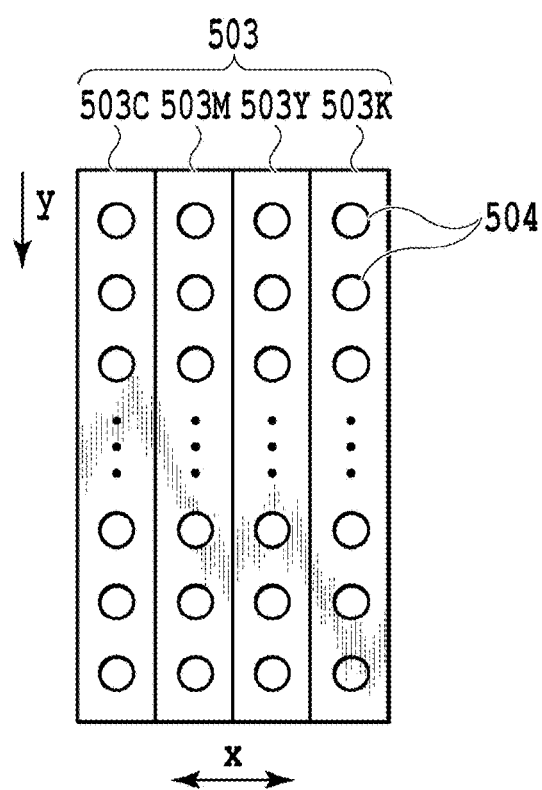

FIGS. 3A and 3B are schematic configuration diagrams of an inkjet printing apparatus (hereinafter also simply referred to as a printing apparatus) usable as the multifunction peripheral 6. The printing apparatus in this example is a full-multi type inkjet printing apparatus as illustrated in FIG. 3A. This printing apparatus includes a carriage 502 capable of moving in a main scanning direction indicated by the arrow x along a guide shaft 501, and an inkjet print head 503 is mounted on the carriage 502. The print head 503 includes four print heads 503C, 503M, 503Y and 503K that eject cyan (C), magenta (M), yellow (Y) and black (K) inks respectively as illustrated in FIG. 3B. On each of the print heads 503C, 503M, 503Y and 503K, multiple nozzles (printing elements) 504 for ejecting ink are arranged so as to form a nozzle array (a printing element array). These nozzle arrays extend in a direction crossing (in this example, orthogonal to) the main scanning direction (arrow x direction). In this example, the nozzles 504 in each of the print heads are arranged so as to form one nozzle array. The number and form of arrangement of the nozzles 504, however, are not limited to this, and may include a configuration including a nozzle array having a same color and different ink ejection amounts, a configuration in which nozzle arrays having a same ink ejection amount form multiple nozzle arrays, or a configuration in which nozzles are arranged in a zigzag manner. In addition, on one print head may be formed nozzle arrays capable of ejecting different inks. Nozzles are configured to eject ink from ejection ports by using an ejection energy generating element. As the ejection energy generating element can be used an electrothermal transducer (heater) or a piezoelectric element, for example.

A sheet P as a print medium is conveyed over a platen 507 in the sub-scanning direction (conveyance direction) indicated by the arrow y by an unillustrated conveyance motor rotating conveyance rollers 505 and another unillustrated roller. A print scan in which the print head 503 ejects ink while moving with the carriage 502 in the main scanning direction and a conveyance action in which the sheet P is conveyed in the sub-scanning direction are repeated, thereby printing an image on the sheet P.

A reading sensor (scanner) 506 reads an inspection target image printed on the sheet P, and multiple reading elements are arranged in a predetermined pitch in the arrow x direction thereon. The reading sensor 506 generates image data corresponding to a read resolution on the basis of output signals from the reading elements. The image data is luminance signals of R (red), G (green), B (blue) or monochrome gray data.

In the following, a detection algorithm of a unique portion according to a basic configuration of the present example will be specifically described in detail. The unique portion includes a defect in a print image, such as defective printing and image degradation. Hereinafter, a detection process for a unique portion will be also referred to as a defect detection process. In the detection algorithm in this example, a print image is imaged, and image processing for extracting a unique portion in the print image from the acquired image data is performed. Although image printing may not be necessarily performed by an inkjet printing apparatus as the multi-function peripheral 6, in the following a case will be explained in which an image printed by the print head of the multi-function peripheral 6 is read by a read head.

Figure 4:
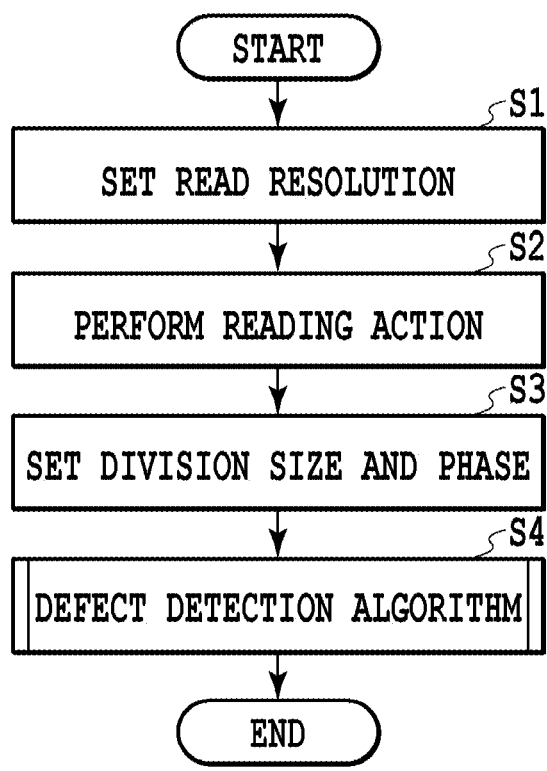
FIG. 4 is a flowchart illustrating basis steps for defect detection according to the first basic configuration of the present invention.

FIG. 4 is a flowchart for explaining a basic process performed by the image processing apparatus 1 of this example. When this process is started, in Step S1, the image processing apparatus 1 sets a read resolution. A specific setting method will be described later. In subsequent Step S2, in accordance with the read resolution set in Step S1, an inspection target image is read. That is, a scanner controller 307 is driven to obtain output signals from the multiple reading elements arranged on a reading sensor 506, and image data corresponding to the read resolution set in Step S1 is generated on the basis of these output signals. In this example, image data is luminance signals of R (red), G (green), and B (blue).

In Step S3, the CPU 301 sets division sizes and phases to be used for a defect extraction process performed in the subsequent Step S4. The definitions of the division size and phase will be described later. In Step S3, at least one type of the division size and phase are set, respectively. In Step 4, on the basis of the division size and phase set in Step S3, the defect detection algorithm is performed on the image data generated in Step S2.

Figure 5:
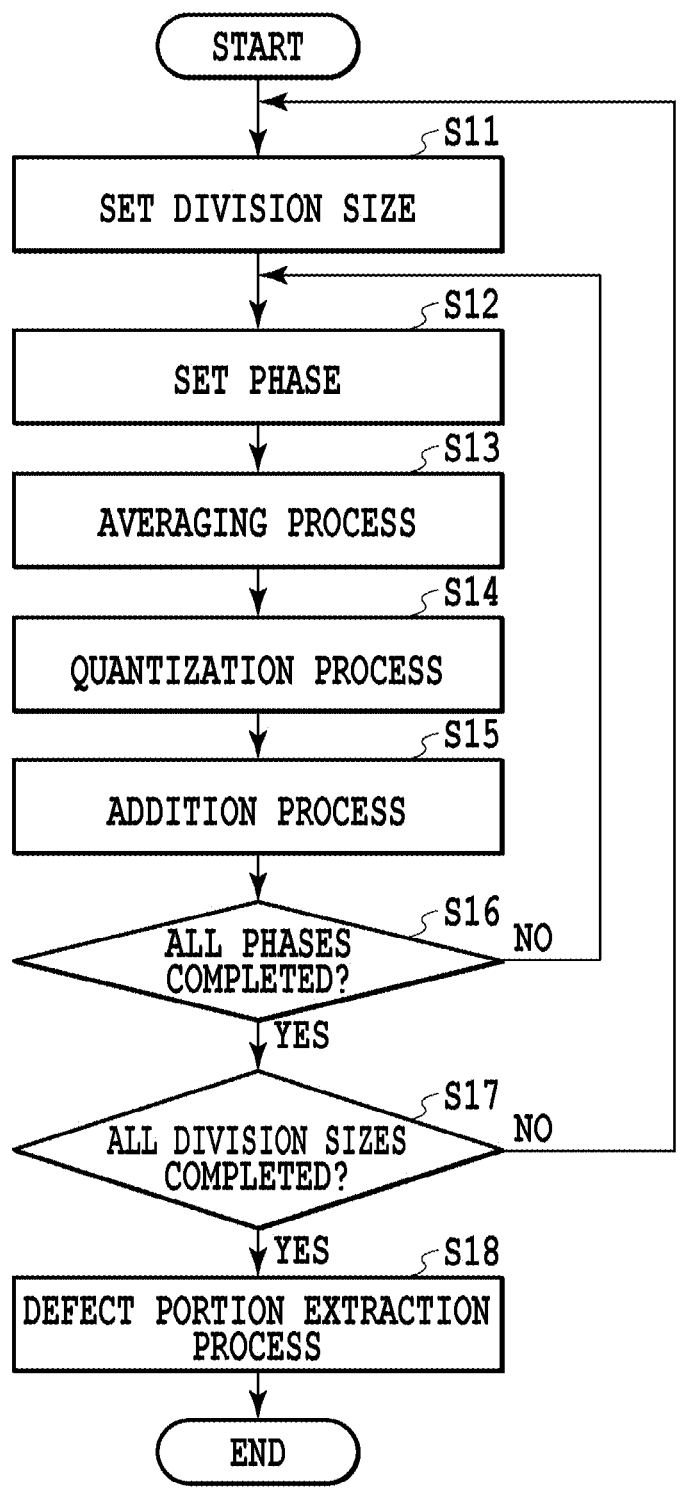
FIG. 5 is a flowchart illustrating a defect detection algorithm according to the first basic configuration of the present invention.

FIG. 5 is a flowchart for explaining steps of the defect detection algorithm performed by the CPU 301 in Step S4. When this process is started, in Step S11, the CPU 301 first sets one division size from the multiple division sizes set in Step 3. Further, in Step S12, one phase is set from the multiple phases set in Step S3. In Step S13, on the basis of the division size set in Step S11 and the phase set in Step S12, the image data acquired in Step S2 is divided and an averaging process is performed on the divided image data.

Figure 6A:
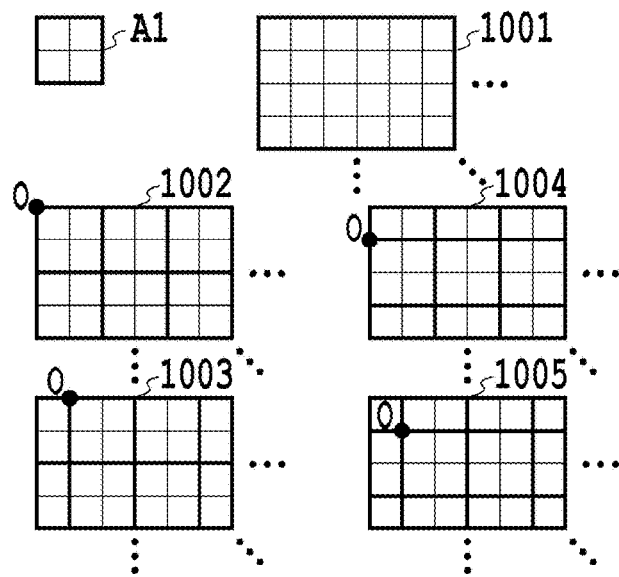
FIGS. 6A to 6C are explanatory diagrams, each illustrating a different division state of image data according to the first basic configuration of the present invention.
Figure 6B:
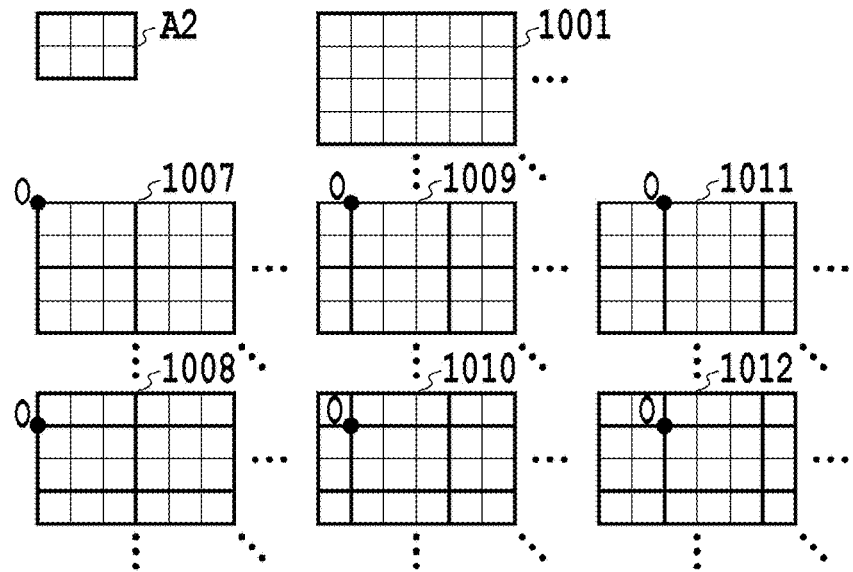
Figure 6C:
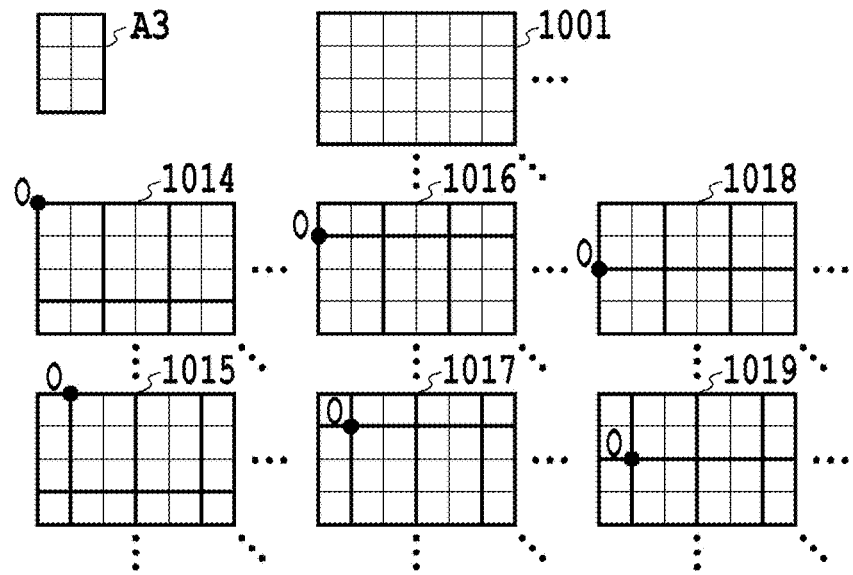

FIGS. 6A to 6C are diagrams for explaining image data division states on the basis of the division sizes and phases. FIG. 6A illustrates the case where the division size is set to 2×2 pixels, FIG. 6B illustrates the case where the division size is set to 3×2 pixels, and FIG. 6C illustrates the case where the division size is set to 2×3 pixels. If the division size A1 is set to 2×2 pixels as in FIG. 6A, then an image data area 1001 is divided on a 2-by-2 pixel basis and can be divided in four ways as indicated by 1002 to 1005, meaning that four types of corresponding phases are present. As described, the phase can be considered as indicating the origin O of a division size in the image data area 1001. If the division size A2 is set to 3×2 pixels as in FIG. 6B, then the image data area 1001 can be divided in six ways as indicated by 1007 to 1012, meaning that six types of phases are present. If the division size A3 is set to 2×3 pixels as in FIG. 6C, then the image data area 1001 can be divided in six ways as indicated by 1014 to 1019, meaning that six types of phases are present.

As a division size is larger, the number of settable phases also is greater. All phases may not be necessarily set for one division size. In Step S3 in FIG. 4, at least some of settable phases have only to be set; and in Step S12 in FIG. 5, one of the phases set in Step S3 has only to be set. The order of the division size setting and the phase setting may be opposite.

Figure 7A:
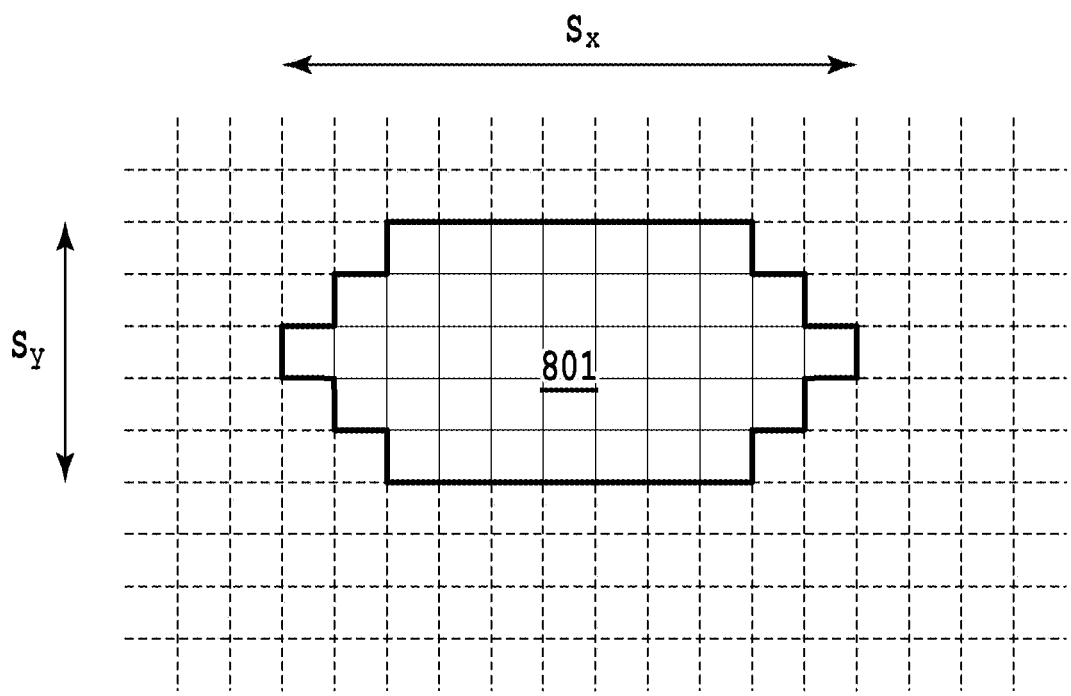
FIGS. 7A and 7B are explanatory diagrams, each illustrating another division state of image data according to the first basic configuration of the present invention.
Figure 7B:
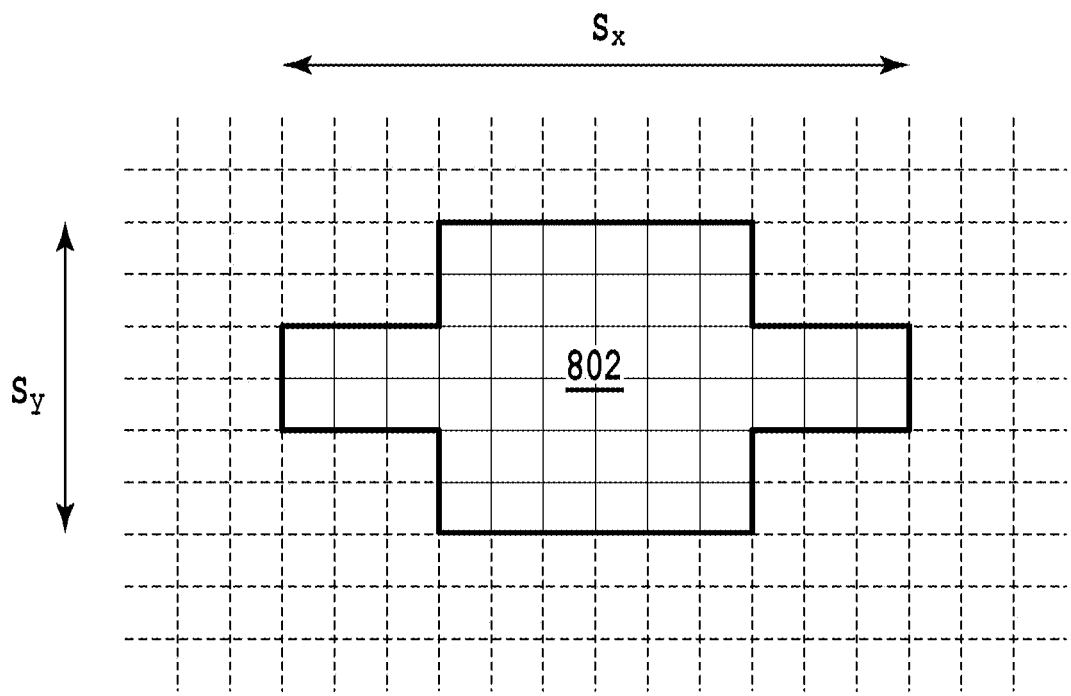

In FIGS. 6A to 6C, the method for dividing image data into squares is explained, but image data may be divided into other shapes than square. FIGS. 7A and 7B illustrate other division shapes. Image data may be divided by the shapes illustrated in FIGS. 7A and 7B. That is, as in FIG. 7A, image data may be divided by a division shape 801 including step-like portions, or as in FIG. 7B, image data may be divided by a division shape 802 including bumps. Image data may be divided by a circle. In short, in dividing image data division shapes are not particularly limited. Image data may be divided by other shapes according to other characteristics of a defect or characteristics of the apparatus.

Returning to FIG. 5, in Step S13, the averaging process is performed on each of the division areas resulting from the division in Step S12. Specifically, for multiple pixels included in the division area, the average value of pieces of luminance data of the respective pixels is found. When doing so, the pieces of luminance data corresponding to the respective pixels may be obtained by directly averaging pieces of RGB luminance data of the respective pixels, or by multiplying the pieces of RGB luminance data respectively by predetermined weighting coefficients and then adding the pieces of weighted data. Further, luminance data of one of RGB colors may be directly used as luminance data of a pixel.

In Step S14, the average value calculated in Step S13 is quantized on a pixel basis. The quantization may be binarization or multivalued quantization into several levels. In doing so, quantized data is obtained in the state where quantized values of respective pixels are uniform within each of the division areas.

In Step S15, the quantized values obtained in Step S14 are added to addition image data. The addition image data refers to image data indicating a result of adding pieces of quantized data obtained when variously changing the division size (Sx, Sy) and phase. If the quantized data obtained in Step S14 is based on the initial division size and the initial phase, the addition image data obtained in Step S15 is the same as the quantized data obtained in Step S14.

In subsequent Step S16, the image processing apparatus 1 determines whether or not all the phases have been processed with respect to a currently set division size. If the image processing apparatus 1 determines that a phase to be processed still remains, the flow returns to Step S12 where the next phase is set. On the other hand, if the image processing apparatus 1 determines that all the phases have been processed, the flow proceeds to Step S17.

FIGS. 8A to 8D and FIGS. 9A to 9I are diagrams schematically illustrating the steps in which the addition process in Step S15 is sequentially performed for all the phases in predetermined division sizes. If the division size (Sx, Sy) is set to 2×2 pixels, four different phases are present. In FIGS. 8A to 8D, in the process of sequentially changing the four different phases, the number of times of using luminance data of a neighboring pixel in order to perform the addition process of a target pixel Px is indicated on a pixel basis. If the division size (Sx, Sy) is set to 3×3 pixels, nine different phases are present. In FIGS. 9A to 9I, in the process of sequentially changing the nine different phases, the number of times of using luminance data of a neighboring pixel in order to perform the addition process of a target pixel Px is indicated on a pixel basis.

Figure 8A:
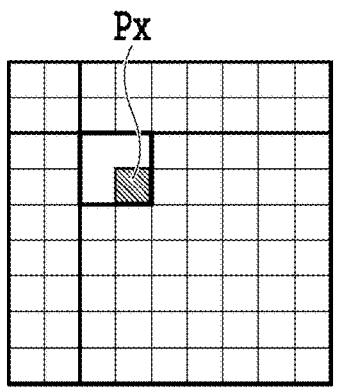
FIGS. 8A to 8E are explanatory diagrams illustrating an addition process in a division size of 2×2 pixels according to the first basic configuration of the present invention.
Figure 8A:
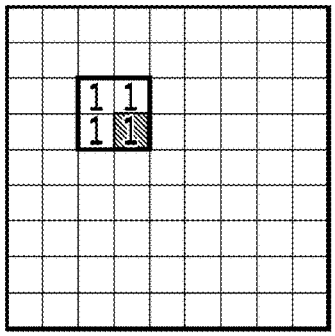
Figure 8B:
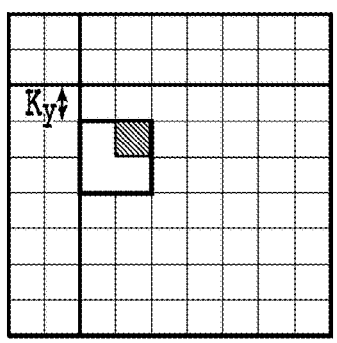
Figure 8B:
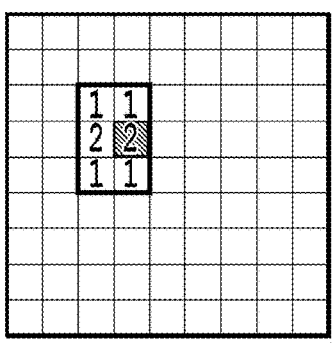
Figure 8C:
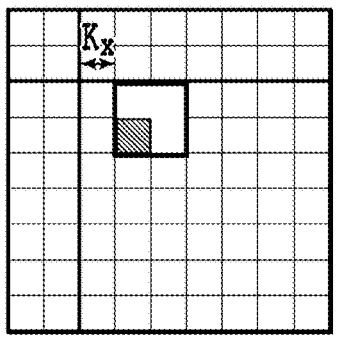
Figure 8C:
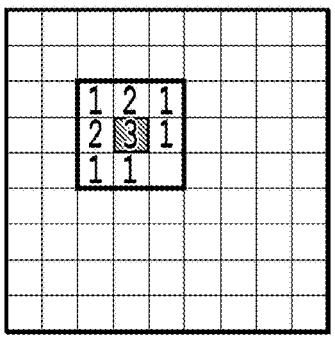
Figure 8D:
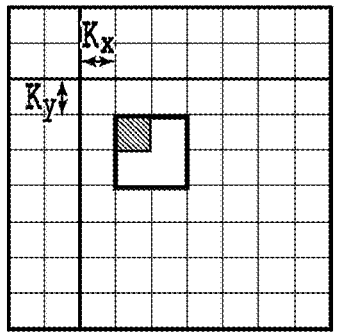
Figure 8D:
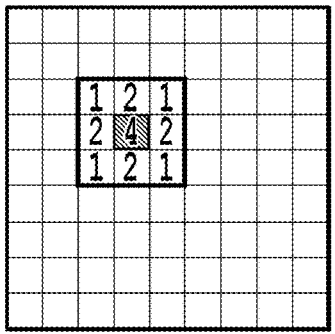
Figure 9A:
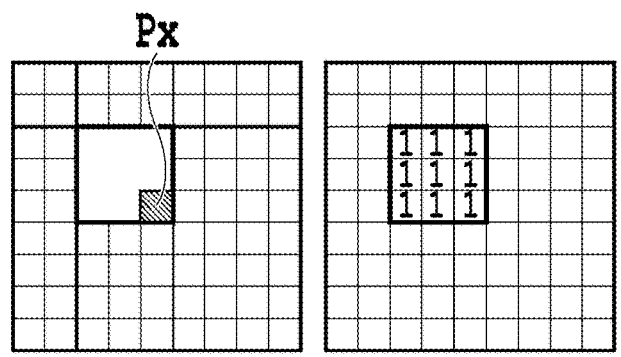
FIGS. 9A to 9J are explanatory diagrams illustrating an addition process in a division size of 3×3 pixels according to the first basic configuration of the present invention.
Figure 9B:
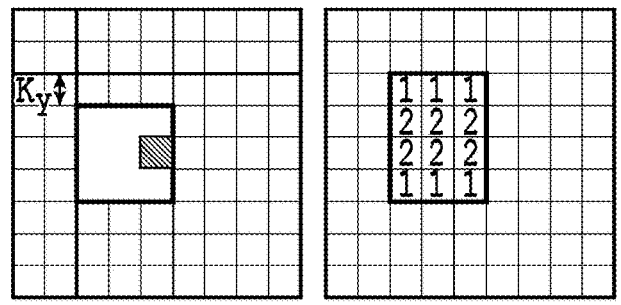
Figure 9C:
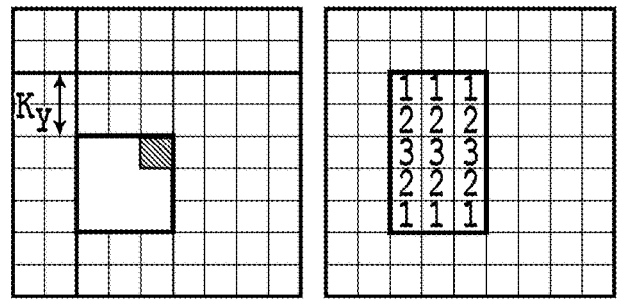
Figure 9D:
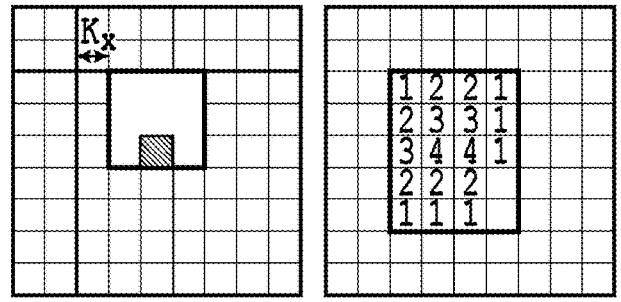
Figure 9E:
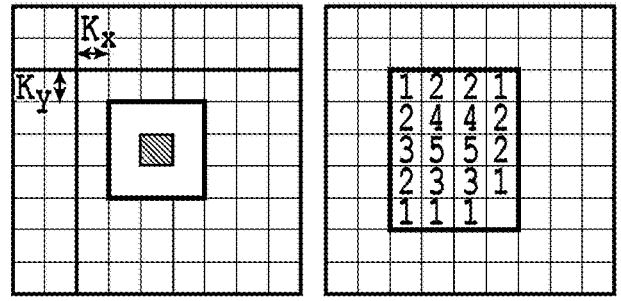
Figure 9F:
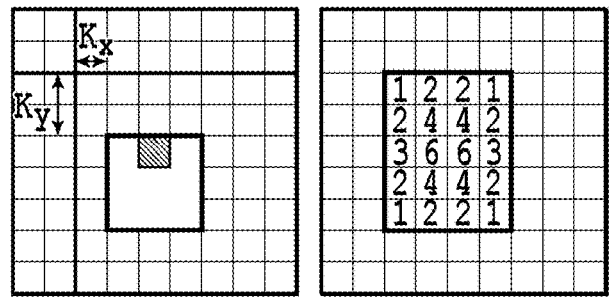
Figure 9G:
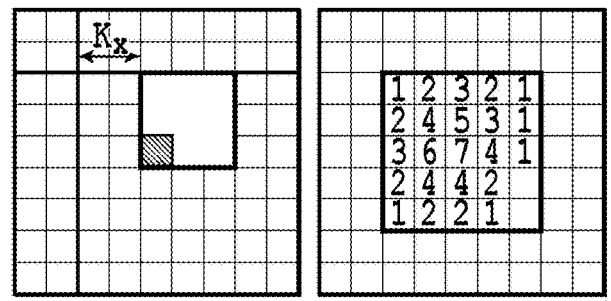
Figure 9H:
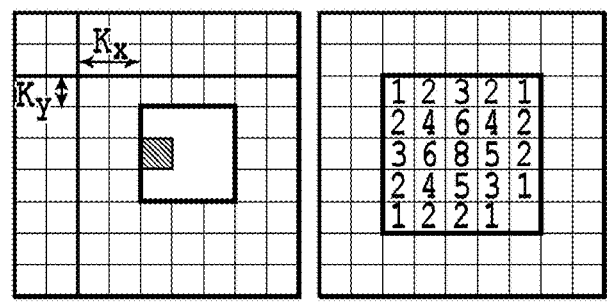
Figure 9I:
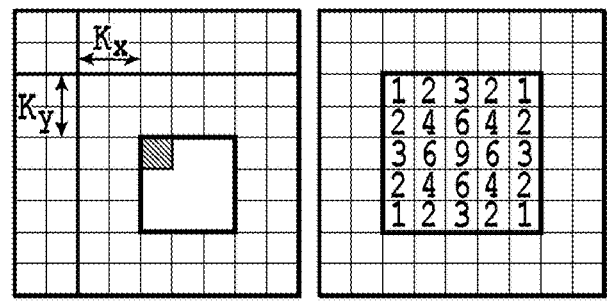

FIGS. 8A and 9A illustrate initial states (initial phases) in which a shift amount (Kx, Ky) is (0, 0). FIGS. 8B to 8D illustrate the states obtained by changing the phase from the initial phase in FIG. 8A. FIGS. 9B to 9I illustrate the states obtained by changing the phase from the initial phase in FIG. 9A. FIGS. 8B and 9B illustrate the phases shifted by one pixel in the y direction, whose shift amount (Kx, Ky) is (0, 1). FIG. 8C and FIG. 9D illustrate the phases shifted by one pixel in the x direction, whose shift amount (Kx, Ky) is (1, 0). FIG. 8D and FIG. 9E illustrate the phases shifted by one pixel in both of the x and y directions, whose shift amount (Kx, Ky) is (1, 1). FIG. 9C illustrates the phase whose shift amount (Kx, Ky) is (0, 2). FIG. 9F illustrates the phase whose shift amount (Kx, Ky) is (1, 2). FIG. 9G illustrates the phase whose shift amount (Kx, Ky) is (2, 0). FIG. 9H illustrates the phase whose shift amount (Kx, Ky) is (2, 1). FIG. 9I is the phase whose shift amount (Kx, Ky) is (2, 2).

Figure 8E:
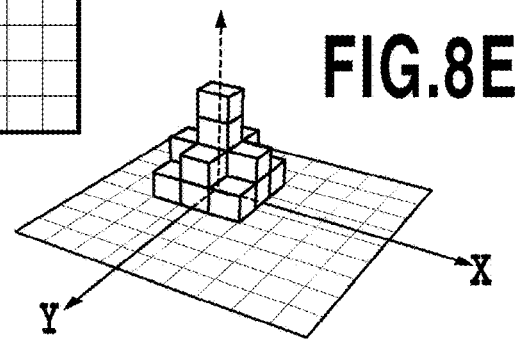
Figure 9J:
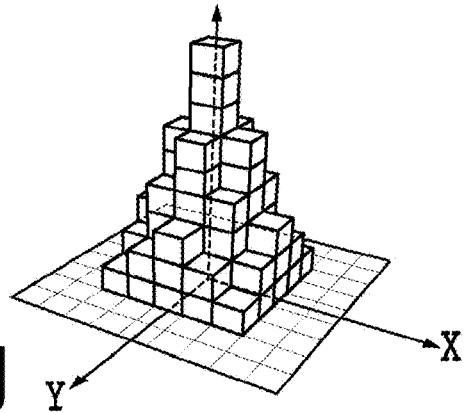

In any of FIGS. 8B to 8D and 9B to 9I, since the target pixel Px is used for all the phases in which the target pixel Px is included in a division area, the target pixel Px has the largest number of additions and has the largest contribution to the addition result. A pixel more distant from the target pixel Px has the smaller number of additions, and has a smaller contribution to the addition result. That is, by changing the phase, ultimately a result is obtained such that a filtering process is performed with the target pixel as the center, as illustrated in FIGS. 8E and 9J.

Returning to the flowchart in FIG. 5, in Step S17 the image processing apparatus 1 determines whether or not all the division sizes set in Step S3 in FIG. 4 have been processed. If the image processing apparatus 1 determines that a division size to be processed still remains, the flow returns to Step S11 where the next division size is set. This repetition of the process using multiple types of division sizes can cancel periodicity hidden behind an image, making a defect portion (unique portion) apparent. On the other hand, if the image processing apparatus 1 determines that all the division sizes have been processed, the flow proceeds to Step S18.

In Step S18, the defect portion (unique portion) extraction process is performed on the basis of currently obtained addition image data. In this process, a portion where a variation in signal value is large in comparison with pieces of its surrounding luminance data is extract as a defect portion. The extraction process is not particularly limited to this, and a publicly known determination process can be used. This process ends here.

The defect detection algorithm described with FIG. 5 calculates addition data on the basis of the average values of all pixels included in division areas that shift around the target pixel Px as described with FIGS. 8A to 8E and FIGS. 9A to 9J. For this reason, a target pixel positioned in an end part of print image data may not be properly processed because the division area includes an area where no data is present. In order to deal with such a situation, in this example, dummy image data is preliminarily attached around inspection target image data.

Figure 10C:
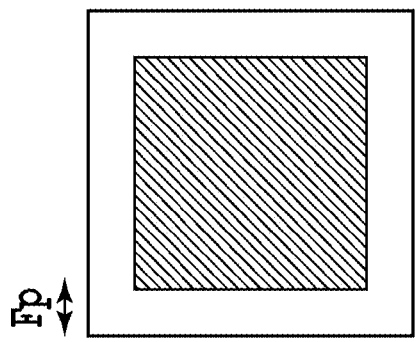
FIGS. 10A to 10C are explanatory diagrams illustrating a method for generating dummy data according to the first basic configuration of the present invention.
Figure 10B:
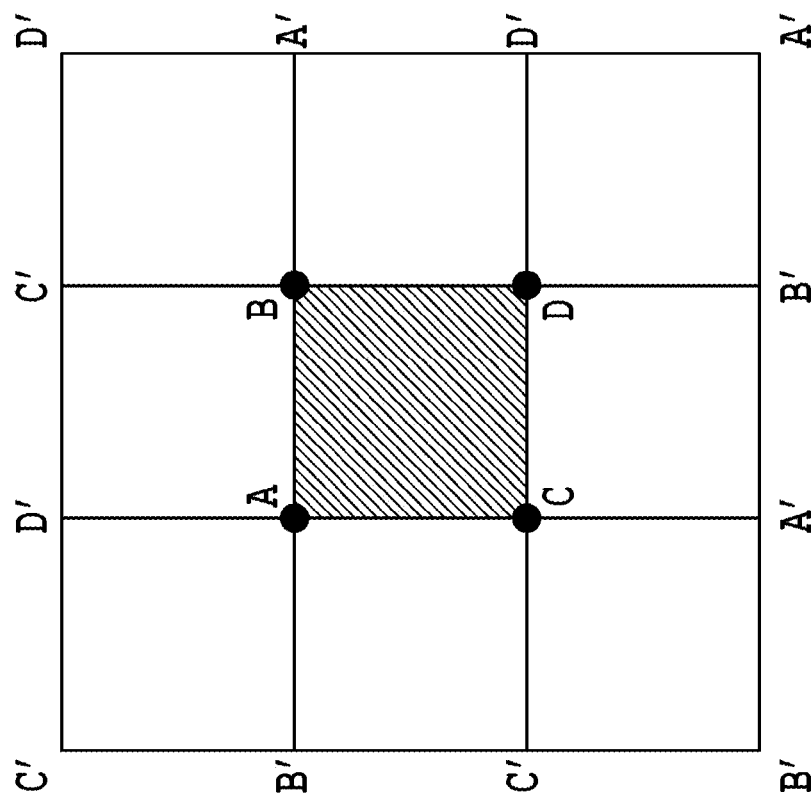
Figure 10A:
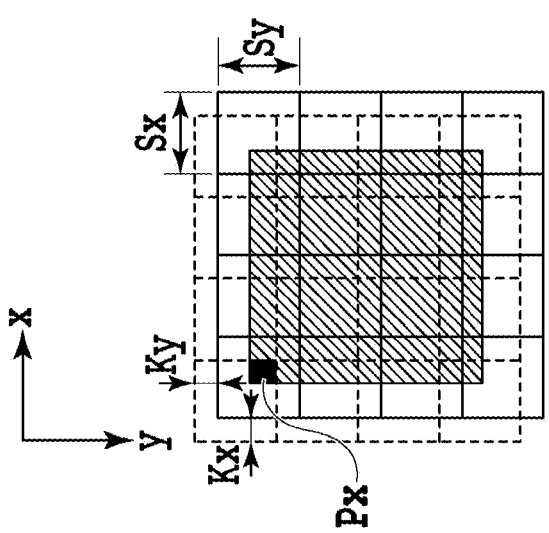

FIGS. 10A to 10C are diagrams for explaining a method for generating dummy data. In the diagrams, an area corresponding to the inspection target image data is indicated as a shaded area. As illustrated in FIG. 10A, if a target pixel Px indicated in black is positioned at a corner of an inspection target area, both of a division area (solid line) around the target pixel Px, and a division area (dashed line) whose phase has been shifted from the division area (solid line) include areas (white areas) where no data is present. For this reason, in this example, dummy data is generated such that even when the maximum division size and the maximum shift distance are employed with respect to the target pixel Px, appropriate data is present in any pixel included in any division area.

FIG. 10B is a diagram illustrating the method for generating dummy data. Four images obtained by inverting inspection target image data point-symmetrically with respect to apices A, B, C, and D, respectively, and four images obtained by inverting the inspection target image data line-symmetrically with respect to sides AB, BD, CD, and AC, respectively, are generated, and these eight images surround the inspection target image data. Note that the maximum division size and the maximum shift distance in the defect detection algorithm are represented by (Sxm, Sym) and (Kxm, and Kym), respectively. In this case, the dummy data is only required to be generated in an area that is extended from the four edges of the inspection target image data by Fp={(Sxm/2)+Kxm} in the x direction and by Fq={(Sym/2)+Kym} in the y direction. FIG. 10C illustrates the inspection target image data that is added with the dummy data in this manner.

As a sixth embodiment, which will be described later, when inspection target image data is generated using the Gaussian filter, Fp and Fq defining the size of dummy data are given as Fp=INT(Fxm/2), and Fq=INT(Fym/2). Here, Fxm and Fym represent x and y components, respectively, of the maximum Gaussian filter size F used in the defect detection algorithm.

When the defect portion extraction process is performed on a portion of print image data, in some cases dummy data may not be added to the inspection target image data. If a target pixel is not positioned in an edge part of the print image data, dummy data may not be generated.

Information on a defect portion (unique portion) extracted in accordance with the above algorithm can be used later for various applications. For example, in defect inspection of an image acquired by photographing a product, the extracted defect portion can be displayed as a popup in order to make the defect portion easily determinable by an inspector. In this case, the inspector can check the defect portion on the basis of the image displayed as a popup, and repair a product corresponding to defect portion or eliminate such a product as a defective product. Such an image defect inspection is considered to be performed in order to inspect a print state of a printing apparatus when the printing apparatus is developed, manufactured, or used. The information on the defect portion can also be stored for use in another system.

Further, a device having a self-correcting function of a defect to a normal state can be configured to be able to use the information on the defect portion for a correction process. For example, when an area where the luminance is higher or lower as compared with surrounding areas is extracted, an image processing parameter for correction can be prepared for the area. In addition, it is also possible to detect whether or not ejection failure occurs in the inkjet printing apparatus, and perform a maintenance action on the print head for a printing element at a relevant position.

In any case, since with the above defect detection algorithm a defect portion is extracted on the basis of adding results obtained by variously changing the division size and the phase, a substantial defect can be made apparent while appropriately suppressing noise caused by each read pixel.

First Embodiment

In the above first basic configuration, as in FIG. 5, a predetermined number of processing target division sizes and phases are preliminarily set, and averaging, quantization and addition processes are performed on these target division sizes and phases. In this embodiment, a large number of division sizes and phases, including division sizes and phases that are not to be processed, are set, the averaging process is performed on all of these target division sizes and phases, and the results of the averaging process are stored as candidates for the addition and quantization processes. Later, from the stored candidates are selected as targets for the addition and quantization processes.

Figure 11:
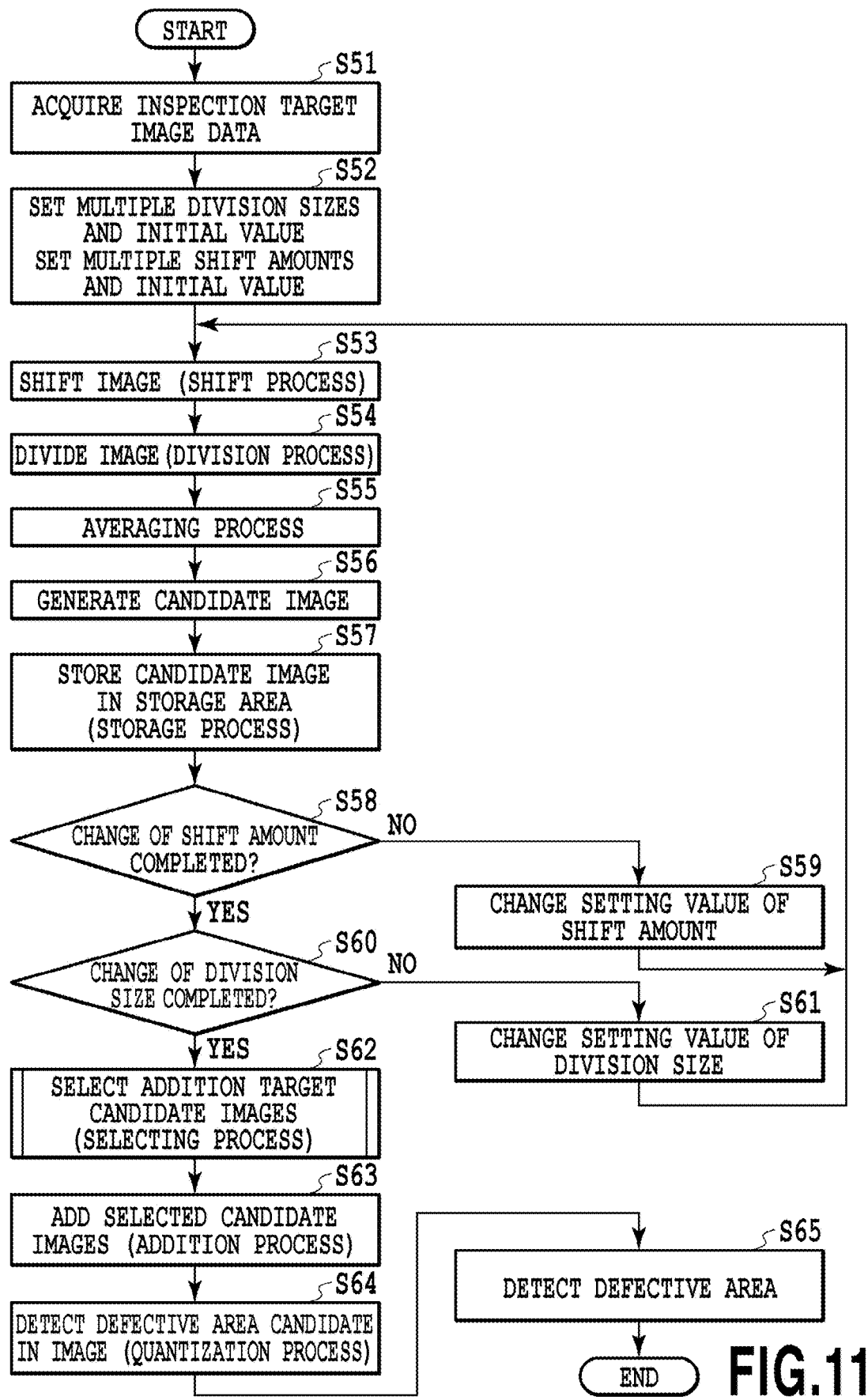
FIG. 11 is a flowchart for explaining an image processing method according to a first embodiment of the present invention.

FIG. 11 is a flowchart for explaining an inspection method of an image defective area by the inspection unit 308 in FIG. 2.

First, inspection target image data is acquired (Step S51), and multiple division sizes for dividing the image data into multiple areas and their initial values, as well as multiple shift amounts for shifting these division sizes and their initial values are set (Step S52). The multiple division sizes, shift amounts, and their respective initial values may be preliminarily set in the RAM 312, or optionally set from the host PC 1. As the inspection target image data, for example, an RGB image acquired by reading a print image by a scanner of the printing apparatus may be used on a plane basis. Alternatively, at least one piece of image data in which values corresponding to the luminance and density are calculated from the RGB data may be used. In the inspection method below, for simplicity of explanation, a one-plane image corresponding to the luminance will be used. A method for acquiring inspection target image data is not limited to the method using a scanner, and inspection target image data may be obtained using an imaging device such as a digital camera.

Next, in accordance with the initial value of the shift amount set in Step S52, respective pixels in an inspection target image represented by the image data are shifted (shift process) (Step S53). Further, in accordance with the initial value of the division size set in Step S52, the shifted inspection target image is divided (division process) (Step S54). After that, an average luminance value for each division area, for example, is calculated by performing the averaging process on each division area (Step S55), and candidate image data (hereinafter also referred to as "candidate image"), which is a candidate for the quantization and addition processes, is generated using the resulting average value (Step S56).

The shift process in Step S53 is the same as the process of shifting the image data area 1001 as in FIGS. 6A to 6C, and whose shift amount is K (Kx, Ky) as in FIGS. 8A to 8E. The division process in Step S54 is the same as the process of dividing the image data area 1001 in accordance with division sizes A1, A2 and A3 as in FIGS. 6A to 6C, and whose division size is S (Sx, Sy) as in FIGS. 10A to 10C. As described above, FIGS. 9A and 10A illustrate a division area (initial phase) whose shift amount (Kx, Ky) is an initial value (0, 0). The division area of an image data area may have any shape as described above. The division area may have the shape illustrated in FIGS. 7A, 7B or have a polygonal or circular shape.

The averaging process in Step S55 is the process of calculating an average value of pixel values in each division area, as described above. In this embodiment, this average value is used to generate a candidate image (Step S56), which is stored in a storage area such as a RAM (Step S57). Methods for generating the candidate image include a method of replacing all the pixel values of the division area with the average value, or a method of adjusting a size of a candidate image in accordance with the number of division areas. In generating the candidate image, an intermediate value of pixel values of a division image may be used instead of using an average value of pixel values of a division area. The candidate image generated by dividing into multiple areas corresponds to an image obtained by lowering resolution of an input inspection target image. This lowering of resolution of an image makes it easier to observe the image from a broader perspective and detect a unique portion different from a normal portion in the image. Further, shifting a division area can make a unique portion around the division area more apparent.

As described above, with a set value of a division size being fixed to the initial value, the process from Steps S53 to S58 is repeated while a set value of a shift amount is changed from the initial value set in Step S52 to a final value (Steps S58 and S59). After the shift amount is changed to the final value, the set value of the division size is changed to a second value that was set in Step S52 and is next to the initial value (Steps S60, S61). Then, the second value is fixed as the set value of the division size, the process from Steps S53 to S58 is repeated while the set value of the shift amount is changed from the initial value set in Step S52 to the final value (Steps S58 and S59). A large number of resulting candidate images are stored that correspond to sets of the division sizes and shift amounts.

Then, in Step S62, plural candidate images for addition are selected from the stored candidate images. A method for the selection will be described later. In the subsequent Step S63, the selected candidate images are added (addition process). For example, if six images are selected for addition as illustrated in FIGS. 12A to 12F, these six images are added. Sets of the shift amounts (Kx, Ky) and division sizes (Sx, Sy) of these six images are as follows, and the a to f correspond to FIGS. 12A to 12F, respectively.

a: (Kx, Ky)=(0, 0), (Sx, Sy)=(2, 2)
b: (Kx, Ky)=(0, 1), (Sx, Sy)=(2, 2)
c: (Kx, Ky)=(1, 0), (Sx, Sy)=(2, 2)
d: (Kx, Ky)=(0, 0), (Sx, Sy)=(3, 3)
e: (Kx, Ky)=(0, 1), (Sx, Sy)=(3, 3)
f: (Kx, Ky)=(1, 0), (Sx, Sy)=(3, 3)

Figure 12A:
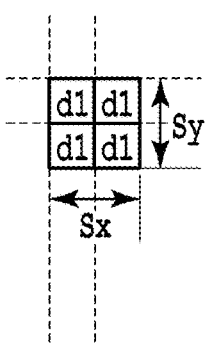
FIGS. 12A to 12F are explanatory diagrams illustrating division sizes and shift amounts in the image processing method illustrated in FIG. 11.
Figure 12B:
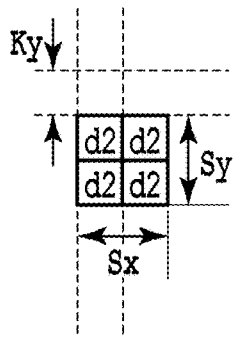
Figure 12C:
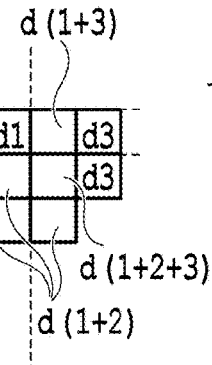
Figure 12D:
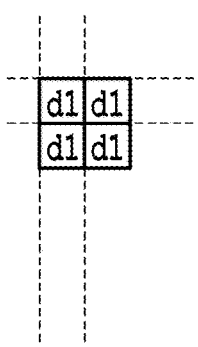
Figure 12E:
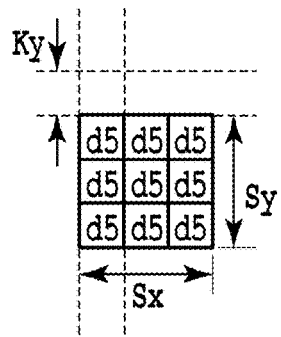
Figure 12F:
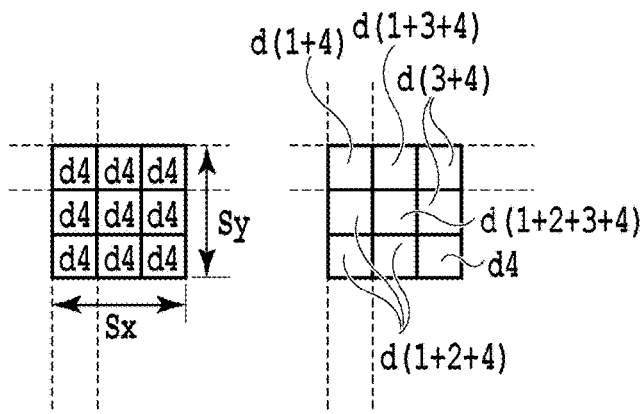

Four pixels within the division area (2×2 pixels) in FIG. 12A can be replaced with an average value d1 of pixel values thereof. Similarly, four pixels within the division area in FIG. 12B can be replaced with an average value d2 of pixel values thereof; and four pixels within the division area in FIG. 12C can be replaced with an average value d3 of pixel values thereof. These average values are added on a pixel basis. As a result, as illustrated in FIG. 12C, a pixel whose pixel value is d1, a pixel whose pixel value is d(1+2) obtained by adding d2 to the average value d1, a pixel whose pixel value is d(1+3) obtained by adding d3 to the average value d1, and a pixel whose pixel value is d(1+2+3) obtained by adding d2 and d3 to the average value d1 are generated. After that, similarly, average values d4, d5, and d6 in FIGS. 12D to 12F, respectively, are added sequentially on a pixel basis.

In Step S64, by performing the quantization process on the pixel values obtained by this addition process, candidate pixels for an image defective area are detected. For example, the pixel values are quantized to two or three values or more on the basis of results of comparing pixel values with an arbitrary threshold value, and thereby the pixels are divided into candidate pixels of a defective area and other pixels. Then, in Step S65, from the candidate pixels of the defective area are detected pixels of the defective area that affect the image quality of the print image. Methods for the detection include a method of performing template matching on an area in the inspection target image that corresponds to candidate pixels of the defective area thereby to detect the shape of the defective area and the degree of the defect.

The shift process in Step S53 and the division process in Step S54 may be performed in the opposite order. The quantization process in Step S64 may be performed prior to the addition process in Step S63. The quantization process in Step S64 may be performed prior to the storage process in Step S57.

(Example 1 of Setting Division Size and Phase)

As described above, in Step S62 in FIG. 11, candidate images for addition are selected. Sets of division sizes and shift amounts of the candidate images are set in accordance with contrasts of defective areas in an image. In the following, an example 1 of setting these parameters will be described.

Figure 13B:
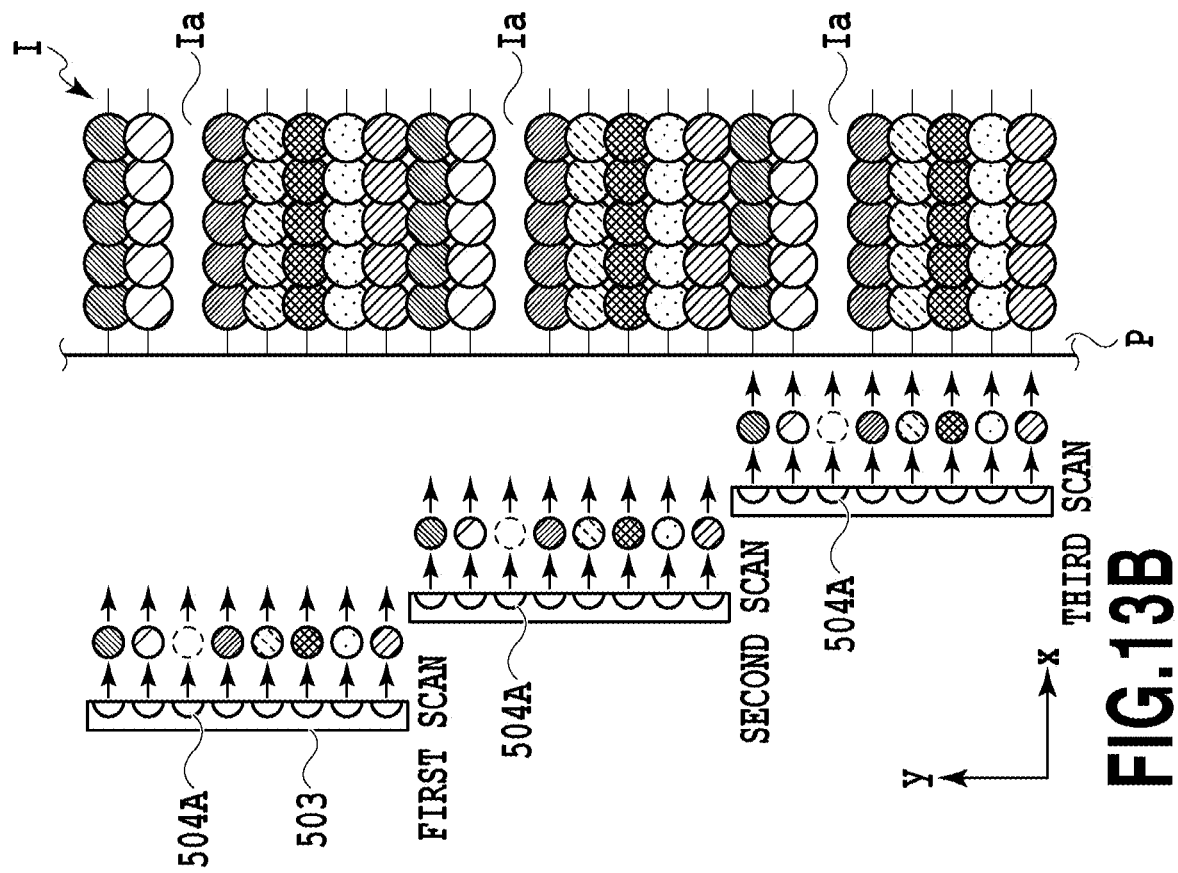
FIGS. 13A and 13B are explanatory diagrams illustrating assumed defective areas in an image according to the first embodiment of the present invention.
Figure 13A:
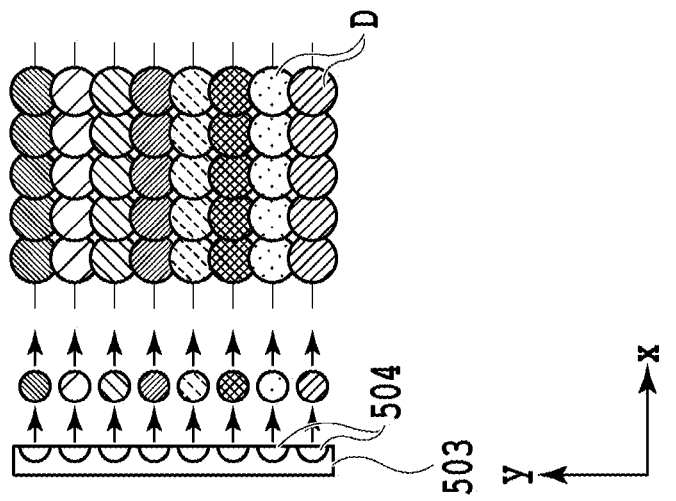

As a defect portion (unique portion) in a print image, a stripe-like defect due to ink ejection failure in a print head may occur. FIGS. 13A and 13B are explanatory diagrams illustrating a case where ink ejection failure occurs in the print head 503 of the serial-scan type inkjet printing apparatus as in illustrated in FIGS. 3A and 3B.

FIG. 13A is the explanatory diagram illustrating a case where all nozzles 504 of the nozzle array in the print head 503 normally eject ink. Ink ejected from these nozzles form dots D on the sheet P. FIG. 13B is the explanatory diagram illustrating a case where ink ejection failure occurs in a nozzle 504A. In this example, an image I is printed by a single pass printing method in which a single scan of the print head 503 in the arrow y direction and conveyance of the sheet P by the length matching the length of the nozzle array in the arrow y direction are repeated. Ejection failure of the nozzle 504A causes stripe-like defects (white stripes) Ia at the corresponding positions in the image I.

Figure 14A:
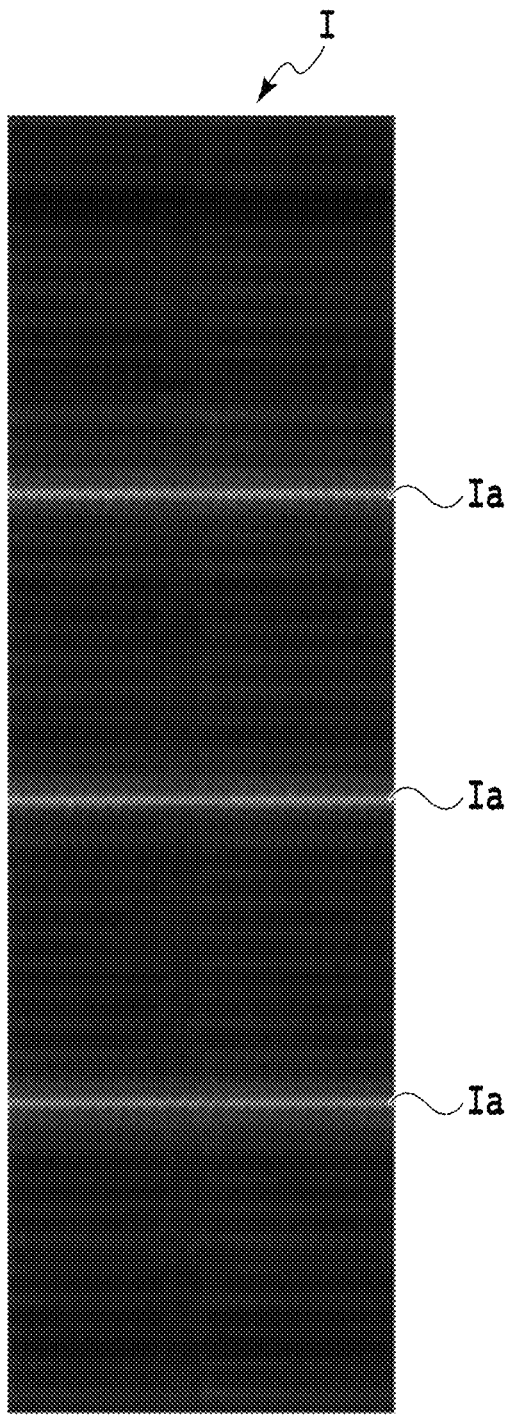
FIGS. 14A and 14B are explanatory diagrams illustrating inspection images according to the first embodiment of the present invention.
Figure 14B:
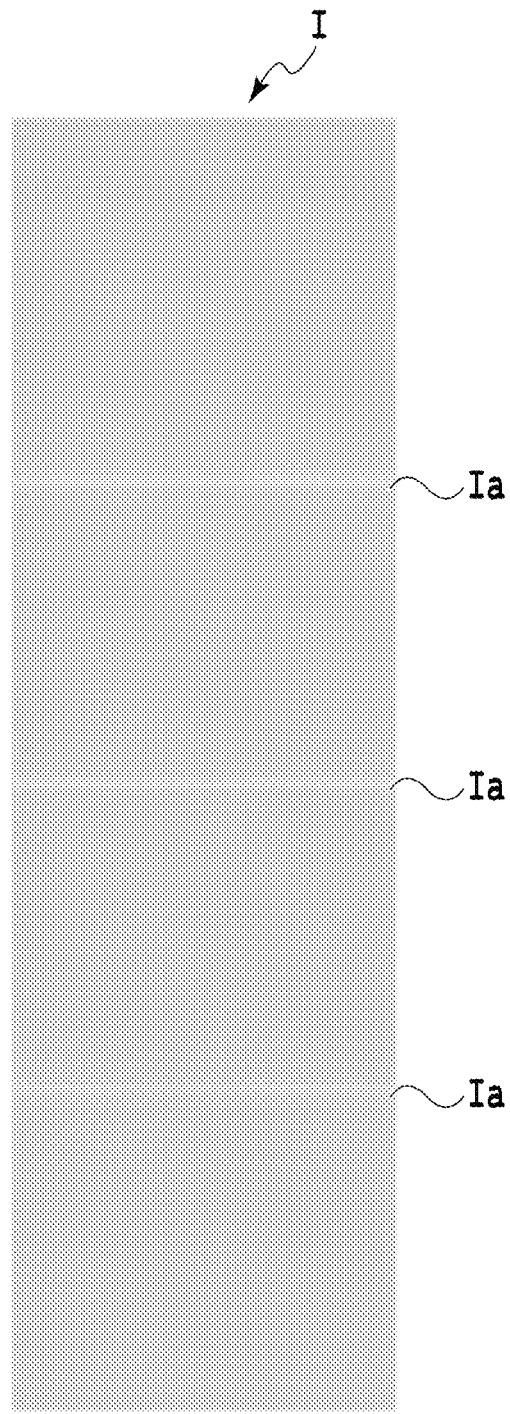

FIG. 14A is an explanatory diagram illustrating a case where the white stripes Ia occur in a black area in the image I. FIG. 14B is an explanatory diagram illustrating a case where the white stripes Ia occur in an yellow area in the image I. AS obvious from comparison of these Figs., the contrast of the white stripes Ia relative to the black area is higher than the contrast of the white stripes relative to the yellow area. FIGS. 15A to 15E are explanatory diagrams illustrating the results of performing the above detection process in FIG. 11 on read data of the image I in FIG. 14A. In these Figs., light portions are detected as image defects. Similarly, FIGS. 15F to 15J are explanatory diagrams illustrating the results of performing the above detection process in FIG. 11 on read data of the image I in FIG. 14B, and light portions are detected as image defects.

Figure 15E:
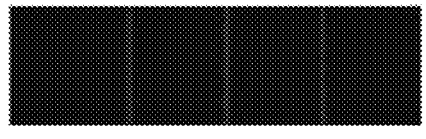
FIGS. 15A to 15J are explanatory diagrams illustrating processing results of inspection images according to the first embodiment of the present invention.
Figure 15D:
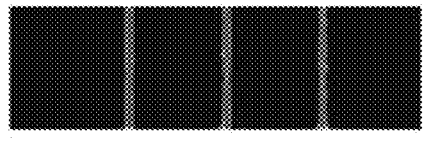
Figure 15C:
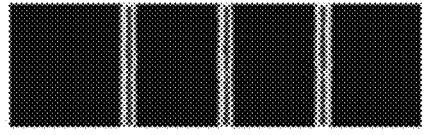
Figure 15B:
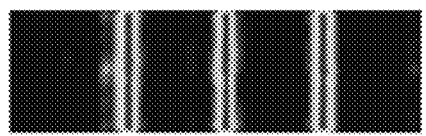
Figure 15A:
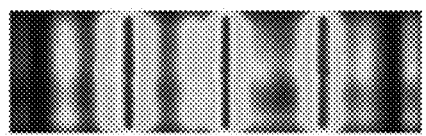
Figure 15J:
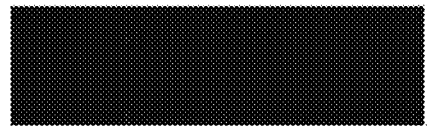
Figure 15I:
Figure 15H:
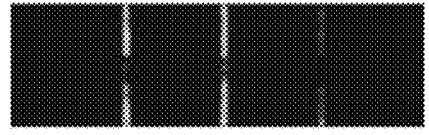

In the above examples in FIGS. 12A to 12F, six sets of division sizes (Sx, Sy) and shift amounts (Kx, Ky) are selected and the addition process is performed. In FIGS. 15A and 15F, two sets of division sizes (Sx, Sy) and shift amounts (Kx, Ky) are selected and the addition process is performed. Similarly, four sets are selected in FIGS. 15B and 15G, eight sets in FIGS. 15C and 15H, 16 sets in FIGS. 15D and 15I, and 32 sets in FIGS. 15E and 15J. Accordingly, in FIGS. 15A and 15F, addition image data is calculated by addition of two average values. Similarly, four average values added in FIGS. 15B and 15G, eight average values are added in FIGS. 15C and 15H, 16 average values are added in FIGS. 15D and 15I, and 32 average value are added in FIGS. 15E and 15J.

Figure 15G:
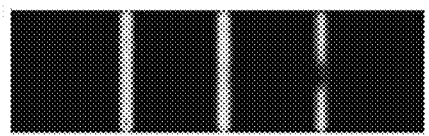
Figure 15F:
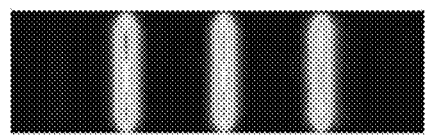

In the yellow area where the white stripes (defective areas) Ia have a low contrast as illustrated in FIG. 14B, if the number of additions of average values (the number of sets of division sizes (Sx, Sy) and shift amounts (Kx, Ky)) is small as illustrated in FIGS. 15F and 15G, detection of the white stripes Ia is difficult. However, as illustrated in FIGS. 15H, 15I, and 15J, increasing the number of additions of average values can improve the detection accuracy of the white stripes Ia. On the other hand, in the black area where the white stripes Ia have a high contrast, even if the number of additions of average values are low as illustrated in FIGS. 15B and 15C, the white stripes Ia can be detected. On the contrary, if the number of additions is too large, areas other than the white stripes Ia might be false-detected as white stripes as illustrated in FIG. 15E.

Therefore, the number of sets of division sizes (Sx, Sy) and shift amounts (Kx, Ky) is set in accordance with the degree of contrast of a defective area relative to an image. That is, as Expression 1 below, the number of sets Nl of division sizes (Sx, Sy) and shift amounts (Kx, Ky) in a low contrast area such as the yellow area is set to be higher than the number of sets Nh in a high contrast area such as the black area.

$$Nl > Nh \qquad \text{Expression 1}$$

(Example 2 of Setting Division Size and Phase)

Areas where sets of division sizes (Sx, Sy) and shift amounts (Kx, Ky) (parameters for improving the detection accuracy of an image defective portion) are made to be different are not limited to the yellow area and black area in an image.

Figure 16:
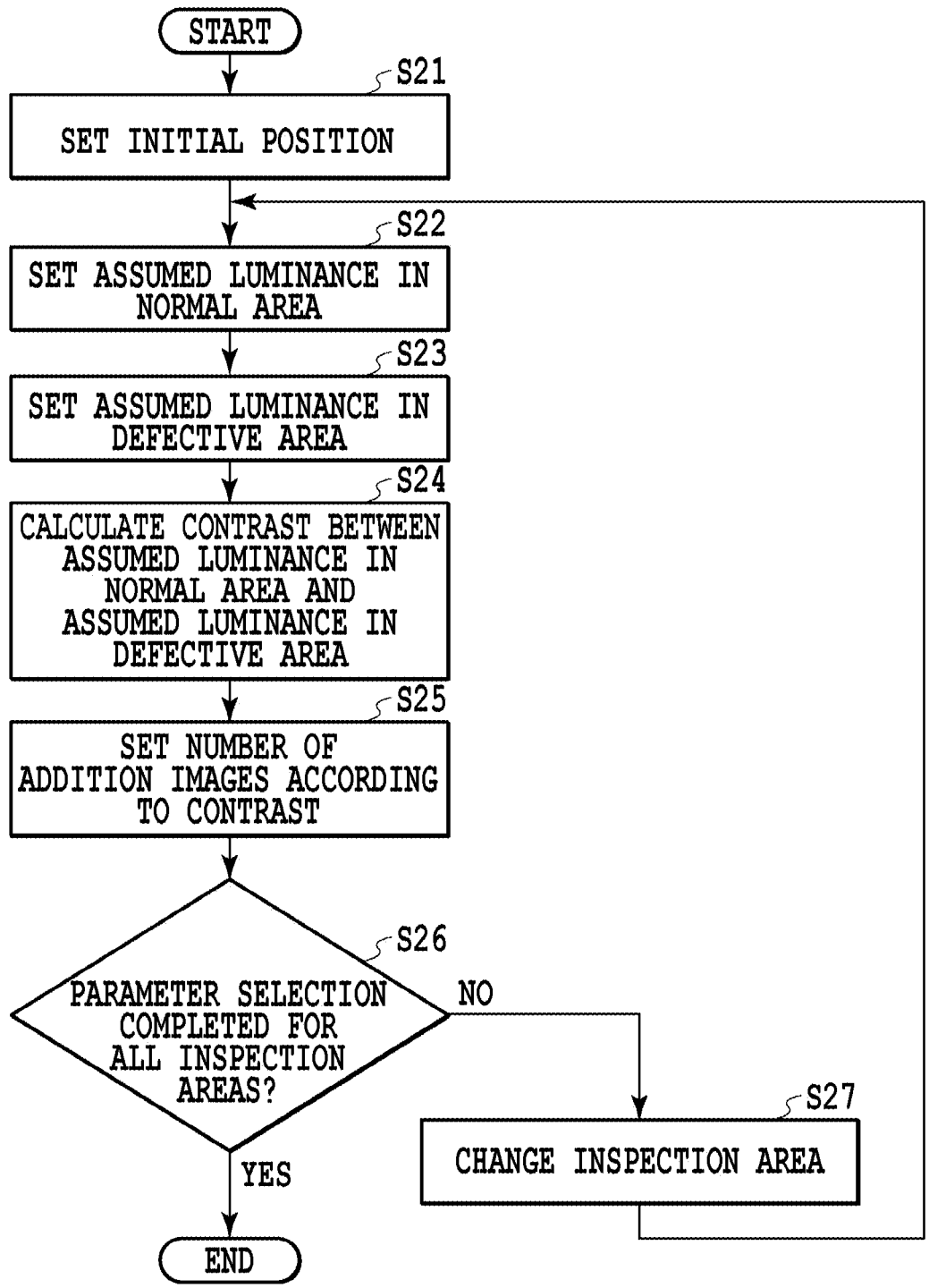
FIG. 16 is a flowchart for explaining a selecting process illustrated in FIG. 11.

FIG. 16 is a flowchart for explaining a setting process of such sets of division sizes (Sx, Sy) and shift amounts (Kx, Ky) (hereinafter also referred to as "parameters") in Step S62 in FIG. 11. In this example, on the basis of RGB signals entered into the printing apparatus, parameters are set for detecting white stripes due to ink ejection failure.

First, in Step S21, an initial position of an area for which a set of parameters is selected is set. For example, inspection target image data is divided into, for example, 9×9 pixel areas, and a 9×9 pixel area at the upper left of the inspection target area is set to be the initial position. In the subsequent Step S22, an assumed luminance in normal time in the 9×9 pixel areas (luminance in a normal area) is set. The assumed luminance in the normal area is preliminarily stored in the ROM 313. For example, as illustrated in FIG. 17, data obtained by performing colorimetry on a Lab of a 33×33 grid patch corresponding to an RGB signal value is stored. An RGB signal value obtained by a scanner reading a 33×33 grid patch corresponding to the RGB signal value is converted to luminance data using, for example, the following Expression 2, and the converted data may be stored.

$$L^* = 0.3R + 0.6G + 0.1B \qquad \text{Expression 2}$$

Figure 18A:
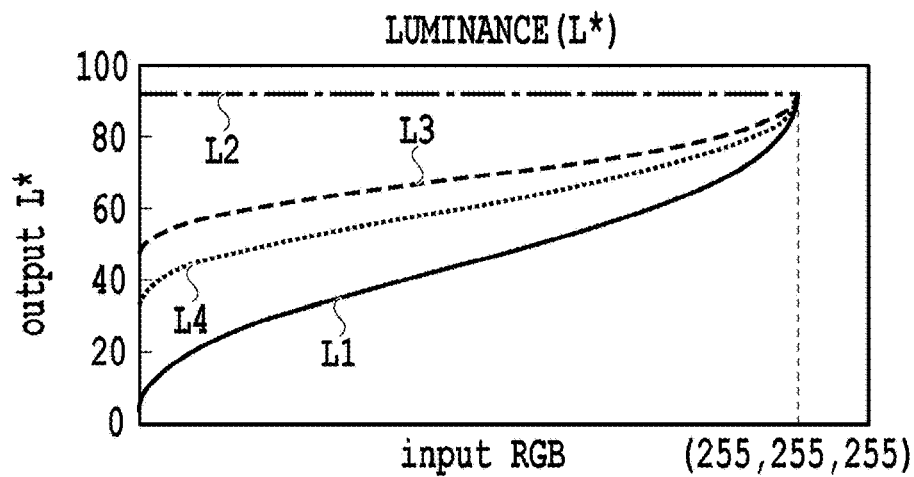
FIGS. 18A to 18C are explanatory diagrams illustrating examples of data used in the first embodiment of the present invention.

In FIG. 18A, a vertical axis indicates an output luminance L, and a horizontal axis indicates input RGB signal values. As a curve L1, the output luminance L varies with the input RGB signal values. The rightmost of the horizontal axis indicates an input RGB signal value whose output luminance is the highest, i.e. (R, G, B)=(255, 255, 255) and at this point the output luminance L is the luminance of the sheet P itself, (L*=92, 33).

In the subsequent Step S23, an assumed luminance of white stripes (white stripe area luminance) due to ink ejection failure is set. This assumed luminance is preliminarily stored in a ROM 213. The line L2 in FIG. 18A is one example of the assumed luminance of the white stripe stored in the ROM 313. In the printing method in this example (single pass printing), even if a white stripe due to ink ejection failure occurs in an area having any input RGB signal value, the luminance of the white stripe equals to the luminance of the sheet P itself (L*=92, 33).

Figure 18B:
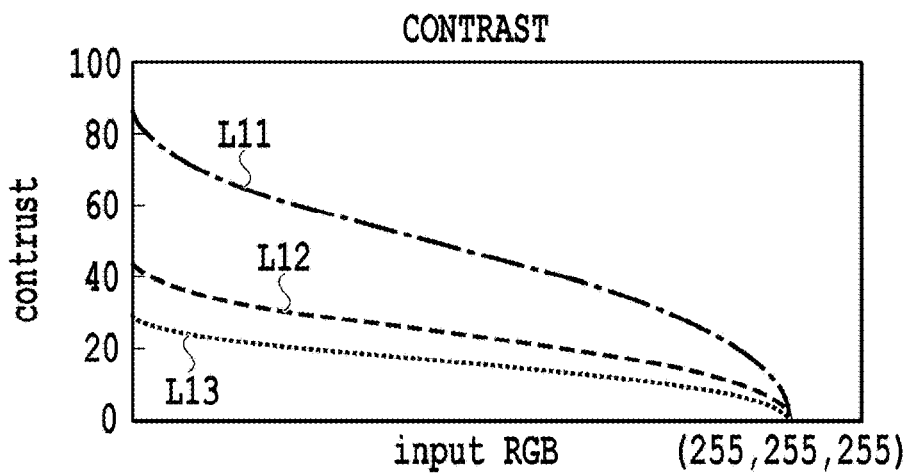

In the subsequent Step S24, on the basis of the luminance of the normal area and the luminance of the white stripe area (defective area), the contrast between these two areas is calculated. The line L11 in FIG. 18B indicates the contrast corresponding to a difference between the luminance on the line L1 and the luminance on the line L2 in FIG. 18A. That is, the line L11 indicates the contrast between the luminance in the normal area assumed for each input RGB signal value and the luminance in the white stripe area. The luminance corresponding to the line L1 and the luminance corresponding to the line L2 may not be stored in the ROM 213. Only data of the line L11 corresponding to the difference in luminance between the two lines may be stored.

Figure 18C:
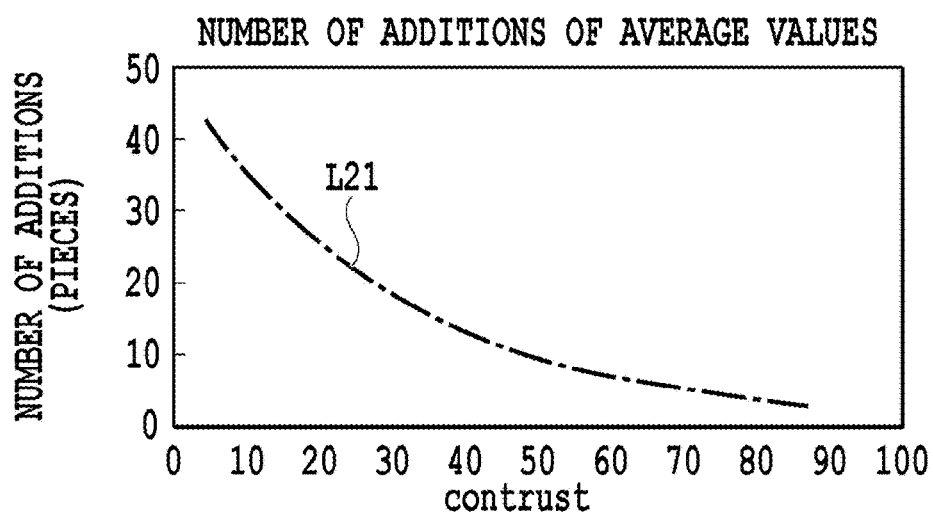

In the subsequent Step S25, on the basis of the contrast calculated in Step S24, the number of candidate images for addition as described above, i.e., the number of images whose average values are added (the number of addition images) is set. The line L21 in FIG. 18C indicates one example of the number of addition images set on the basis of the contrast. As shown, as the contrast between the normal area and the defective area is smaller, the number of additions is increased, thereby precisely detecting a defective area such as a white stripe in accordance with the contrast. The number of addition images corresponds to the number of sets of division sizes (Sx, Sy) and shift amounts (Kx, Ky), as described above.

In Step S62 in FIG. 11, on the basis of the number of addition images set in Step S25 as described above, sets of division sizes (Sx, Sy) and shift amounts (Kx, Ky) (parameters) are selected. The parameters are selected taking into consideration the size of a defective area such as a white stripe and periodicity of its occurrence. For example, since a high-contrast defective area can be detected even if the number of additions is small, then parameters are selected in accordance with the size and periodicity of the defective area. If the number of additions is too large, a normal area might be detected as a defective area as illustrated in FIG. 15E. On the other hand, in order to detect a low-contrast defective area, the number of additions needs to be increased. For this reason, it is desirable to combine optimal parameters for the size and periodicity of the defective area with a set of a larger division size (Sx, Sy) and a greater shift amount (Kx, Ky). This can improve visibility of the low-contrast defective area.

In the subsequent Step S26, it is determined whether or not parameters have been selected for all the inspection target areas. If not, in Step S27 an inspection target is changed to the next area (in this example, 9×9 pixels), and the flow returns to Step S22. If parameters have been selected for all the inspection target areas, the process in FIG. 17 ends here.

The printing apparatus in FIGS. 3A and 3B ejects, on the basis of input RGB signal values, four color inks cyan (C), magenta (M), yellow (Y), black (K) from the multiple nozzle arrays of the print head 503, thereby printing a color image. In this case, the contrast of a white stripe varies depending on which nozzle array has ink ejection failure. In such a case, by storing white stripe contrasts assumed when ink ejection failure occurs in respective nozzle arrays, the detection accuracy of white stripes can be improved even if any nozzle array has ink ejection failure.

The luminance (the line L1 in FIG. 18A) of the normal area printed by the printing apparatus and the luminance of the sheet P itself (the line L2 in FIG. 18A) vary depending on the type of the sheet P. Accordingly, it is desirable to store the assumed luminance of the normal area and the assumed luminance of the defective area in accordance with the type of the sheet P in the ROM 213. Detection results of defective areas are displayed on the display 306 of the host PC 1 through the data transfer I/F 310.

In this embodiment, a large number of division sizes and phases, including division sizes and phases that are not to be processed, are set, the averaging process is performed on all of the set division sizes and phases, the results of the averaging process are stored as target candidates for the addition and quantization processes, and after that, from the stored target candidates are selected targets for the addition process. However, as with the first basic configuration described with FIGS. 1A to 10C, predetermined numbers of processing target division sizes and shift amounts may be preliminarily set, on which the averaging, quantization and addition processes may be performed. In this case, the processing target division sizes and shift amounts may be set according to the contrast of a defective area in an image.

Second Embodiment

In the above first embodiment, if the contrast between the normal area and the defective area is different in accordance with input RGB signal values in the single pass printing method, the number of addition images is set in accordance with the contrast. Then, in accordance with the set number of addition images, a set of division sizes (Sx, Sy) and shift amounts (Kx, Ky) (parameters) is selected. This embodiment selects parameters in a multi-pass printing method as with the above single pass printing method.

As a serial scan-type printing apparatus in this embodiment, a printing apparatus having the same mechanical structure as that of the above embodiment can be used. In multi-pass printing, the print head 503 are divided into multiple regions, and one or more scans using a same divided region or different divided regions of the print head 503 print an image on a same area on the sheet P. Such multi-pass printing can reduce variations in landing position on the sheet P of ink ejected from the print head 503, as well as quality degradation of a print image due to variations in ink ejection amount.

Figure 19:
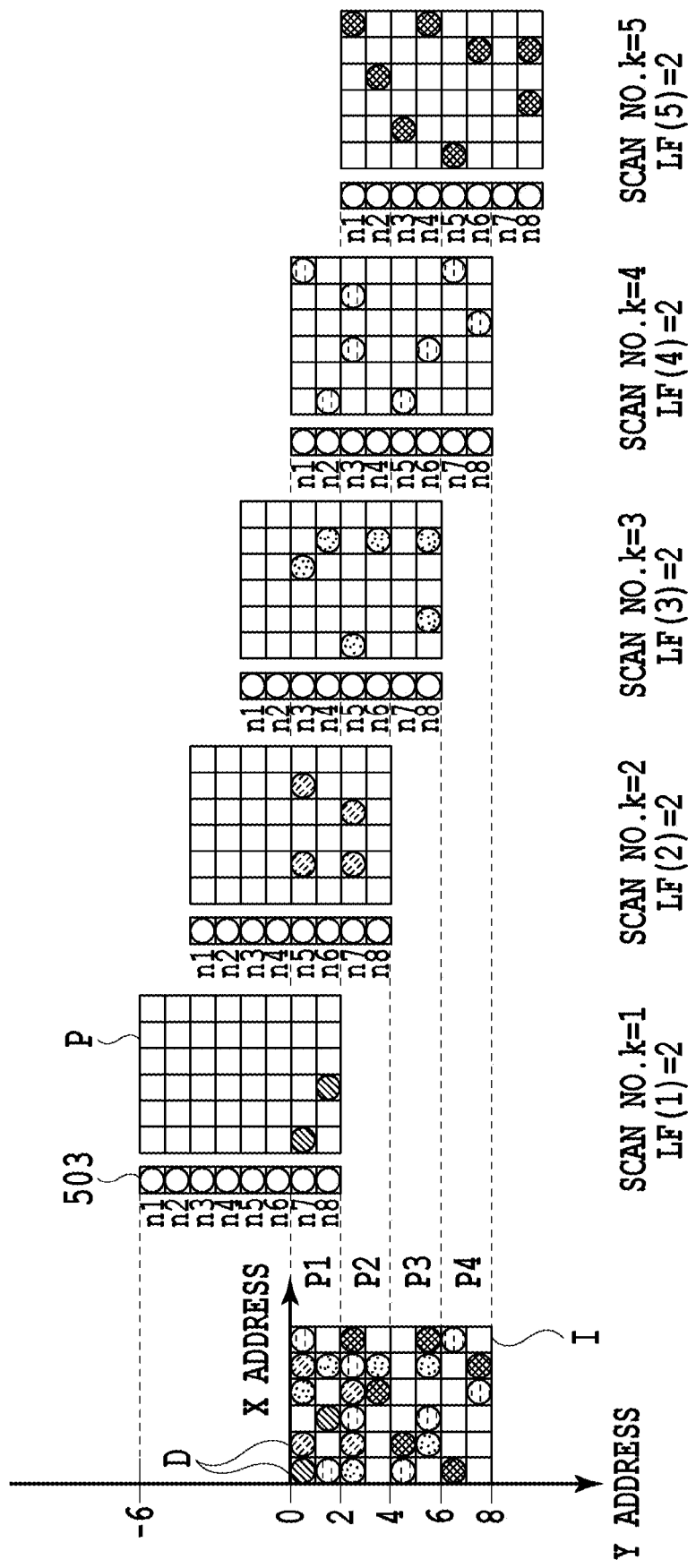
FIG. 19 is an explanatory diagram illustrating a printing method according to a second embodiment of the present invention.

FIG. 19 is an explanatory diagram illustrating actions of the print head 503 and the sheet P in multi-pass printing. For simplicity of explanation, the number of nozzles provided in the print head is eight (nozzle Nos. n1 to n8). The multi-pass printing method in FIG. 19 is a four-pass printing method in which a final image I is printed by the print head 503 scanning four times on a predetermined area of the sheet P. The sheet P is conveyed by a distance corresponding to two nozzles, i.e., by two addresses in Y address of the image. The print area P1 of the final image I is printed by first to fourth scans (scan Nos. k=1, 2, 3, 4). That is, the print area P1 is printed by nozzles n7, n8 in the first scan, nozzles n5, n6 in the second scan, nozzles n3, n4 in the third scan, and nozzles n1, n2 in the fourth scan. The sheet P is conveyed by 2 addresses between the scans by the print head 503 (LF(1)=2, LF(2)=2, LF(3)=2, LF(4)=2, LF(5)=2). In the respective scans, arrangements of ink dots D formed on the sheet P can be determined in various methods. For example, the method may be used in which input image data is converted to ink amount data, the converted ink amount data is quantized to determine a dot arrangement, and the determined dot arrangement is divided to respective scans using masks. Alternatively, for each ink density printed in each scan, ink amount data may be preliminarily divided and the divided ink amount data may be quantized.

In such multi-pass printing, if, for example, ejection failure occurs in one nozzle, then the luminance of a white stripe is lower than the luminance of the sheet P itself since other nozzles eject ink on a same X address. In FIG. 18A, the line L3 indicates the luminance of a white stripe in a two pass printing method, and the line L4 indicates the luminance of a white stripe in a three pass printing method. The luminance of the both white stripes is lower than the luminance of the white stripe (line L2) in the single pass printing method. The line L12 in FIG. 18B indicates the contrast corresponding to a difference between the luminance on the line L3 and the luminance on the line L2 in FIG. 18A. That is, this line L12 indicates the contrast between the assumed luminance in the normal area for each input RGB signal value and the luminance in the white stripe area in the two pass printing method. The line L13 in FIG. 18B indicates the contrast corresponding to a difference between the luminance on the line L4 and the luminance on the line L2 in FIG. 18A. That is, this line L13 indicates the contrast between the luminance in the normal area assumed for each input RGB signal value and the luminance in the white stripe area in the three pass printing method. As the number of printing passes is greater, the contrast of the white stripe is lower.

As with the single pass printing method, in the multi-pass printing method, the luminance corresponding to each of the lines L2, L3, L4 may be stored in the ROM 213, or only data on the lines L12, L13 each corresponding to a difference (contrast) in luminance may be stored. And, as with the single pass printing method, by referring to an unillustrated line corresponding to the line L21 in FIG. 18C, the number of additions corresponding to the contrast is set. This enables a white stripe (defective area) to be detected with high accuracy in the multi-pass printing method, as with in the single pass printing method. The detection results of white stripes are displayed on the display 306 of the host PC 1 through the data transfer I/F 310.

In this embodiment, a large number of division sizes and phases, including division sizes and phases that are not to be processed, are set, the averaging process is performed on all of the set division sizes and phases, the results of the averaging process are stored as candidates for the addition and quantization processes, and after that, from the stored candidates are selected targets for the addition process. However, as with the first basic configuration in the above FIGS. 1A to 10C, predetermined numbers of processing target division sizes and shift amounts may be set, on which the averaging, addition and quantization processes may be performed. In this case, the processing target division sizes and shift amounts may be set in accordance with the contrast of an image defective area.

Third Embodiment

In the above first and second embodiments, the detection process is performed in accordance with a contrast of a white stripe (defective area). In this embodiment, a multi-detection process is performed in accordance with a size of a defective area.

Figure 20A:
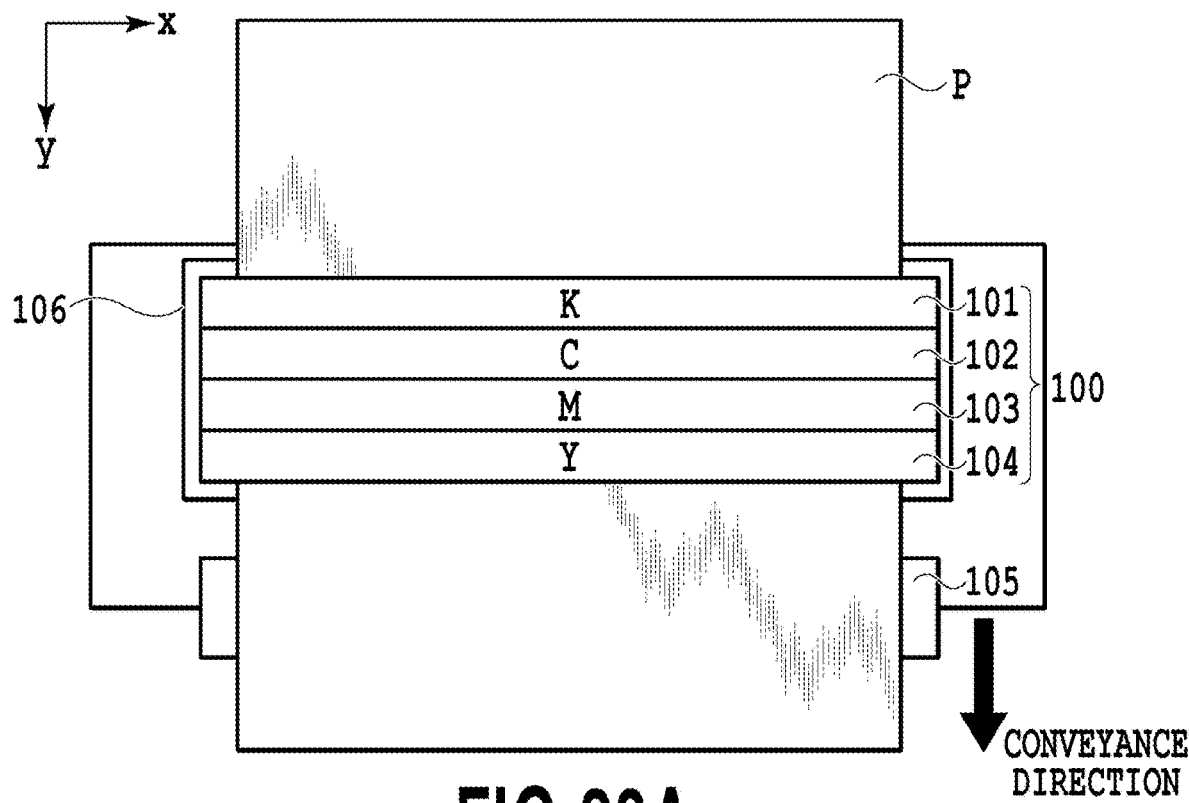
FIGS. 20A and 20B are explanatory diagrams illustrating a printing apparatus according to a third embodiment of the present invention.

A printing apparatus in this embodiment is a full-line type printing apparatus as illustrated in FIG. 20A. In this printing apparatus, a print head 100 and a read head are arranged in parallel. The print head 100 and read head have the same width as that of the sheet P that may be a print medium and an inspection object. The print head 100 is provided with four printing element arrays 101 to 104 ejecting black (K), cyan (c), magenta (M), yellow (y) inks, respectively. These printing element arrays 101 to 104 extend in the direction crossing (in this example, orthogonal to) the conveyance direction (y direction) of the sheet P, and are arranged in parallel such that they are at slightly different positions in the conveyance direction.

In printing, the sheet P is conveyed in the conveyance direction indicated by the arrow y at a predetermined speed along with the rotation of a conveyance roller 105, and during the conveyance, the printing by the print head 100 is performed. The sheet P is supported from below by a flat plate-shaped platen 106 at a position where the printing by the print head 100 is performed, which maintains a distance between the sheet P and the print head 100, and the smoothness of the sheet P.

Figure 20B:
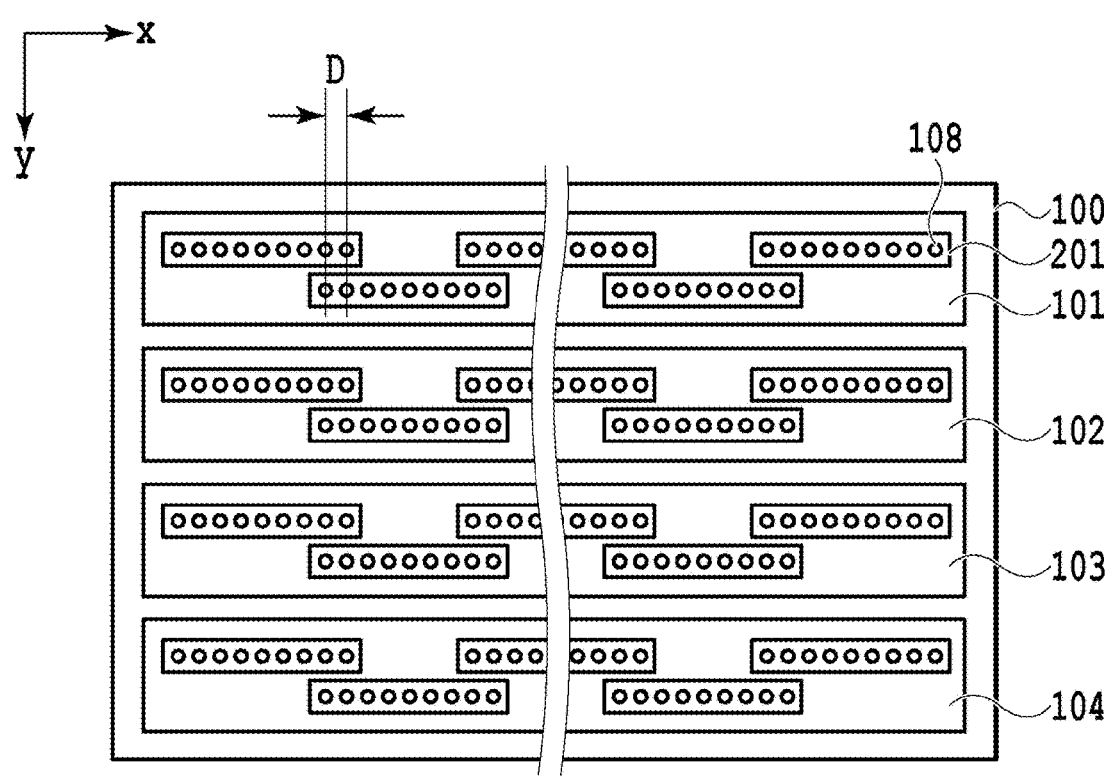

FIG. 20B is a diagram illustrating the array configuration of the printing elements in the print head 100. In the print head 100, each of the printing element arrays 101 to 104 corresponding to the respective ink colors, is composed of multiple printing element substrates (head chips) 201 on which multiple printing elements 108 are arrayed at constant pitches. These printing elements 108 compose nozzles. The printing element substrates 201 are arranged continuously in the x direction and alternately in the y direction while providing overlap regions D. The respective printing elements 108 eject ink at a constant frequency on the basis of print data onto the sheet P being conveyed in the y direction at a constant speed, and thereby an image is printed on the sheet P at a resolution corresponding to the array pitch of the printing elements 108. The print head may have a form in which multiple inks are ejected from one print head, or may have a form in which different print heads are configured for respective ink colors, and these print heads may be combined. Further, the print head may have a form in which printing element arrays corresponding to multiple color inks are arrayed on one printing element substrate.

In the above first and second embodiments, the inspection unit 308 is incorporated in an inkjet printing apparatus that can be used as the multi-function peripheral 6 as illustrated in FIG. 2. However, the inspection unit 308 may be incorporated into a different apparatus than the printing apparatus.

Figure 21A:
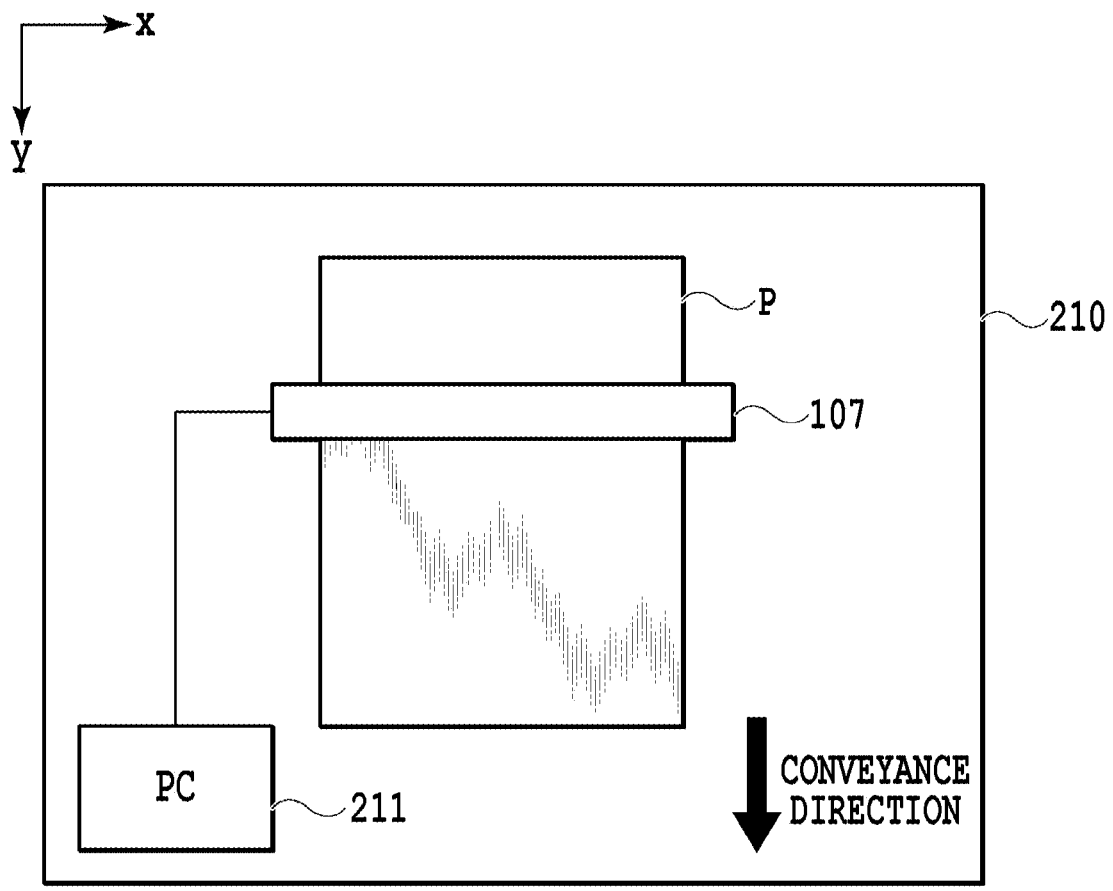
FIGS. 21A and 21B are explanatory diagrams illustrating an inspection apparatus according to the third embodiment of the present invention.
Figure 21B:
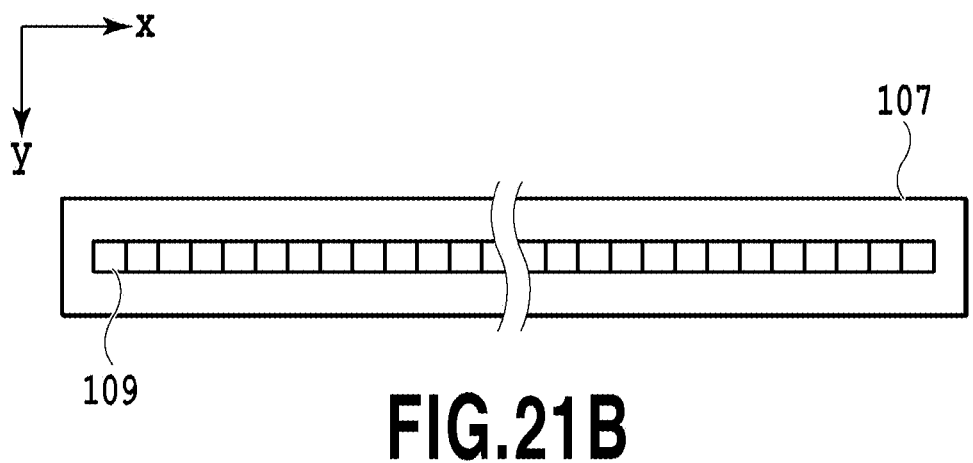

FIG. 21A illustrates an inspection apparatus 210 independent from the printing apparatus. The inspection apparatus 210 includes a read head (scanner) 107 and a PC 211, and functions as the inspection unit 308. In the read head 107, multiple reading sensors 109 are arrayed in the x direction at a predetermined pitch, as illustrated in FIG. 21B in order to read a print image. Further, on each reading sensor 109, unillustrated multiple reading elements that may be the minimum unit of read pixels are arrayed in the x direction. The reading elements of the respective reading sensors 109 image at a predetermined frequency an image on a sheet P being conveyed by an unillustrated conveyance mechanism in the y direction at a constant speed, and thereby the whole image printed on the sheet P can be read at the array pitch of the reading elements. The read head 107 outputs luminance data as the result of reading the image. In this example, the read head 107 may output RGB data or CMY data. When multiple color components are output, they may be processed on a color component basis. The read head 107 in this example is a line-type in which the reading sensors 109 are arranged in a line-like shape, but the read head 107 may be an area-type in which reading sensors 109 are arranged in a planar shape, or may use an inspection camera. The configuration of the reading sensor 109 is not limited.

Figure 22:
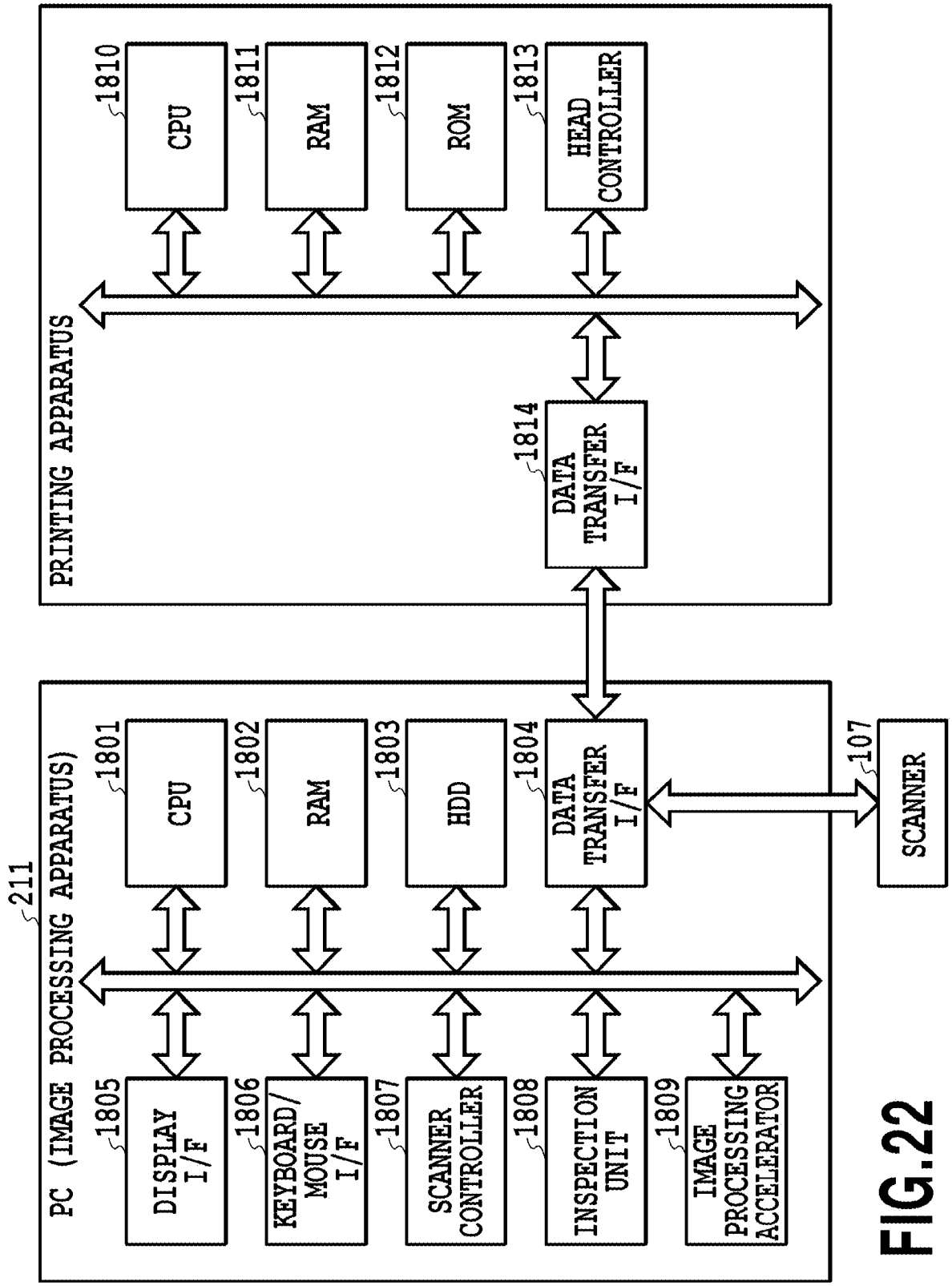
FIG. 22 is a block diagram illustrating an inspection system according to the third embodiment of the present invention.

FIG. 22 is a block diagram illustrating an inspection system composed of the printing apparatus in FIG. 20A and the PC 211 of the inspection apparatus 210 in FIG. 21A.

In the PC 211, a CPU 1801 performs processes in accordance with programs stored in an HDD 1803 and a RAM 1802 as storages. The RAM 1802 is a volatile storage, and temporarily holds programs and data. The HDD 1803 is a non-volatile storage, and similarly holds programs and data. A data transfer I/F (interface) 1804 controls sending and receiving data between the printing apparatus and the read head 107. Particularly, in this example, data on a printing method is received from the printing apparatus. As a method of connection for sending and receiving data, USB, IEEE1394, or LAN, for example, can be used. A keyboard and mouse I/F 1806 is an I/F for controlling a human interface device (HID) such as a keyboard and a mouse. A user can input through this I/F. A display I/F 1805 controls display on a display (unillustrated). A scanner controller 1807 controls the respective reading elements of the read head 107 illustrated in FIGS. 21A and 21B, and outputs the RGB data obtained from the respective reading elements to the CPU 1801.

An image processing accelerator 1809 is hardware that can perform image processing at higher speed than the CPU 1801. Specifically, the image processing accelerator 1809 reads parameters and data necessary for image processing from a predetermined address in the RAM 1802. Then, the CPU 1801 writes the read parameters and data in a predetermined address in the RAM 1802 to activate the image processing accelerator 1809 thereby to perform predetermined image processing on the data. The image processing accelerator 1809 is not an essential element, and the CPU 1801 alone may perform image processing. The read head 107 reads an inspection image printed by the printing apparatus, and an inspection unit 1808 inspects the inspection image on the basis of the read data. If the inspection unit 1808 detects a defective area in the inspection image, the inspection unit 1808 feeds back the inspection result to the printing apparatus and presents a necessary improvement measure.

In the printing apparatus, a CPU 1810 performs processes in accordance with programs held in a ROM 1812 and a RAM 1811. The RAM 1811 is a volatile storage, and temporarily holds programs and data. The ROM 1812 is a non-volatile storage and can hold programs and data. A data transfer I/F 1814 controls sending and receiving data to and from the PC 211. A head controller 1813 provides print data to the respective nozzle arrays in the print head 100 in FIG. 20B, and controls the ejection action of the print head. Specifically, the head controller 1813 reads control parameters and print data from a predetermined address in the RAM 1811. Then, the CPU 1810 writes the control parameters and print data in a predetermined address in the RAM 1811, which causes the head controller 1813 to activate the process, leading to ejection of ink from the print head 100.

In this embodiment, a full-line type printing apparatus including such a print head (line head) 100 prints an image. The image is read by the inspection apparatus 210 independent from the printing apparatus, and a defective area in the image is detected by the inspection apparatus 210. The inspection apparatus 210 performs a detection method in accordance with a size of a defective area in the image.

Figure 23A:
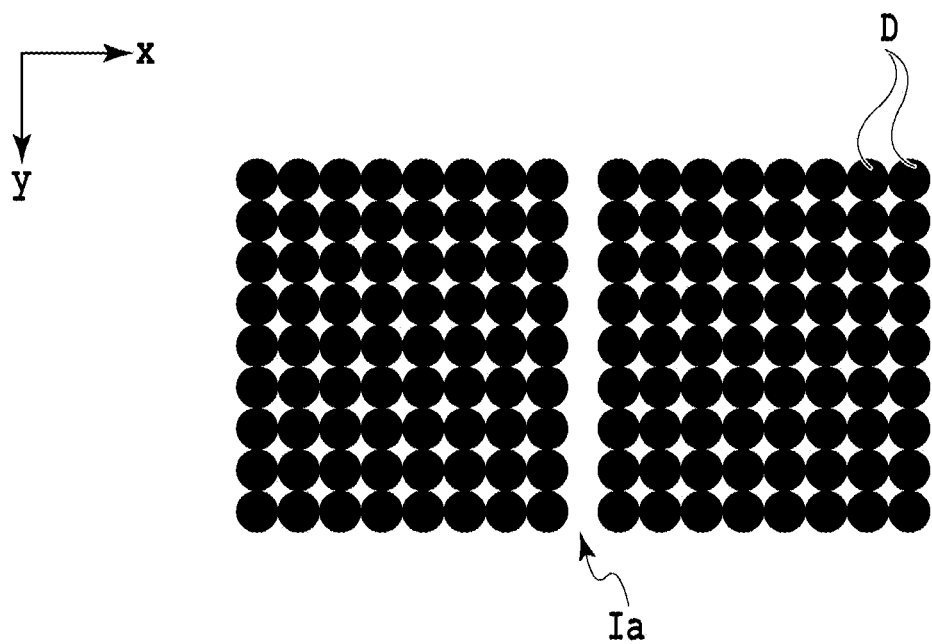
FIGS. 23A and 23B are explanatory diagrams illustrating inspection images according to the third embodiment of the present invention.
Figure 23B:
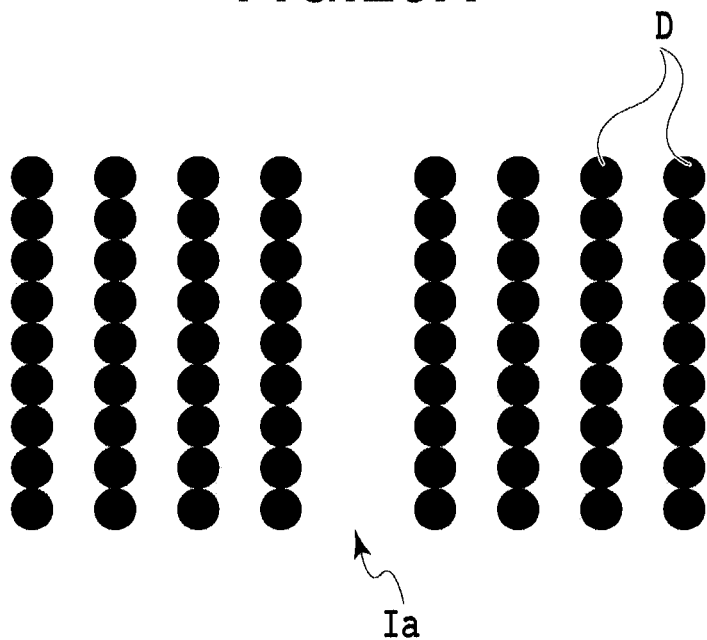

FIGS. 23A and 23B are explanatory diagrams illustrating print results of images using the print head 100 in FIG. 20B. If ejection failure occurs in one of printing elements 108 corresponding to nozzles, a defective area 1a is generated where dots D are not formed as illustrated in FIGS. 23A and 23B. FIG. 23A illustrates a case where when an image whose dot formation amount is 100% is printed, i.e., when ink is landed for all pixels to form dots D, ink ejection failure occurs in one nozzle. FIG. 23B illustrates a case where an image whose dot formation amount is 25%, i.e., when ink is landed for 25% of all pixels to form dots D, ink ejection failure occurs in one nozzle. In FIGS. 23A and 23B, white stripes (defective areas) Ia due to one nozzle ejection failure are different in size. That is, the dot formation amount affects the size of a defective area that is generated when ejection failure occurs in a nozzle. Typically, in an image whose dot formation amount is large, an assumed size of the defective area Ia generated due to ink ejection failure is small, and in an image whose dot formation amount is small, an assumed size of the defective area Ia generated due to ink ejection failure is large.

Figures 24A, 24B:
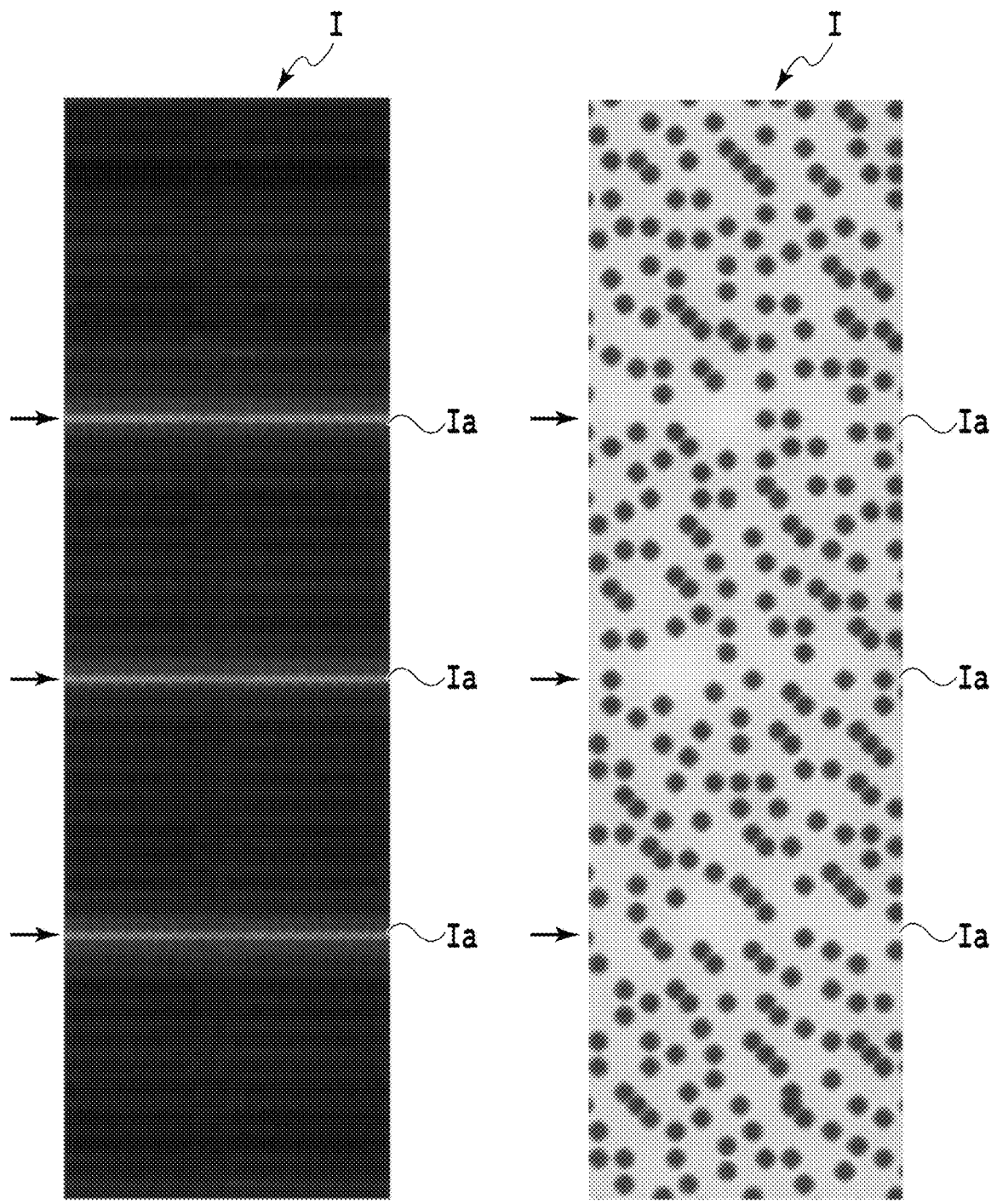
FIGS. 24A and 24B are explanatory diagrams illustrating inspection images according to the third embodiment of the present invention.

FIGS. 24A and 24B are explanatory diagrams illustrating a case where in the printing apparatus, image data is quantized by an error diffusion method, which is one of quantization processes, and images with different dot formation amounts are printed on the basis of the quantized data. FIG. 24A illustrates a print image I whose dot formation amount is 100%, and FIG. 20B illustrates a print image I whose dot formation amount is 14%. In each of the images I in FIGS. 24A and 24B, defective areas (white stripes) Ia due to ink ejection failure occur in three positions indicated by arrows. As with the schematic diagrams in FIGS. 23A and 23B, in the image whose dot formation amount is large as in FIG. 24A, the defective area Ia is small in size and thin in the x direction while in the image whose dot formation amount is small as in FIG. 24B, the defective area Ia is large in size and thick in the x direction.

FIGS. 25A to 25F are explanatory diagrams illustrating the results of performing the above defect detection algorithm in FIG. 5 on read data of the image I in FIG. 24A, using different parameters, in which light portions are detected as defects (defective areas) in the images. Similarly, FIGS. 25G to 25L are explanatory diagrams illustrating the results of performing the above defect detection algorithm in FIG. 5 on read data of the image I in FIG. 24B, using different parameters, in which light portions are detected as defects (defective areas) in the images.

In this example, two sets of division sizes (Sx, Sy) and shift amounts (Kx, Ky) are selected as parameters in the defect detection algorithm. The two sets of division sizes (Sx, Sy) and shift amounts (Kx, Ky) in FIGS. 25A to 25L are different as follows.

In FIGS. 25A and 25G, the following two sets 1 and 2 are selected.
 1: (Kx, Ky)=(1, 1), (Sx, Sy)=(1, 1)
 2: (Kx, Ky)=(2, 2), (Sx, Sy)=(2, 2)
In FIGS. 25B and 25H, the following two sets 1 and 2 are selected.
 1: (Kx, Ky)=(2, 2), (Sx, Sy)=(2, 2)
 2: (Kx, Ky)=(3, 3), (Sx, Sy)=(3, 3)
In FIGS. 25C and 25I, the following two sets 1 and 2 are selected.
 1: (Kx, Ky)=(4, 4), (Sx, Sy)=(4, 4)
 2: (Kx, Ky)=(5, 5), (Sx, Sy)=(5, 5)
In FIGS. 25D and 25J, the following two sets 1 and 2 are selected.
 1: (Kx, Ky)=(8, 8), (Sx, Sy)=(8, 8)
 2: (Kx, Ky)=(9, 9), (Sx, Sy)=(9, 9)
In FIGS. 25E and 25K, the following two sets 1 and 2 are selected.
 1: (Kx, Ky)=(16, 16), (Sx, Sy)=(16, 16)
 2: (Kx, Ky)=(17, 17), (Sx, Sy)=(17, 17)
In FIGS. 25F and 25L, the following two sets 1 and 2 are selected.
 1: (Kx, Ky)=(24, 24), (Sx, Sy)=(24, 24)
 2: (Kx, Ky)=(25, 25), (Sx, Sy)=(25, 25)

In each of FIGS. 25A to 25L, an average value of two candidate images 1 and 2 are added. That is, the number of addition images is two. In addition, from FIG. 25A toward FIG. 25F, the division size and shift amount are increasing, and similarly, from FIG. 25G toward FIG. 25L, the division size and shift amount are increasing.

As shown in FIGS. 25G to 25L, in the image in FIG. 24B in which the dot formation amount is less and the size of the defective area Ia is large, the defective area Ia cannot be detected if the division size and shift amount are small. By increasing the division size and shift amount, the detection accuracy of the defective area Ia is improved. On the contrary, as shown in FIGS. 25A to 25F, in the image in FIG. 24A in which the dot formation amount is large and the size of the defective area Ia is small, the defective area Ia can be detected even if the division size and shift amount are small. However, if the division size and shift amount are too large, a normal area in the image is also detected as a defective area Ia.

In this embodiment, from this perspective, division sizes and shift amounts are made to be different between (a) an image whose assumed size of a defective area is large, i.e., whose dot formation amount is small and (b) an image whose assumed size of defective area is small, i.e., whose dot formation amount is large. That is, in the former case, the division size (Sx, Sy) and shift amount (Kx, Ky) are set to be larger than those in the latter case. This can ensure a high detection accuracy of a defective area in either case. In addition, in the former case, only one of the division size (Sx, Sy) and shift amount (Kx, Ky) may be set to be larger than in the latter case. This also can have the same advantageous effect. Further, the dot formation amount is not limited to 100% and 14%, and by setting parameters (division size and shift amount) in accordance with a dot formation amount, the detection accuracy of a defective area can be improved.

Figure 26:
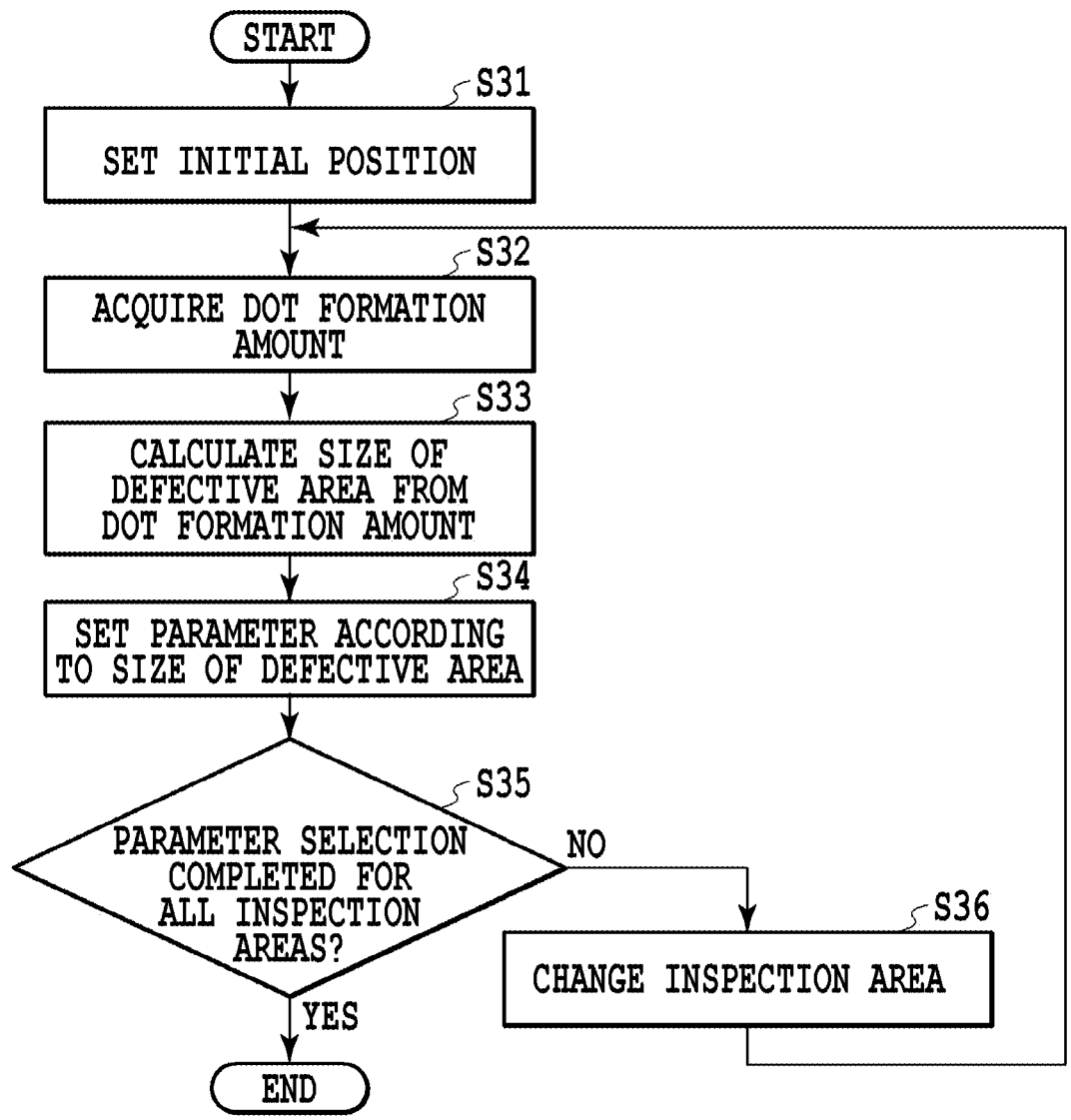
FIG. 26 is a flowchart for explaining an essential process according to the third embodiment of the present invention.

FIG. 26 is a flowchart for explaining a setting process of such sets of division sizes (Sx, Sy) and shift amounts (Kx, Ky) (hereinafter, also referred to as "parameters"). In this example, on the basis of RGB signals entered to the printing apparatus, parameters are set for detecting white stripes due to ink ejection failure.

Figure 27A:
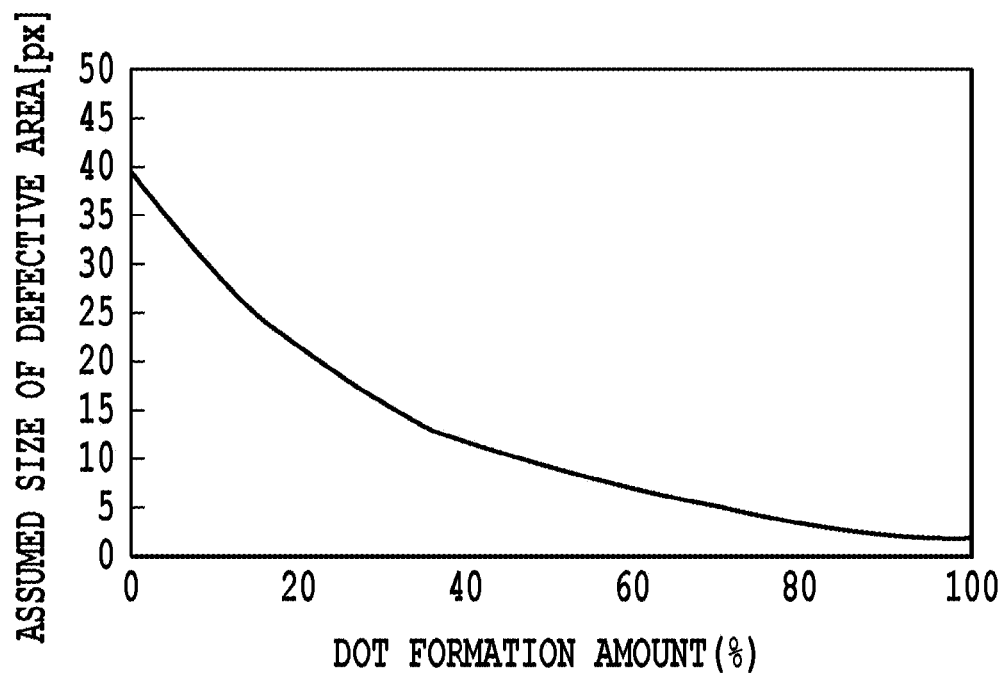
FIGS. 27A and 27B are explanatory diagrams illustrating examples of data used in the third embodiment of the present invention.

First, in Step S31, an initial position of an area for which a set of parameters is selected is set. For example, an inspection area is divided into areas such as 9×9 pixel areas, and 9×9 pixels positioned at the upper left of the inspection area is set to be the initial position. In the subsequent Step S32, a dot formation amount for the inspection area (9×9 pixels) at the initial position is obtained from the printing apparatus. The dot formation amount in the inspection area is preliminarily stored in the ROM 1812. For example, a dot formation amount is stored for each 33×33 grid patch corresponding to an RGB signal value. Next, in Step S33, on the basis of such a dot formation amount, an assumed size of a defective area (white stripe) due to ink ejection failure is calculated. The dot formation amount and the assumed size of a defective area are related to each other as illustrated in FIG. 27A. From such a graph, an assumed size of the defective area corresponding to the dot formation amount is obtained.

Figure 27B:
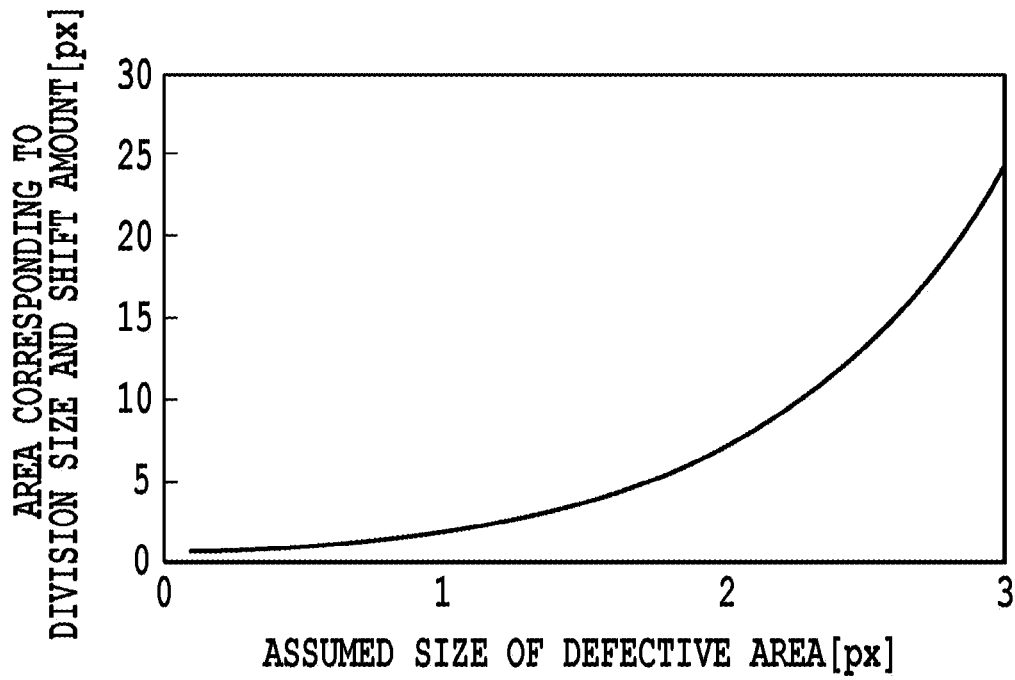

In the subsequent Step S34, in accordance with the assumed size of the defective area obtained in Step S33, parameters (shift amount (Kx, Ky) and division size (Sx, Sy)) are set. The assumed size of the defective area and parameters are related to each other as illustrated in FIG. 27B, for example. Such a relation has been stored in the ROM 1812. In FIG. 27B, a vertical axis indicates an area corresponding to shift amount and division size, the area including neighboring pixels used for performing the addition process of a target pixel. In this example, the division size and the shift amount have the relation Sx=Sy=kx=Ky. This means that the division size is Sx=Sy square and the shift amount is an amount shifted by one Sx=Sy square to right, left, up or down. The division size and shift amount are not limited to this, and various division sizes and shift amounts can be set in accordance with assumed sizes of defective areas by referring to a table in which assumed sizes of defective areas and parameters are related to each other.

In the subsequent Step S35, it is determined whether or not parameters have been selected for all inspection target areas. If not, in Step S36 an inspection target is changed to the next area (in this example, 9×9 pixels), and the flow returns to Step S32. If parameters have been selected for all inspection target areas, the process in FIG. 26 ends here.

In this embodiment, a large number of division sizes and phases, including division sizes and phases that are not to be processed, are set, an averaging process is performed on all the set division sizes and phases, the results of the averaging process are stored as candidates for the addition and quantization processes, and after that, from the stored candidates are selected targets for the addition process. However, as with the above first basic configuration in FIGS. 1A to 10C, predetermined numbers of processing target division sizes and shift amounts may be preliminarily set, on which the averaging, quantization and addition processes may be performed. In this case, the processing target division size and shift amount may be set in accordance with the assumed size of a defective area.

Fourth Embodiment

In this embodiment, as with the above second embodiment, an image printed in the multi-pass printing method by the serial scan type printing apparatus as illustrated in FIGS. 3A and 3B is to be inspected. In the multi-pass printing method, an image is printed by multiple scans of the print head 503 on a predetermined area of the sheet P.

FIGS. 28A and 28B are explanatory diagrams illustrating a print image by the two pass printing method. The print image is completed by two scans of the print head 503 on each predetermined area of the sheet P. The first scan forms dots such that some dots are thinned out by a mask illustrated in FIG. 30A, and the second scan forms dots such that some dots are thinned out by a mask illustrated in FIG. 30B. Similarly, an image is printed by the two pass printing method using the mask in FIG. 30A in odd-numbered scans, and the mask in FIG. 30B in even-numbered scans. Among the multiple nozzles 504 in the print head 503, ink ejection failure occurs at the nozzle 504A, which is the third nozzle from the top. FIG. 28B illustrates an image IA printed by the first and second scans and an image IB printed by the second and third scans.

Figure 30A:
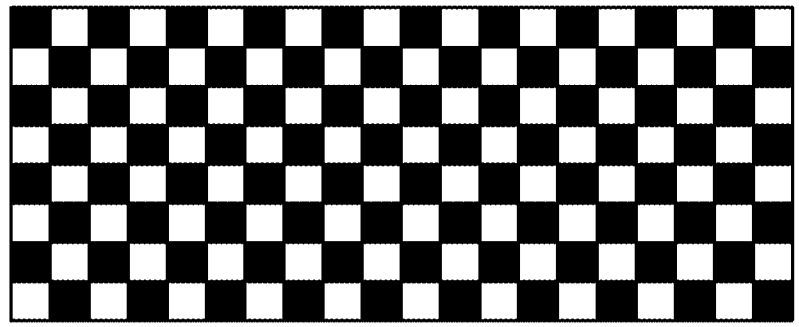
FIGS. 30A to 30D are explanatory diagrams illustrating masks used in the fourth embodiment of the present invention.
Figure 30B:
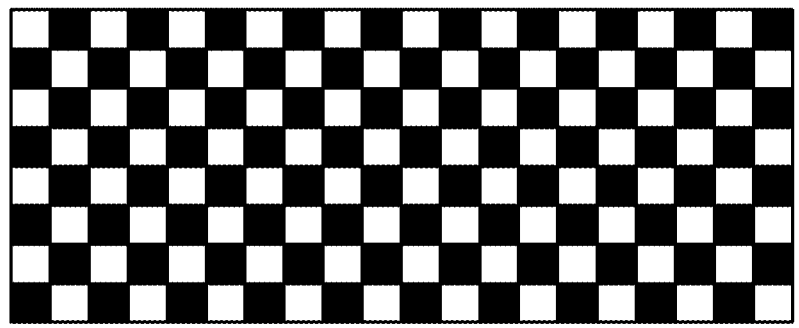
Figure 30C:
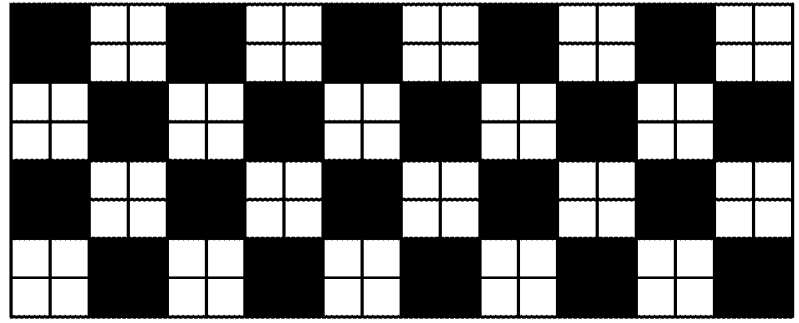
Figure 30D:
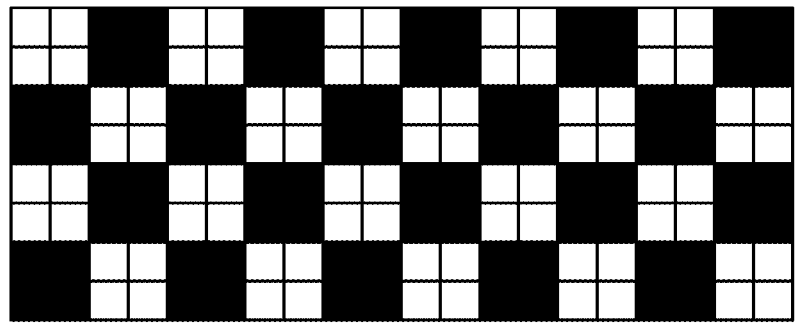

FIGS. 29A and 29B are explanatory diagrams illustrating an image printed by the two pass printing method using the masks in FIGS. 30C and 30D. The first scan forms dots such that some dots are thinned out by the mask in FIG. 30C, and the second scan forms dots such that some dots are thinned out by the mask in FIG. 30D. Similarly, an image is printed by the two pass printing method using the mask in FIG. 30C in odd-numbered scans, and the mask in FIG. 30D in even-numbered scans. As with the case in FIGS. 28A and 28B, among the multiple nozzles 504 in the print head 503, ink ejection failure occurs at the nozzle 504A, which is the third nozzle from the top. FIG. 29B illustrates an image IC printed by the first and second scans and an image ID printed by the second and third scans.

As obvious from comparison of FIG. 28B and FIG. 29B, defective areas occurring due to ejection failure of one nozzle 504A are different in size. The masks in FIGS. 30A and 30B have one-pixel periodicity and the masks in FIGS. 30C and 30D have two-pixel periodicity. The masks in the latter are lower in frequency than the masks in the former. That is, such a mask frequency affects the size of a defective area due to ejection failure. The resolution of the masks in FIGS. 30A and 30B is 1×1 pixel, and therefore the size of a defective area in the x direction is defined by one-pixel basis. On the other hand, the resolution of the masks in FIGS. 30C and 30D is 2×2 pixels, and therefore the size of a defective area in the x direction is defined by two-pixel basis. That is, if a defective area occurs using the masks of FIGS. 30A and 30B, the size of the defective area is assumed to be small, and when a defective area occurs using the masks of FIGS. 30C and 30D, the size of the defective area is assumed to be large.

In this embodiment, in the case where the mask with which an assumed size of a defective area is large is used, at least one of Sx of the division size (Sx, Sy) and Kx of the shift amount (Kx, Ky) is set to be greater than in the case where the mask with which an assumed size of a defective area is small is used. This can improve the detection accuracy of the defective area. In this example, the frequency of the mask used in the two pass printing method has been explained. However, also in multi-pass printing methods employing three or more passes, similarly, by setting division sizes and shift amounts in accordance with assumed sizes of defective areas, the detection accuracy of the defective areas can be improved.

Figure 31:
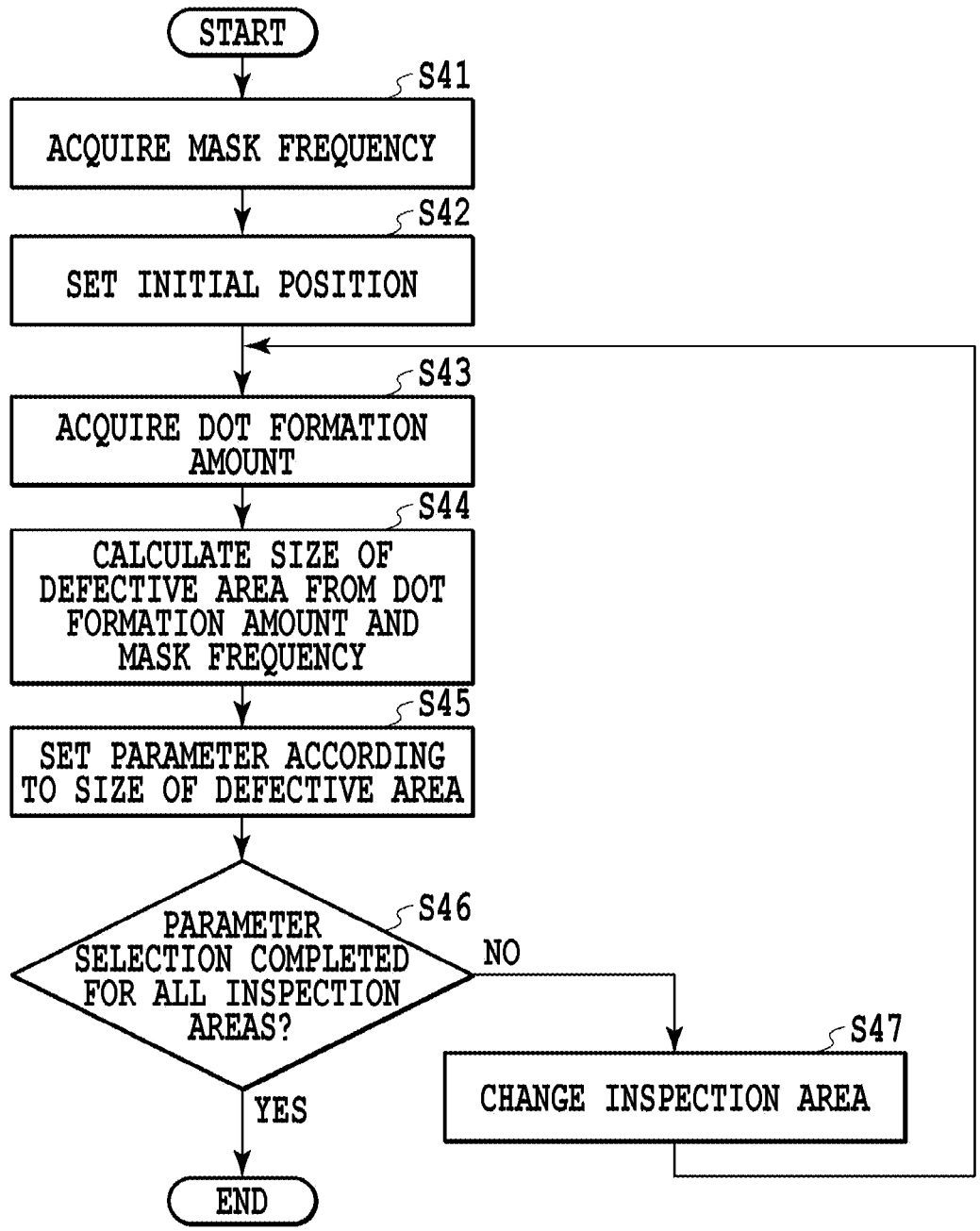
FIG. 31 is a flowchart for explaining a process according to the fourth embodiment of the present invention.

FIG. 31 is a flowchart for explaining a setting process of such sets of division sizes (Sx, Sy) and shift amounts (Kx, Ky) (hereinafter also referred to as "parameters"). In this example, parameters are set for detecting a defective area due to ink ejection failure on the basis of information on an image printing method obtained from the printing apparatus.

First, in Step S41, information on the frequency of a mask to be used in the multi-pass printing method is obtained from the printing apparatus. The information is obtained through the data transfer I/Fs 310 and 304 in FIG. 2. In the subsequent Step S42, the initial position of an area for which a set of parameters are selected is set. For example, an inspection area is divided into areas such as 9×9 pixel areas, and 9×9 pixels positioned at the upper left in the inspection area is set to be the initial position. In the subsequent Step S43, a dot formation amount for the inspection area (9×9 pixels) at the initial position is obtained from the printing apparatus. The dot formation amount at the inspection area is preliminarily stored in the ROM 313. For example, a dot formation amount is stored for each 33×33 grid patch corresponding to an RGB signal value.

In the subsequent Step S44, an assumed size of a defective area due to ink ejection failure is calculated on the basis of the mask frequency and dot formation amount obtained in Steps S41 and S43. An assumed size in the x direction of the defective area is calculated from the mask frequency. As describe above, if the resolution of the mask is 1×1 pixel, the size in the x direction of the defective area is one pixel, and if the resolution of the mask is 2×2 pixels, the size in the x direction of the defective area is two pixels. An assumed size in the y direction of the defective area is calculated from the dot formation amount. In this way, the size in the x direction of the defective area is assumed from the frequency of the mask, and the size in the y direction of the defective area is assumed from the dot formation amount.

In the subsequent Step S45, parameters (shift amount (Kx, Ky) and division size (Sx, Sy)) are set in accordance with the assumed size of the defective area calculated in Step S44. The assumed size of the defective area and the parameters are related to each other as illustrated in FIG. 27B, as with the above third embodiment. In the subsequent Step S46, it is determined whether or not parameters have been selected for all the inspection target areas. If not, in Step S47 an inspection target is changed to the next area (in this example, 9×9 pixels) and the flow returns to Step S43. If parameters have been selected for all the inspection target areas, the process in FIG. 31 ends here.

In this embodiment, a large number of division sizes and phases, including division sizes and phases that are not to be processed, are set, the averaging process is performed on all of the set division sizes and phases, the process results are stored as candidates for the addition and quantization processes, and after that from the stored candidates are selected targets for the addition process. However, as with the first basic configuration in the above FIGS. 1A to 10C, predetermined numbers of processing target division sizes and shift amounts may be preliminarily set, on which the averaging, quantization and addition processes may be performed. In this case, the processing target division sizes and shift amounts may be set in accordance with the frequency of the mask.

In the first to fourth embodiments, the examples have been explained in which addition target candidate images are selected from multiple inspection target candidate images preliminarily generated in accordance with the assumed contrasts and sizes in occurrence of a defect in an inspection target image. If respective areas in the inspection target image vary in assumed contrast and size in the occurrence of a defect, addition target candidate images may be selected for each of the respective areas, which can produce the same advantageous effect.

Fifth Embodiment

In the above first to fourth embodiments, as in FIG. 11, from the preliminarily generated multiple inspection target candidate images, addition target candidate images are selected in accordance with the contrast and size of a defective area. Without being limited to this, in accordance with the contrast and size of a defective area, an optimal candidate image may be generated for each area of the inspection target image, which can produce the same advantageous effect.

Figure 32B:
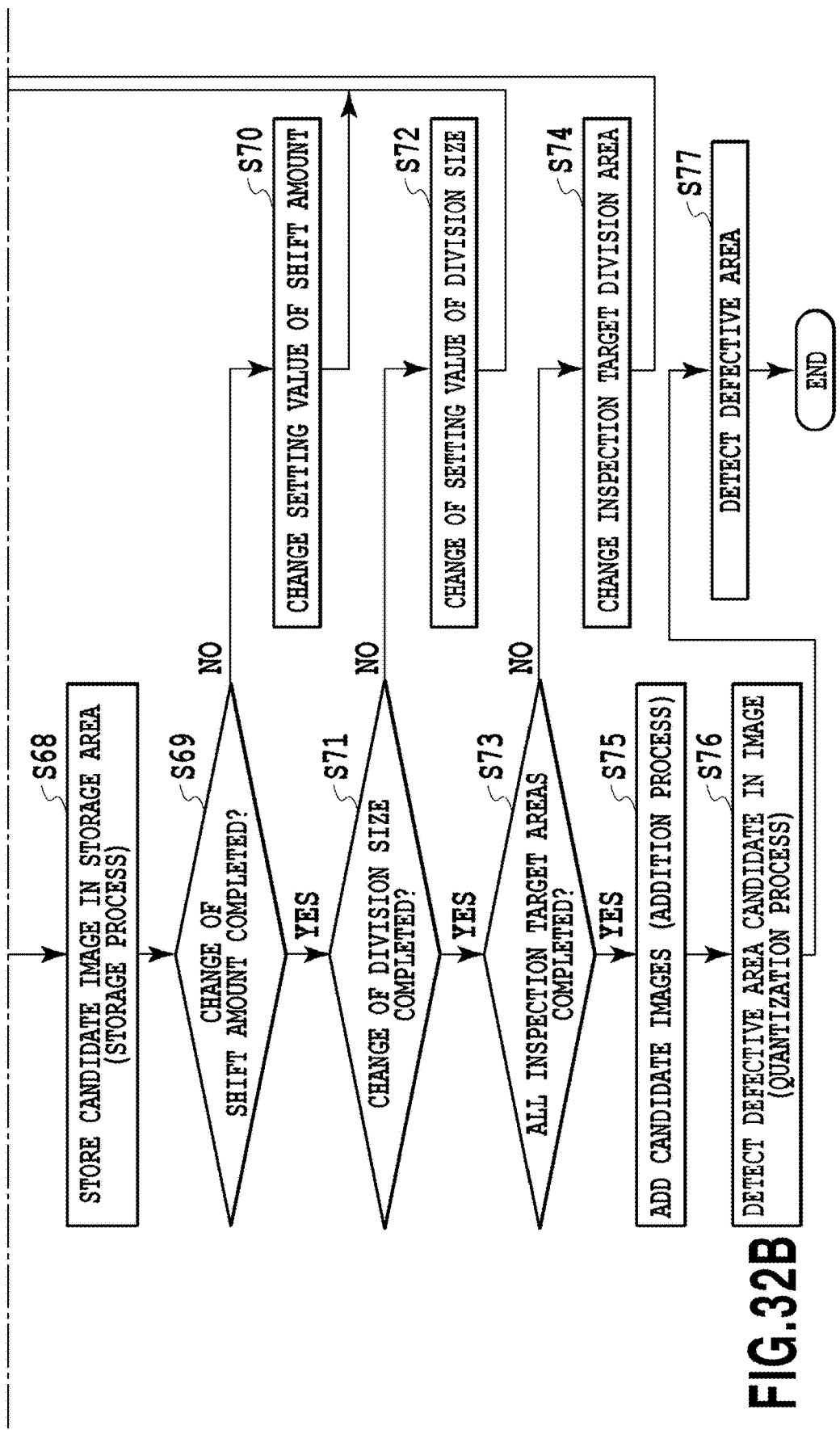

FIGS. 32A and 32B are flowcharts for explaining a process to generate only an optimal candidate image for each area of the inspection target image.

First, inspection target image data is acquired (Step S61). In the subsequent Step S62, an initial value of an addition target division area is set. For example, an inspection area is divided into areas such as 9×9 pixel areas, and 9×9 pixels positioned at the upper left of the inspection area is set to be an initial value. In the subsequent Step S63, a division parameter and shift amount parameter are set for such a 9×9 pixel division area. In doing this, as with the above first to fourth embodiments, a division size and a shift amount are set in accordance with the assumed contrast and/or size of a defective area.

In the subsequent Steps S64 and S65, shift and division processes are performed on the 9×9 pixels at the initial position according to the shift amount and division size set in Step S63. In the subsequent Step S66, an average value of pixel values in the division area is calculated, this average value is used to generate a candidate image (Step S67), and the candidate image is stored in a storage area such as a RAM (Step S68). In Step S69, it is determined whether or not the processes have been completed for all of the set shift amounts. If not, in Step S70 a setting value of the shift amount is changed and the flow returns to Step S64. In Step S71, it is determined whether or not the processes have been completed for all of the set division sizes. If not, in Step S72 a setting value of the division size is changed and the flow returns to Step S64. In this way, the processes are performed on one inspection target area in accordance with the combination of the division size and the shift amount set for the inspection target area thereby to generate the corresponding candidate image to be stored.

In the subsequent Step S73, it is determined whether or not the shift and division processes have been completed for all of the 9×9 pixel areas in the inspection target image. If not, in Step S74 the processing target is changed to the next 9×9 pixel area, and the flow returns to Step S63. If the processes have been completed for all the areas, the flow proceeds from Step S73 to Step S75, where multiple candidate images generated for the respective division areas (9×9 pixels) are added for each of the division areas (9×9 pixels) (addition process).

In the subsequent Step S76, pixel values obtained by this addition process are quantized to detect candidate pixels for a defective area in the image. For example, on the basis of the result of comparing the pixel values and an arbitrary threshold value, the pixel values are quantized to two or three values or more, and thereby the pixels are divided into defective area candidate pixels and other pixels. After that, in Step S77 defective area pixels that affect the quality of the print image are detected from the defective area candidate pixels. The methods include a method for performing template matching, for example, on an area in the inspection target image that corresponds to defective area candidate pixels thereby to detect the shape of the defective area and the degree of the defect in detail.

In this embodiment, in accordance with an image area represented by image data, parameters (including a division size and a shift amount) can be set that are suitable for print conditions in the image area. For example, contrasts in defective areas vary depending on the relation between the color of the sheet P (basic color) and the color of ink applied to the sheet P in printing an image. These contrasts can be estimated in accordance with print conditions including image print data. In an image printed by applying different inks to respective areas, the contrast of a defective area can be estimated for each of the areas. For each area, as with the above embodiments, optimal parameters in accordance with the contrast and/or size of the defective area can be set.

(Second Basic Configuration)

In the above first basic configuration in FIGS. 1A to 10C, as described with the flowchart in FIG. 5, the process is performed for finding an addition result of average values for multiple phases corresponding to a division size. By such a process, as described with FIGS. 8E and 9J, a final result is similar to that obtained by performing a filtering process with the target pixel as the center. In consideration of such a respect, this second basic configuration is adapted to replace the addition process for multiple phases corresponding to one division size by an addition process of weighting coefficients using a Gaussian filter. Other aspects of the configuration are the same as those of the first basic configuration, and will not be described here.

Figure 33A:
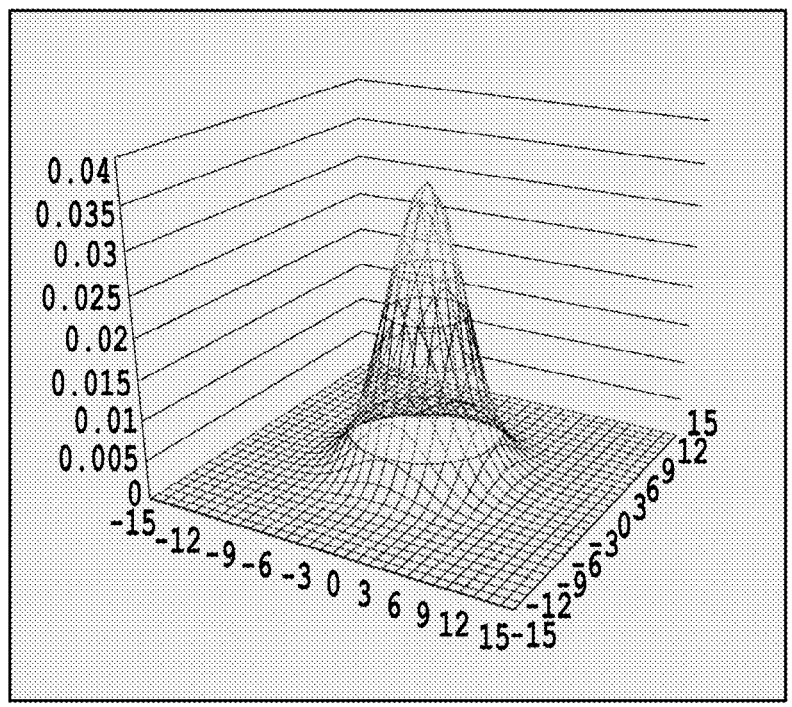
FIGS. 33A and 33B are explanatory diagrams illustrating Gaussian filters according to a second basic configuration of the present invention.
Figure 33B:
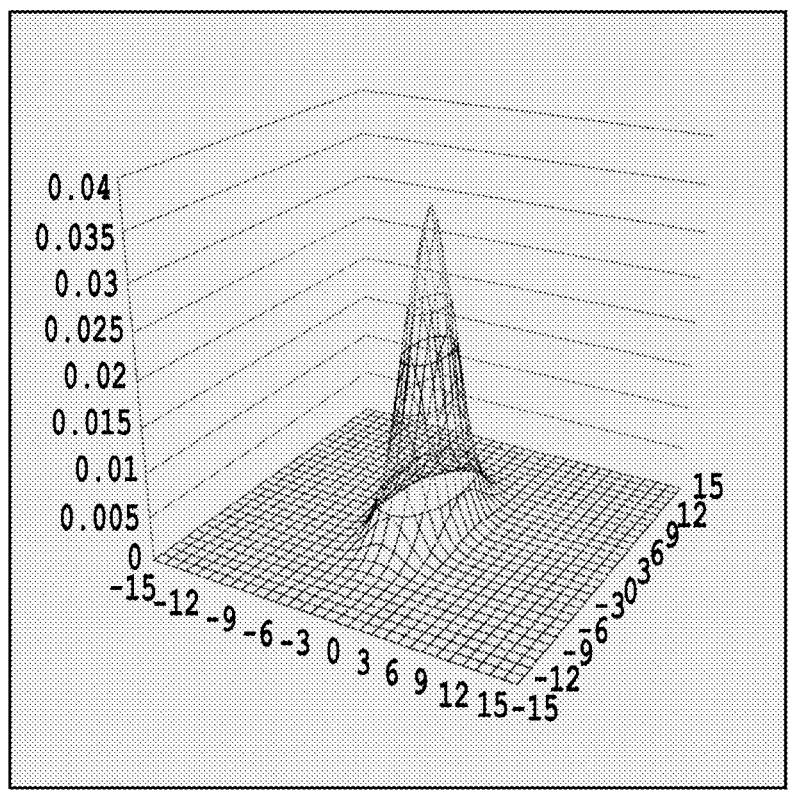

FIGS. 33A and 33B are diagrams illustrating examples of a Gaussian filter. FIG. 33A illustrates an isotropic Gaussian filter, which can be expressed by Expression 3.

$$f(x, y) = \frac{1}{2\pi\sigma^2} \exp\left(-\frac{x^2 - y^2}{2\sigma^2}\right) \quad \text{Expression 3}$$

Here, σ represents a standard deviation.

Such an isotropic Gaussian filter corresponds to a case of using a square division size such as 2×2 or 3×3. On the other hand, FIG. 33B illustrates an anisotropic Gaussian filter, and such an anisotropic Gaussian filter corresponds to a case of using a rectangular division size such as 2×3 or 3×2. Such an anisotropic Gaussian filter can be generated by deviating the ratio between x and y in Expression 3. For example, the Gaussian filter in FIG. 33B is represented by replacing y in Expression 3 by x'=X/2. The second basic configuration, as illustrated in FIG. 33B, employs an anisotropic Gaussian filter having a long side in the y direction. By matching the direction of an axis along the long side to the direction in which an inspection target density unevenness extends, in the above basic configuration, the same result can be obtained as the case where the division size and phase are set.

In this second basic configuration, luminance data of a target pixel is filtered using one Gaussian filter and quantized thereby to obtain a result. This process is performed for multiple different sized Gaussian filters, and the results are added. By doing so, an image defect extraction process can be performed on the basis of an addition result equivalent to that in the basis configuration in FIGS. 1A to 10C.

Figure 34:
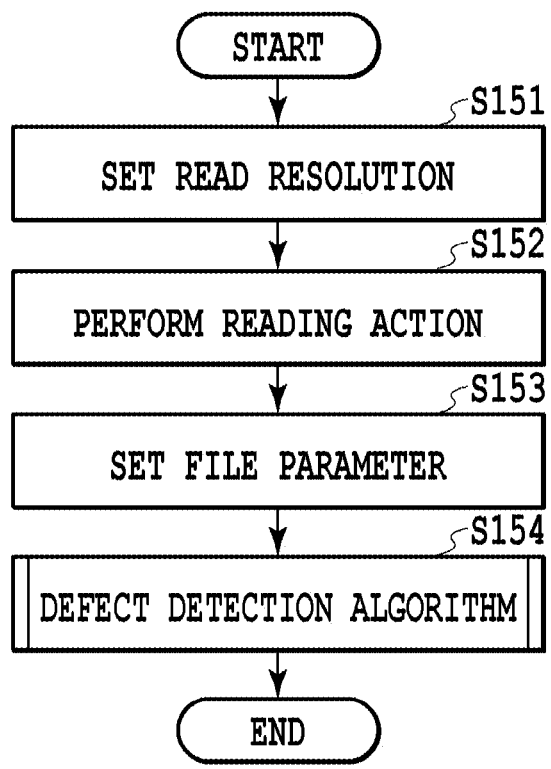
FIG. 34 is a flowchart illustrating basic steps of defect detection according to the second basic configuration of the present invention.

In the second basic configuration as well, the image processing apparatus 1 can take various forms as described with FIGS. 1A to 1D. FIG. 34 is a basic flowchart of a defect detection algorithm performed by the image processing apparatus 1 in the basic configuration. When this process is started, in Step S151 the image processing apparatus 1 sets a read resolution and in the subsequent Step S152 a reading action is performed on an inspection target. The above Steps S151 and S152 are equivalent to Steps S1 and S2 in FIG. 4.

In Step S153, the CPU 301 sets multiple types of file parameters of the Gaussian filter to be used for a defect detection process performed in the subsequent Step S154. The file parameters define the directionality of a Gaussian function as described with FIGS. 33A and 33B, and a different filter size (Gaussian filter diameter) F. Here, the file parameters are set such that the Gaussian filter is anisotropic. Then in Step S154, on the basis of the file parameters set in Step S153, a predetermined defect detection algorithm is performed on the image data generated in Step S152.

Figure 35:
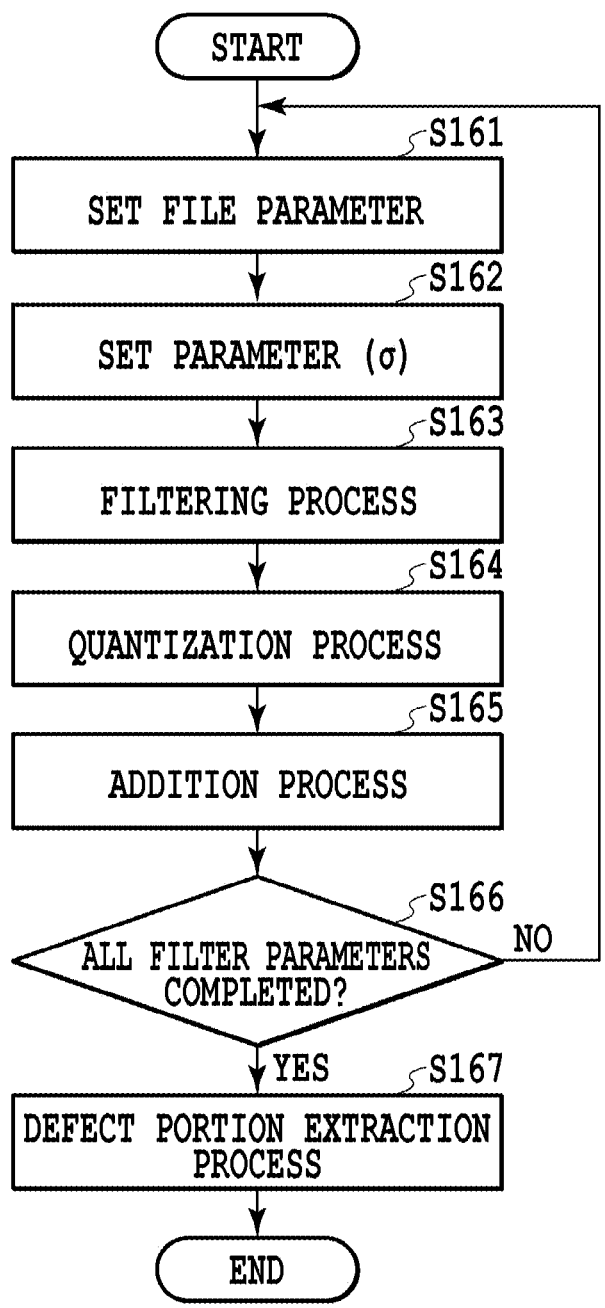
FIG. 35 is a flowchart illustrating a defect detection algorithm according to the second basic configuration of the present invention.

FIG. 35 is a flowchart for explaining the steps of the defect detection algorithm performed by the CPU 301 in Step S154. The process illustrated in FIG. 35 is performed one-by-one on pixels in the image acquired in Step S152.

When this process is started, in Step S161 the CPU 301 first sets one file parameter from the multiple file parameters set in Step S153. Further, in Step S162 the CPU 301 sets a parameter σ corresponding to the file parameter set in Step S161. The parameter σ corresponds to the standard deviation of the Gaussian function, and is preliminarily stored in a memory, in association with the file parameter and a filter size. Setting the file parameter and the parameter a in Steps S161 and S162 determines the shape of the Gaussian filter.

In subsequent Step S163, the Gaussian filter set in Steps S161 and S162 is used to perform a filtering process on the image data acquired in Step S152. Specifically, pieces of luminance data of the target pixel and its neighboring pixels falling within the filter size F are multiplied by a coefficient determined by the Gaussian filter, and the sum of the pieces of luminance data multiplied by the coefficients are calculated as a filtering process value for the target pixel.

In Step S164, a quantization process is performed on the filtered value obtained in Step S163, and further, in Step S165, a quantized value obtained in Step S164 is added to addition image data. The addition image data refers to image data for obtaining a result of adding pieces of quantized data obtained when variously changing the file parameters, i.e., variously changing the type of the Gaussian filter. When the quantized data obtained in Step S164 is a result for the first Gaussian filter, the addition image data is the same as the quantized data obtained in Step S164.

In subsequent Step S166, the image processing apparatus 1 determines whether or not all the file parameters set in Step S153 have been processed. If the image processing apparatus 1 determines that a file parameter to be processed still remains, the flow returns to Step S161 where the next file parameter is set. On the contrary if the image processing apparatus 1 determines that all the file parameters have been processed, the flow proceeds to Step S167.

In Step S167, on the basis of currently obtained addition image data, the defect portion extraction process is performed. An extraction method is not particularly limited as in the above basic configuration. This process ends here.

As with the above basic configuration, the second basic configuration also ensures that density unevenness appearing as a white stripe can be extracted. When the filter size is too large, then a luminance value after a filtering process is not sufficiently high even if a target pixel is within the white stripe, and therefore a defect portion cannot be extracted. For this reason, in this basic configuration, the filter size F is provided with a maximum value Fmax and a minimum value Fmin, and in Step S153 a filter size between Fmax and Fmin is set.

As described above, in the second basic configuration, in Step S153 in FIG. 34, a file parameter is set such that the Gaussian filter is anisotropic as illustrated in FIG. 33B. This enables a stripe-like defect in the image to be efficiently extracted. As such an anisotropic filter, a low pass filter or a Gabor filter can be employed besides the Gaussian filter.

Sixth Embodiment

In the above second basic configuration, as illustrated in FIG. 35, predetermined numbers of processing target division sizes and phases are preliminarily set, and the filtering, quantization and addition processes are performed for the set target division sizes and phases. In this embodiment, large numbers of division sizes and phases, including division sizes and phases that are not to be processed, are set, the filtering process is performed for all of the set division sizes and phases, and the process results are stored as candidates for the addition and quantization processes. After that, from these candidates are selected targets for the addition and quantization processes.

Figure 36:
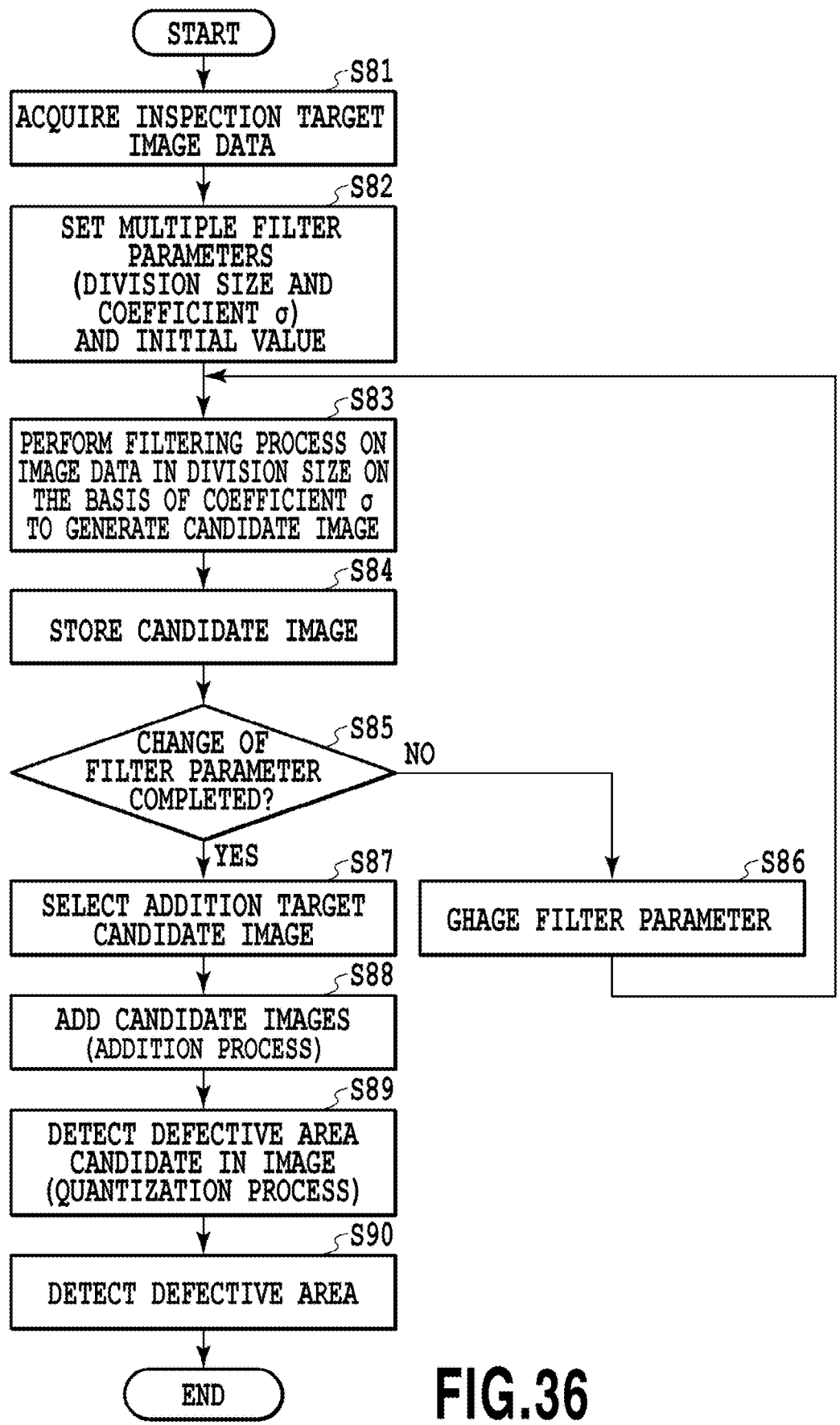
FIG. 36 is a flowchart for explaining an image processing method according to a sixth embodiment of the present invention.

FIG. 36 is a flowchart for explaining a method of inspecting a defective area in an image according to this embodiment.

First, inspection target image data is acquired (Step S81), and parameters of a filter to be applied to the data is set (Step S82). The parameters include multiple sizes of the filter (corresponding to division sizes) and multiple coefficients σ, and initial values of the sizes and coefficients are also set.

These parameters may be preliminarily set in the RAM 312, or may be optionally set from the host PC 1. For example, when the filter is the Gaussian filter f(x, y) as illustrated in FIG. 33A, the coefficient α corresponds to σ in the above Expression 3. The Gaussian filter in FIG. 33A is represented by the above Expression 3 where σ=3, −15<x<15, −15<y<15.

Figure 37C:
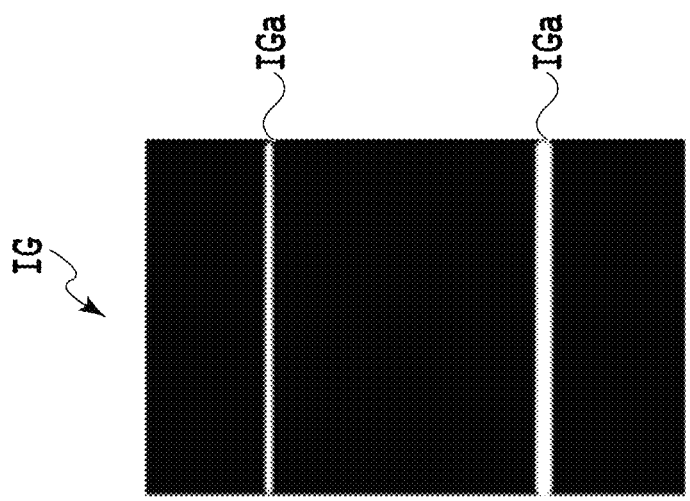
FIGS. 37A to 37C are explanatory diagrams illustrating processing results of inspection images according to the sixth embodiment of the present invention.
Figure 37B:
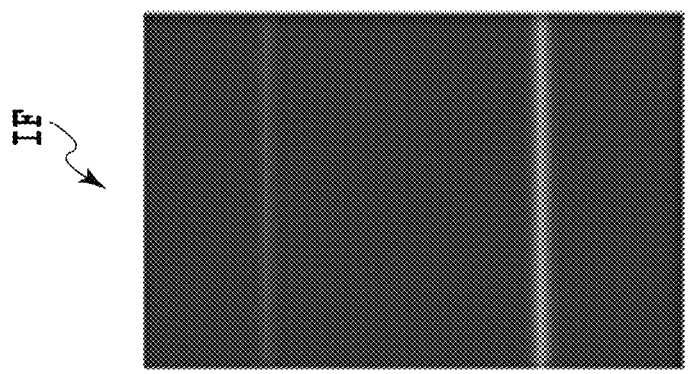
Figure 37A:
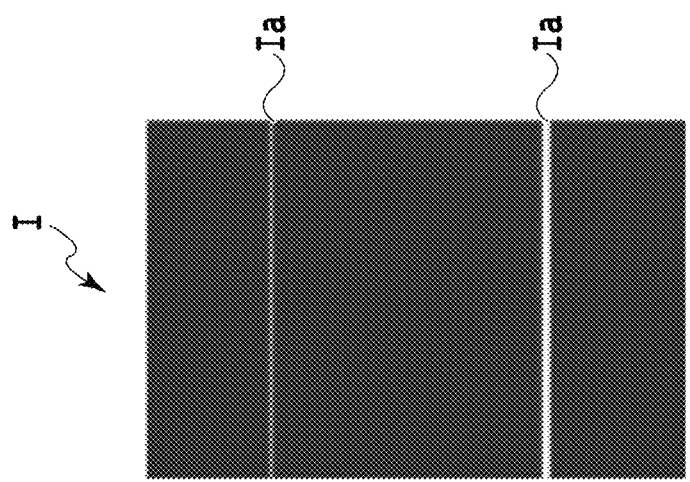

Next, a candidate image is generated by performing the filtering process on image data in division size (Step S83), the candidate image is stored in a storage area such as a RAM (Step S84). By changing σ value and ranges of x, y of the division size with respect to the division size, an effect of the filtering process by the Gaussian filter can be changed. The filtering process is performed on image data in FIG. 37A, using the Gaussian filter whose division size S (Sx, Sy) is Sx=30, Sy=30, σ=3. The resulting image IF is illustrated in FIG. 37B. As the filter in this example, the Gaussian filter is used. However, any filter can be employed that can blur an image, without being limited to the Gaussian filter. A filter in any size and rotated by any angle may be used depending on a property of the printing apparatus causing an image defect.

In the subsequent Step S85, it is determined whether the processes for the multiple set filter parameters have been completed. If not, in Step S86 the filter parameter is changed and the flow returns to Step S83. If the processes have been completed, addition target candidate images are selected from the multiple candidate images stored in Step S84 (Step S87), and the selected candidate images are added (addition process). The candidate images are selected in accordance with, for example, the contrast and size of the defective area as with in the above embodiments. In the subsequent Step S89, pixel values added in this way are quantized, thereby candidate pixels for the image defective area are detected. For example, on the basis of the results of comparing the pixel values and an arbitrary threshold value, the pixel values are quantized to two or three values or more, thereby the pixels are divided into defective area candidate pixels and other pixels. Specifically, an inspection image is generated from three candidate images obtained by changing the coefficient of the filter parameter σ to σ=3, 2, 1, and the generated inspection image is binarized by an intermediate value of the image to generate the image IG, which is illustrated in FIG. 37C. Defective areas Ia existing in the inspection target image in FIG. 37A appear as white areas IGa that are different from its surrounding areas in the image IG in FIG. 37C. By this, candidates for defective areas Ia are detected.

Then, in Step S90, a defective area that affects the image quality of a print image is detected from the candidates for defective areas. Methods for doing this include a method of performing template matching, for example, on an area in the inspection image that corresponds to the candidate pixels for a defective area to detect the shape of the defective area and the degree of the defect in detail.

In such an inspection method using a filter, by setting a division size, for example, to be equivalent, an inspection effect is approximately equivalent. Such an inspection method can be achieved by the image processing accelerator 309 and CPUs 311, 301.

In this embodiment, a large number of filtering processes more than necessary are performed on image data, the process results are stored as candidates for the addition and quantization processes, and from the stored candidates are selected targets for the addition process. However, as with the above second basic configuration in FIGS. 33A to 35, image data may be processed by the preset filtering process, and the addition and quantization processes may be performed on the resulting data. In this case, for example, the size of a filter may be set by a filter parameter, in accordance with the contrast and size, for example, of a defective area.

OTHER EMBODIMENTS

The present invention, on the basis of print conditions of a print image, has only to assume a form of appearance of a unique portion in the print image and to perform a process in accordance with the form of appearance on the image data. The print conditions of a print image can include print data for printing the print image, a type of a print medium on which the print image is printed, and the density of dots formed on the print medium. Further, the print conditions can include the number of scans of a print head in printing on the print medium, and a mask used in the multi-pass printing method. In short, various print conditions can be used as long as the form of appearance of a unique portion can be assumed from the printing conditions. In addition, the form of appearance of the unique portion is not limited to the contrast between the unique portion and its surrounding portion in the print image, and the size of the unique portion, and may be any form of appearance as long as the unique portion becomes more noticeable on the basis of the form of appearance.

The inspection target image is not limited to an image printed using an inkjet print head, and any printing method can be used as long as an image is printed serially from one side to the other side of the image. The printing method is not limited to a serial scan type in which an image is printed by a predetermined number of scans of a print head and a full-line type printing. In addition, any method for reading the image printed in this way also can be employed.

The present invention can also be achieved by a process adapted to supply a program realizing one or more functions of the above embodiments to a system or an apparatus through a network or a storage medium and to cause one or more processors in the system or apparatus to read and perform the program. In addition, the present invention can also be achieved by a circuit (e.g., an ASIC) realizing the one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132937, filed Jul. 1, 2015, which is hereby incorporated by reference wherein in its entirety.

What is claimed is:

1. An image processing apparatus comprising:
   one or more processors configured to function as:
   a data acquiring unit configured to acquire image data resulting from reading a print image;
   an information acquiring unit configured to acquire information about printing conditions in which the read print image has been printed by a printing unit;
   an averaging unit configured to generate multiple pieces of candidate image data, with respect to a target pixel to be processed, by subjecting image data of multiple divided images to averaging processes of averaging pixel values of pixels in divided image, each of the multiple divided images including the target pixel and corresponding to different combinations of (a) a division size of a division area obtained by dividing the read image, and (b) a shift amount for shifting a setting position of the division area;
a selecting unit configured to select, in accordance with the acquired information, pieces of candidate image data from the multiple pieces of candidate image data;
an adding unit configured to perform an addition process of the pieces of candidate image data selected by the selecting unit;
an outputting unit configured to output data resulting from performing the adding process with respect to the target pixel as image data for detecting a unique portion in the print image; and
a detecting unit configured to detect the unique portion in the print image based on the data output by the outputting unit,
wherein:
the information acquiring unit is configured to acquire, on the basis of the printing conditions, a contrast between the unique portion and its surrounding portion in the print image, and
the selecting unit is configured to select (i) a first number of pieces of candidate image data in a case where the contrast is a first degree, and (ii) a second number of pieces of candidate image data in a case where the contrast is a second degree lower than the first degree, the second number being larger than the first number.

2. An image processing apparatus comprising:
one or more processors configured to function as:
a data acquiring unit configured to acquire image data resulting from reading a print image;
an information acquiring unit configured to acquire information about printing conditions in which the read print image has been printed by a printing unit;
an averaging unit configured to generate multiple pieces of image data, with respect to a target pixel to be processed, by subjecting image data of multiple divided images to an averaging process of averaging pixel values of pixels in divided image, the multiple divided images including the target pixel and corresponding to a combination of (a) a division size of a division area obtained by dividing the read image, and (b) a shift amount for shifting a setting position of the division area;
an adding unit configured to perform an addition process of the multiple pieces of image data;
a setting unit configured to set, in accordance with the acquired information, the division size and the shift amount;
an outputting unit configured to output data resulting from performing the adding process with respect to the target pixel as image data for detecting a unique portion in the print image; and
a detecting unit configured to detect the unique portion in the print image based on the data output by the outputting unit,
wherein:
the information acquiring unit is configured to acquire, on the basis of the printing conditions, a contrast between the unique portion and its surrounding portion in the print image, and
the setting unit is configured to set (i) a first number of times of the addition processes in a case where the contrast is a first degree, and (ii) a second number of the addition processes in a case where the contrast is a second degree lower than the first degree, the second number being larger than the first number.

3. An image processing apparatus comprising:
one or more processors configured to function as:
a data acquiring unit configured to acquire image data resulting from reading a print image;
an information acquiring unit configured to acquire information about printing conditions in which the read print image has been printed by a printing unit;
a filter processing unit configured to generate multiple pieces of candidate image data, with respect to a target pixel to be processed, by subjecting image data of multiple divided images to filtering processes using multiple filters having different sizes, the multiple divided images being divided into multiple sizes corresponding to the different sizes of the multiple filters;
a selecting unit configured to select, in accordance with the acquired information, pieces of candidate image data from the multiple pieces of candidate image data;
an adding unit configured to perform an addition process of the pieces of candidate image data selected by the selecting unit;
an outputting unit configured to output data resulting from performing the adding process with respect to the target pixel as image data for detecting a unique portion in the print image; and
a detecting unit configured to detect the unique portion in the print image based on the data output by the outputting unit,
wherein:
the information acquiring unit is configured to acquire, on the basis of the printing conditions, a contrast between the unique portion and its surrounding portion in the print image, and
the selecting unit is configured to select (i) a first number of pieces of candidate image data in a case where the contrast is a first degree, and (ii) a second number of pieces of candidate image data in a case where the contrast is a second degree lower than the first degree, the second number being larger than the first number.

4. An image processing apparatus comprising:
one or more processors configured to function as:
a data acquiring unit configured to acquire image data resulting from reading a print image;
an information acquiring unit configured to acquire information about printing conditions in which the read print image has been printed by a printing unit;
a filter processing unit configured to generate multiple pieces of image data, with respect to a target pixel to be processed, by subjecting image data of multiple divided images to a filtering process using a filter, the multiple divided images being divided into a size corresponding to a size of the filter;
an adding unit configured to perform an addition process of the multiple pieces of image data;
a setting unit configured to set, in accordance with the acquired information, the size of the filter;
an outputting unit configured to output data resulting from performing the adding process with respect to the target pixel as image data for detecting a unique portion in the print image; and
a detecting unit configured to detect the unique portion in the print image based on the data output by the outputting unit,
wherein:
the information acquiring unit is configured to acquire, on the basis of the printing conditions, a contrast between the unique portion and its surrounding portion in the print image, and the setting unit is configured to set (i) a first number of pieces of times of the addition processes in a case where the contrast is a first degree, and (ii) a second number of the addition process in a case where the contrast is a second degree lower than the first degree, the second number being larger than the first number.

5. The image processing apparatus according to claim 1, wherein the unique portion is caused by the printing unit to print the print image.

6. The image processing apparatus according to claim 1, further comprising an extracting unit configured to extract the unique portion in the print image based on the data output from the outputting unit.

7. An image processing apparatus comprising:
one or more processors configured to function as:
a data acquiring unit configured to acquire image data resulting from reading a print image;
an information acquiring unit configured to acquire information about printing conditions in which the read print image has been printed by a printing unit;
an averaging unit configured to generate multiple pieces of candidate image data, with respect to a target pixel to be processed, by subjecting image data of multiple divided images to averaging processes of averaging pixel values of pixels in divided image, each of the multiple divided images including the target pixel and corresponding to different combinations of (a) a division size of a division area obtained by dividing the read image, and (b) a shift amount for shifting a setting position of the division area;
a selecting unit configured to select, in accordance with the acquired information, pieces of candidate image data from the multiple pieces of candidate image data;
an adding unit configured to perform an addition process of the pieces of candidate image data selected by the selecting unit;
an outputting unit configured to output data resulting from performing the adding process with respect to the target pixel as image data for detecting a unique portion in the print image; and
a detecting unit configured to detect the unique portion in the print image based on the data output by the outputting unit,
wherein:
the information acquiring unit is configured to acquire, on the basis of the printing conditions, a size of the unique portion, and
the selecting unit is configured to select, from the multiple pieces of candidate image data, pieces of candidate image data having a larger division size as the size of the unique portion is larger.

8. An image processing apparatus comprising:
one or more processors configured to function as:
a data acquiring unit configured to acquire image data resulting from reading a print image;
an information acquiring unit configured to acquire information about printing conditions in which the read print image has been printed by a printing unit;
an averaging unit configured to generate multiple pieces of image data, with respect to a target pixel to be processed, by subjecting image data of multiple divided images to an averaging process of averaging pixel values of pixels in divided image, the multiple divided images including the target pixel and corresponding to a combination of (a) a division size of a division area obtained by dividing the read image, and (b) a shift amount for shifting a setting position of the division area;
an adding unit configured to perform an addition process of the multiple pieces of image data;
a setting unit configured to set, in accordance with the acquired information, the division size and the shift amount;
an outputting unit configured to output data resulting from performing the adding process with respect to the target pixel as image data for detecting a unique portion in the print image; and
a detecting unit configured to detect the unique portion in the print image based on the data output by the outputting unit,
wherein:
the information acquiring unit is configured to acquire, on the basis of the printing conditions, a size of the unique portion, and
the setting unit is configured to select pieces of image data having a larger division size as the size of the unique portion is larger.

9. The image processing apparatus according to claim 1, further comprising a non-transitory storage medium configured to store the multiple pieces of candidate image data.

10. The image processing apparatus according to claim 1, wherein:
the information acquiring unit is configured to acquire, on the basis of the printing conditions, a size of the unique portion, and
the selecting unit is configured to select, from the multiple pieces of candidate image data, pieces of candidate image data having a larger division size as the size of the unique portion is larger.

11. The image processing apparatus according to claim 1, wherein:
the printing conditions include at least one of print data for printing the print image and a type of a print medium having the print image thereon.

12. The image processing apparatus according to claim 1, wherein:
the print image is an image printed by a predetermined number of times of scans of a print head for each predetermined area of a print medium,
the printing conditions include the predetermined number of times of scans, and
the information acquiring unit is configured to acquire, on the basis of the predetermined number of times of scans, at least one of a contrast between the unique portion and its surrounding portion in the print image and a size of the unique portion.

13. The image processing apparatus according to claim 1, wherein:
the print image is an image printed with dots formed on a print medium,
the printing conditions include a density of the dots, and
the information acquiring unit is configured to acquire, on the basis of the density, at least one of a contrast between the unique portion and its surrounding portion in the print image and a size of the unique portion.

14. The image processing apparatus according to claim 1, wherein:
the print image is an image printed by multiple times of scans of a print head for each predetermined area on a print medium, pixels to be printed by the respective scans being thinned out by multiple masks,
the printing conditions include the masks, and the information acquiring unit is configured to acquire, on the basis of a frequency corresponding to a resolution of the masks, at least one of a contrast between the unique portion and its surrounding portion in the print image and a size of the unique portion.

15. The image processing apparatus according to claim 1, further comprising a reading unit configured to read the print image printed so as to generate the image data.

16. The image processing apparatus according to claim 15, further comprising the printing unit configured to print the print image.

17. The image processing apparatus according to claim 2, wherein:
   the information acquiring unit is configured to acquire, on the basis of the printing conditions, a size of the unique portion, and
   the setting unit is configured to select pieces of image data having a larger division size as the size of the unique portion is larger.

18. The image processing apparatus according to claim 2, further comprising a reading unit configured to read the print image printed so as to generate the image data.

19. The image processing apparatus according to claim 18, further comprising the printing unit configured to print the print image.

20. The image processing apparatus according to claim 3, further comprising a non-transitory storage medium configured to store the multiple pieces of candidate image data.

21. The image processing apparatus according to claim 4, wherein:
   the information acquiring unit is configured to acquire, on the basis of the printing conditions, a size of the unique portion, and
   the setting unit is configured to set the filter size larger as a size of the unique portion is larger.

* * * * *